(12) United States Patent
Lane et al.

(10) Patent No.: US 8,406,795 B2
(45) Date of Patent: *Mar. 26, 2013

(54) METHODS AND APPARATUS FOR PERFORMING TIMING SYNCHRONIZATION WITH BASE STATIONS

(75) Inventors: Frank A. Lane, Asbury, NJ (US); Rajiv Laroia, Far Hills, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 883 days.

This patent is subject to a terminal disclaimer.

(21) Appl. No.: 12/425,261

(22) Filed: Apr. 16, 2009

(65) Prior Publication Data

US 2009/0316621 A1 Dec. 24, 2009

Related U.S. Application Data

(62) Division of application No. 11/184,735, filed on Jul. 18, 2005, now Pat. No. 7,574,224.

(60) Provisional application No. 60/689,910, filed on Jun. 13, 2005.

(51) Int. Cl.
*H04B 7/00* (2006.01)
(52) U.S. Cl. ........ 455/502; 455/208; 370/324; 370/350; 370/328
(58) Field of Classification Search .................. 455/502, 455/208, 450–452.2; 370/304, 324, 350, 370/503, 509, 510, 512–514, 450, 345, 328
See application file for complete search history.

(56) References Cited

U.S. PATENT DOCUMENTS

| 4,688,216 | A |   | 8/1987  | Saburi |
| 5,414,432 | A |   | 5/1995  | Penny, Jr. et al. |
| 5,809,397 | A | * | 9/1998  | Harthcock et al. ........... 455/13.2 |
| 6,088,576 | A |   | 7/2000  | Sone |
| 6,127,967 | A | * | 10/2000 | Ghazvinian et al. .......... 342/354 |
| 6,353,645 | B1 | * | 3/2002 | Solve et al. ................... 375/354 |

(Continued)

FOREIGN PATENT DOCUMENTS

| EP | 1035667 |    | 9/2000 |
| EP | 1050978 | A2 | 11/2000 |

(Continued)

OTHER PUBLICATIONS

International Preliminary Report on Patentability, PCT/US2006/022703—International Preliminary Examining Authority—European Patent Office. Jul. 16, 2007.

(Continued)

*Primary Examiner* — Dominic E Rego
(74) *Attorney, Agent, or Firm* — Sam Talpalatsky; Nicholas J. Pauley; Jonathan T. Velasco

(57) ABSTRACT

A wireless terminal using OFDM signaling supporting both terrestrial and satellite base station connectivity operates using conventional access probe signaling in a first mode of operation to establish a timing synchronized wireless link with a terrestrial base station. In a second mode of operation, used to establish a timing synchronized wireless link with a satellite base station, a slightly modified access protocol is employed. The round trip signaling time and timing ambiguity between a wireless terminal and a satellite base station is substantially greater than with a terrestrial base station. The modified access protocol uses coding of access probe signals to uniquely identify a superslot index within a beaconslot. The modified protocol uses multiple access probes with different timing offsets to further resolve timing ambiguity and allows the satellite base station access monitoring interval to remain small in duration. Terrestrial base station location/connection information is used to estimate initial timing.

31 Claims, 30 Drawing Sheets

U.S. PATENT DOCUMENTS

| | | |
|---|---|---|
| 6,370,356 B2 | 4/2002 | Duplessis et al. |
| 6,459,905 B1 | 10/2002 | Fuji |
| 6,684,070 B1 * | 1/2004 | Rosen et al. .................. 455/427 |
| 6,708,040 B1 * | 3/2004 | Laroia et al. .................. 455/515 |
| 6,806,830 B2 * | 10/2004 | Panasik et al. ................ 342/464 |
| 6,937,609 B1 | 8/2005 | Hong |
| 6,967,936 B1 | 11/2005 | Laroia et al. |
| 7,012,948 B2 | 3/2006 | Kim et al. |
| 7,047,009 B2 | 5/2006 | Laroia et al. |
| 7,049,009 B2 | 5/2006 | Li et al. |
| 7,133,354 B2 | 11/2006 | Laroia et al. |
| 7,197,288 B1 * | 3/2007 | Ngan et al. .................. 455/186.1 |
| 7,302,268 B2 | 11/2007 | Wu et al. |
| 7,330,459 B2 | 2/2008 | Chen et al. |
| 7,391,753 B2 | 6/2008 | Tiedemann, Jr. et al. |
| 7,574,224 B2 | 8/2009 | Lane et al. |
| 7,974,261 B2 * | 7/2011 | Lane et al. .................. 370/350 |
| 8,036,205 B2 | 10/2011 | Lane et al. |
| 2001/0008393 A1 * | 7/2001 | Valio et al. ............... 342/357.02 |
| 2002/0001299 A1 * | 1/2002 | Petch et al. .................. 370/350 |
| 2002/0003786 A1 * | 1/2002 | Kim et al. .................... 370/335 |
| 2002/0037737 A1 * | 3/2002 | Learned et al. ............... 455/526 |
| 2002/0132624 A1 * | 9/2002 | Watanabe et al. ............. 455/456 |
| 2003/0003815 A1 * | 1/2003 | Yamada ...................... 439/894 |
| 2003/0083816 A1 * | 5/2003 | Imakado et al. ............. 701/213 |
| 2003/0199269 A1 * | 10/2003 | Tobe et al. .................. 455/422.1 |
| 2003/0203745 A1 * | 10/2003 | Chiang et al. ............... 455/561 |
| 2004/0002328 A1 * | 1/2004 | Chandra et al. ............ 455/422.1 |
| 2004/0005899 A1 * | 1/2004 | Nir et al. .................... 455/456.1 |
| 2004/0077311 A1 * | 4/2004 | Riley .......................... 455/12.1 |
| 2004/0095904 A1 * | 5/2004 | Laroia et al. .................. 370/329 |
| 2004/0198387 A1 * | 10/2004 | Tsuji et al. .................. 455/456.1 |
| 2004/0202194 A1 * | 10/2004 | Annamalai .................. 370/446 |
| 2005/0003833 A1 * | 1/2005 | Younis ........................ 455/456.1 |
| 2005/0037786 A1 * | 2/2005 | Edge ............................ 455/502 |
| 2005/0041619 A1 | 2/2005 | Karabinis et al. |
| 2005/0043046 A1 * | 2/2005 | Lee .............................. 455/502 |
| 2005/0083905 A1 * | 4/2005 | Nishida et al. ............... 370/351 |
| 2005/0096066 A1 * | 5/2005 | Lee ............................ 455/456.1 |
| 2005/0146462 A1 * | 7/2005 | Abraham et al. ........ 342/357.02 |
| 2005/0249125 A1 * | 11/2005 | Yoon et al. .................... 370/252 |
| 2005/0259754 A1 | 11/2005 | Ho et al. |
| 2006/0050742 A1 | 3/2006 | Grandhi et al. |
| 2006/0215617 A1 | 9/2006 | Martin |
| 2006/0280200 A1 | 12/2006 | Lane et al. |
| 2007/0236386 A1 | 10/2007 | Harpak et al. |
| 2008/0280607 A1 * | 11/2008 | Kanto et al. ................. 455/435.1 |
| 2009/0315768 A1 * | 12/2009 | Abraham .................. 342/357.09 |

FOREIGN PATENT DOCUMENTS

| | | |
|---|---|---|
| EP | 1069793 A1 | 1/2001 |
| EP | 1282327 A2 | 2/2003 |
| JP | 1149531 A | 6/1989 |
| JP | 548508 | 2/1993 |
| JP | 118584 | 1/1999 |
| JP | 11164353 A | 6/1999 |
| JP | 2000505993 | 5/2000 |
| JP | 2000506346 | 5/2000 |
| JP | 2000269876 A | 9/2000 |
| JP | 2000358274 | 12/2000 |
| JP | 2001169345 | 6/2001 |
| JP | 2001257641 | 9/2001 |
| JP | 2005130256 | 5/2005 |
| JP | 2006504338 A | 2/2006 |
| JP | 2007521685 A | 8/2007 |
| JP | 2008544647 A | 12/2008 |
| JP | 2008544651 A | 12/2008 |
| WO | WO9608885 A2 | 3/1996 |
| WO | WO9955019 A1 | 10/1999 |
| WO | WO0048414 A1 | 8/2000 |
| WO | 2004019538 | 3/2004 |
| WO | WO2004038951 | 5/2004 |
| WO | WO2005020490 | 3/2005 |
| WO | 2005039233 | 4/2005 |

OTHER PUBLICATIONS

International Search Report, PCT/US2006/022703—International Search Authority—European Patent Office. Mar. 20, 2007.
Written Opinion, PCT/US2006-022703—International Search Authority—European Patent Office. Mar. 20, 2007.
International Search Report, PCT/US2006/022696—International Search Authority—European Patent Office. Dec. 19, 2006.
International Preliminary Report on Patentability, PCT/US2006/022696—International Preliminary Examining Authority—European Patent Office. Aug. 7, 2007.
Written Opinion, PCT/US2006/022696—International Search Authority—European Patent Office, Dec. 19, 2006.
European Search Report—EP09000655, Search Authority—Munich Patent Office, May 8, 2009.
European Search Report—EP09000656, Search Authority—Munich Patent Office, Jun. 8, 2009.
European Search Report—EP09000657, Search Authority—Munich Patent Office, Jul. 8, 2009.

* cited by examiner

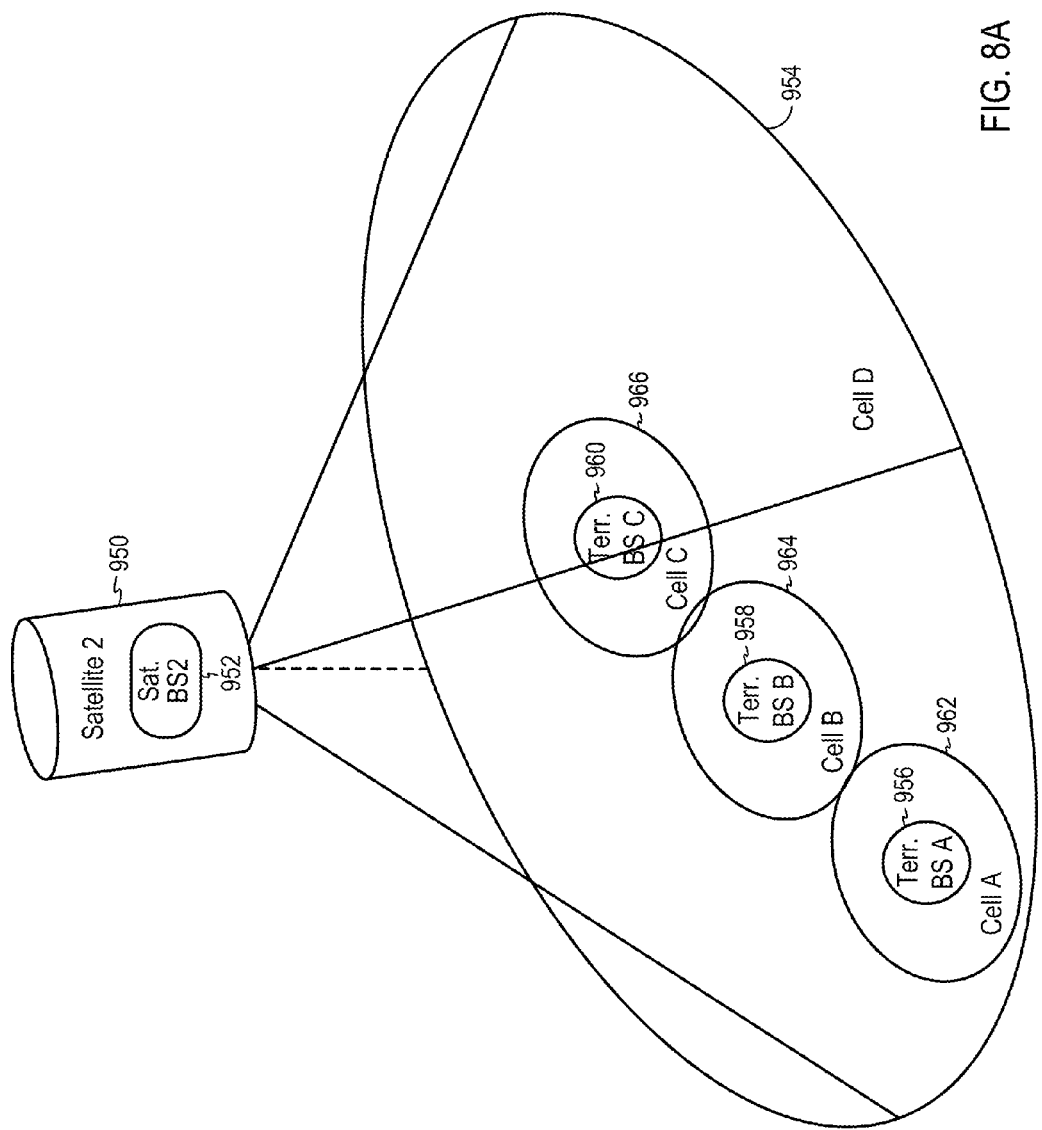

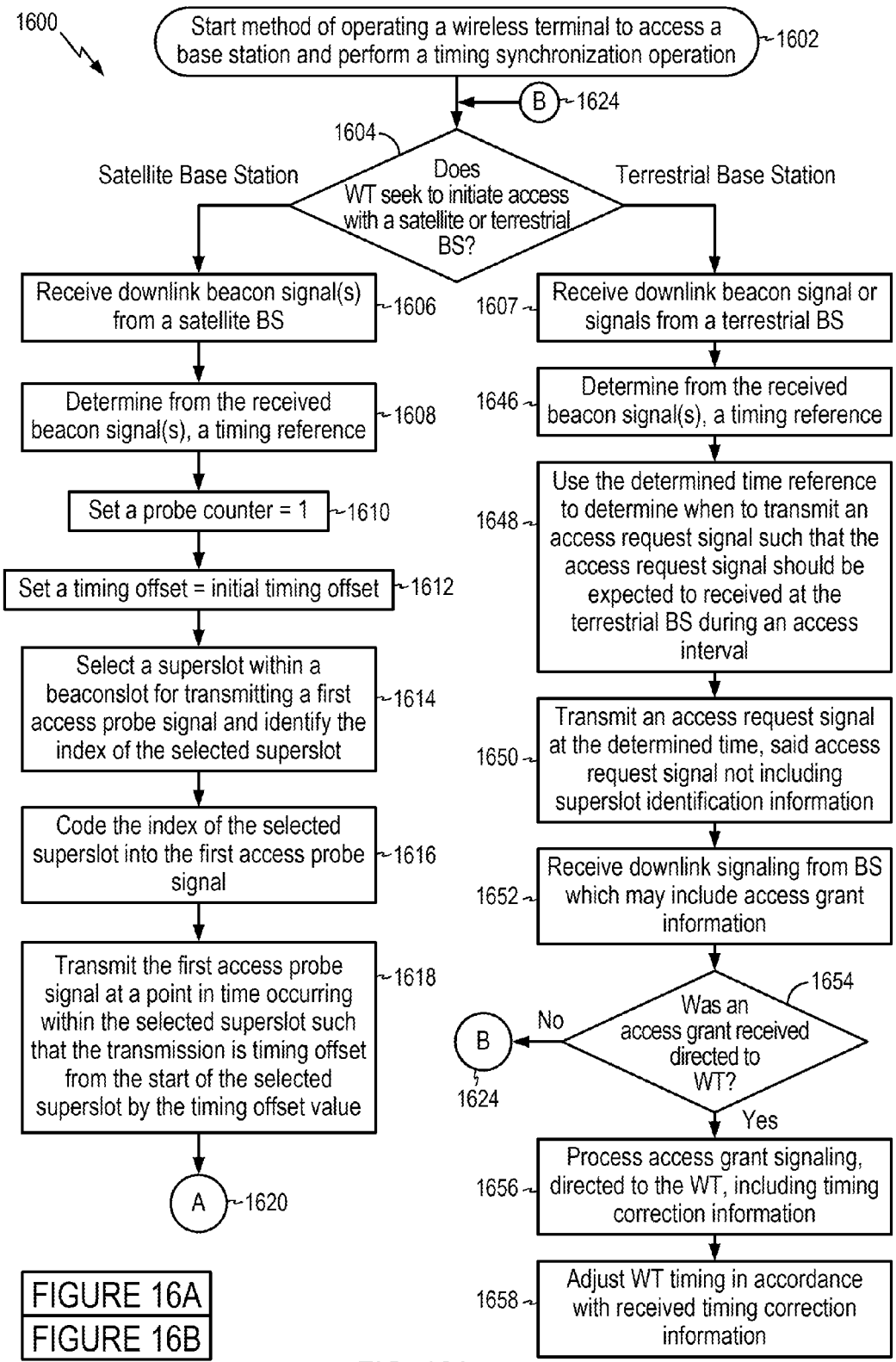

METHODS AND APPARATUS FOR PERFORMING TIMING SYNCHRONIZATION WITH BASE STATIONS

RELATED APPLICATIONS

This application is a division of U.S. patent application Ser. No. 11/184,735 filed on Jul. 18, 2005, titled "METHODS AND APPARATUS FOR PERFORMING TIMING SYNCHRONIZATION WITH BASE STATIONS", which claims priority to U.S. Provisional Patent Application Ser. No. 60/689,910, filed on Jun. 13, 2005, titled "METHODS AND APPARATUS FOR SUPPORTING OFDM UPLINKS WITH REMOTE BASE STATIONS", both of which is hereby expressly incorporated by reference.

FIELD OF THE INVENTION

The present application is directed to methods and apparatus which can be used in implementing an OFDM system which uses OFDM tones for communicating uplink signals to terrestrial and/or satellite base stations.

BACKGROUND

The ability to communicate using a handheld communications device, e.g., a portable telephone, regardless of one's location in a wide area is of great value. The value of such a device is important to military applications as well as in the case of conventional consumer based applications.

Terrestrial base stations have been installed at various earth based locations to support voice and/or data services. Such base stations normally have a coverage area of a few miles at most. Accordingly, the distance between a conventional cell phone and a base station during use is normally only a few miles. Given the relatively small distance between a cell phone and a terrestrial base station during normal use, a hand held cell phone normally has sufficient power to transmit to the base station, e.g., on an uplink, using bandwidth that is relatively wide and, in many cases, capable of supporting relatively high data rates.

In the case of one known system based on the use of terrestrial base stations, a plurality of OFDM tones, e.g., in some cases 7 or more tones, are used in parallel by a wireless terminal to transmit user data to the base stations. In the known system, user data to be communicated via an uplink and control signals to be communicated via an uplink are normally coded separately. In the known system, a wireless terminal may be assigned a dedicated tone for uplink control signaling with uplink traffic segments which correspond to tones being assigned in response to one or more uplink requests transmitted to the terrestrial base station. In the known system uplink traffic channel segment assignment information is broadcast to the wireless terminals which monitor assignment signals that may indicate assignment of uplink traffic channel segments in response to a transmitted request. On a recurring basis, the base station of the known system also broadcasts signals which can be used for timing synchronization with the timing synchronization signals, referred to as beacon signals, recurring over a time period sometimes referred to as a beacon slot.

While terrestrial base stations are useful in areas where the population is sufficient to justify the cost of a terrestrial base station, in many locations on the planet there is insufficient commercial justification to deploy a base station and/or due to geographic issues it is impractical to deploy a permanent terrestrial base station. For example, in physically inhospitable areas such as the open ocean, dessert regions and/or regions which are covered by ice sheets it may be difficult or impractical to deploy and maintain a terrestrial base station.

The lack of base stations in some geographic regions leads to "dead zones" in which it is not possible to communicate using a cell phone. In order to try and eliminate the number of areas where cell phone coverage is missing, companies are likely to continue to deploy new base stations but, for the reasons discussed above, for the foreseeable future there are likely to remain large areas of the planet where cell phone coverage from terrestrial base stations can not be obtained.

An alternative to terrestrial base stations is to use satellites as base stations. Satellite base stations are extremely costly to deploy given the cost of launching satellites. In addition, there is limited space above the planet in which geostationary satellites can be placed. While satellites in geostationary orbit have the advantage of being in a fixed position relative to the earth, lower earth orbiting satellites can also be deployed but such satellites remain costly to deploy and will remain in orbit for a shorter period of time due to their initially lower orbit than a geostationary satellite. The distance from the surface of the earth where a mobile phone may be located and geostationary orbit is considerable, e.g., approximately 22,226 miles although some estimates suggest that 22,300 miles is a better estimate. To put this in perspective, the diameter of the Earth is approximately 7,926 miles. Unfortunately, the distances which signals must travel in the case of satellite base stations is considerable longer than the distance signals normally travel to reach a conventional terrestrial base station which is usually a few miles at most.

As can be appreciated, given the distance to geostationary orbit, it is often necessary to transmit signals to satellites at higher power level than is required to transmit signals to terrestrial base stations. As a result, most satellite phones normally are relatively large and bulky compared to conventional cell phones due to the size of the batteries, power amplifiers and other circuitry which has been used to implement cell phones. The need for a relatively large, and therefore often bulky, power amplifier results, in part, from the fact that many conventional communications systems have a less than ideal peak to average power ratio. The relatively large peak to average power ratio requires that a larger amplifier be included to support peak power output than could be used in the case of the same average power output, but where the peak to average power ratio is lower.

Given the large distance to a satellite base station and/or comparatively large cell size, as compared to a terrestrial base station, uplink timing synchronization used for terrestrial base stations which use OFDM signals in the uplink may not be sufficient to achieve adequate uplink symbol timing synchronization when communicating with a satellite base station. Accordingly, there is a need for improved methods of supporting OFDM uplink signaling including improved timing synchronization methods and/or apparatus which can be used with long round trip delays.

SUMMARY OF THE PRESENT INVENTION

The present invention is directed to communications methods and apparatus which are suitable for use in communications systems including remote base stations and/or base stations with large coverage areas.

The methods and apparatus of the present invention can be used to synchronize uplink transmission timing of a communications device, e.g., a wireless terminal, with base station timing. Beacon signals transmitted in the downlink from the base station can be used to facilitate the timing synchronization process. A wide variety of beacon signals can be used to support the methods and apparatus of the present invention. In some OFDM embodiments, beacon signals are transmitted in the downlink using one or a few tones for one or a few consecutive time periods. In some embodiments beacon signals are implemented as single tone signals which are transmitted for one, two or three consecutive OFDM symbol transmission time periods depending on the particular embodiment.

As will be discussed below, the transmission of signals by communications device to the base station, in OFDM systems, should arrive at the base station to which they are transmitted in a synchronized manner, e.g., with a synchronization level to within a cyclic prefix duration in the case of OFDM symbols which are transmitted with cyclic prefixes.

The methods and apparatus of the invention support and allow for such a level of syncrhronization to be achieved, even with very remote base stations, through a variety of methods and techniques which can be used alone or in combination to achieve the desired level of synchronization. While much of the discussion in the present application focuses on downlink timing structure and beacon slots which occur in the downlink, it should be appreciated that at the base station uplink timing has a fixed known relationship to downlink timing. Received signals and the time at which signals are received at a base station can be measured in terms of downlink transmission slots and downlink symbol transmission timing while the signals are received in the uplink.

The uplink timing structure of the present invention allows for access intervals to occur at periodic intervals during which communications devices which are not synchronized with the base station in terms of uplink transmission timing can make access requests. Such requests may be contention based. The base stations of the invention monitor during the access intervals for access requests and respond with timing correction and/or other information. Access intervals, while an element of the uplink timing structure occur in a fixed known relationship to downlink timing. Each access interval normally has a duration which is less then that of a downlink superslot in duration.

Superslots, in various embodiments each include multiple OFDM symbol transmission time periods, e.g., a fixed number of OFDM symbol transmission time periods. In some, but not necessarily all implementations, each uplink superslot includes an access interval. Access intervals in the uplink occur at fixed known locations relative to the start of downlink superslots and beacon signals which occur in the downlink. Accordingly, the downlink timing structure can be used as a reference for controlling uplink transmission timing as will be discussed further below.

Numerous features of the present invention are directed to timing synchronization. Other features of the present invention are directed to specific access methods and apparatus which can be used to register and achieve timing synchronization with a remote base station, e.g., a base station more than 100 miles from the location of the wireless terminal.

In various embodiments a remote base station is a base station which has a minimum distance from a wireless terminal during use which is measured in terms of tens, hundreds or even thousands of miles. A geostationary satellite base station is one example of a remote base station. Geostationary satellite base stations are positioned thousands of miles above the earth's surface in which case the minimum distance to a communications device on the earth's surface or even in a commercial airplane is measured in thousands of miles. This is in contrast to a near base station which might be a terrestrial base station located within, e.g., up to 50 miles of a wireless terminal during normal use but more typically up to 5 miles.

While the methods and apparatus of the present invention, including the cell phones of the present invention are well suited for use in communications systems which have both terrestrial and satellite base stations, the methods and apparatus of the present invention are well suited for a wide range of communications applications where a large difference in the amount of output power for a fixed amount of bandwidth is required. In the satellite example, it should be appreciated that a far greater amount of output power for a fixed amount of bandwidth is normally required for successful uplink signaling to the satellite base station than is required for successful uplink signaling using the same amount of transmission bandwidth to a terrestrial base station.

Various features of the present invention are directed to methods and apparatus which can be used to implement portable communications devices capable of communicating with both remote and comparatively near base stations, e.g., satellite base stations and terrestrial base stations. A system implemented in accordance with the invention may include a plurality of near and remote base stations. In one such system, terrestrial base stations are used to provide communications coverage with sufficient communications traffic to justify the deployment of a terrestrial base station. Satellite base stations are used to provide fill in coverage in regions where terrestrial base stations are not deployed, e.g., due to the nature of the physical environment, the lack of a site for a base station or for other reasons. Portable communications devices in the exemplary system are capable of communicating with both the terrestrial and satellite base stations, e.g., by switching between different modes of operation.

As will be discussed below, in various embodiments, the system is implemented as an OFDM system. In some embodiments, OFDM signaling is used for uplink as well as downlink signaling. First and second modes of OFDM uplink operation are supported.

During normal operation with terrestrial base stations, the wireless terminal uses multiple tones in parallel in the uplink to transmit user data on multiple tones to a base station simultaneously. This allows relatively high data rates to be supported. When operating in multi-tone mode, the average peak to average power ratio, during portions of time in which user data is transmitted on multiple tones, is a first ratio. As will be discussed below, when operating in a single tone mode of operation, e.g., used for communicating with a satellite base station, a second, lower peak to average power ratio is achieved. Thus, when operating in the single tone mode, the power amplifier can be used in a more efficient manner. In various embodiments, the difference is 4 or more db, and commonly 6 db, in the peak to average power ratio between the multi-tone mode of operation and the single tone mode of operation which is achieved for a period of several symbol times.

Single-tone-mode is a method of operating an OFDM wireless terminal to maximize its uplink power budget coverage under typical power constraints encountered when communicating with terrestrial base stations. This mode is suitable for low rate data of voice links in which multi-tone channels, ACKs are not supported.

In single tone mode the terminal will transmit on an OFDM single tone at a time. This tone is represented as a single, constant logical tone; however, it can, and in various embodiments does, hop from physical tone to physical tone on dwell boundaries as consistent with other OFDM channels used in some systems. In one embodiment, this logical tone replaces a UL-DCCH channel used to communicate with a terrestrial base station thus maintaining compatibility with other OFDM users operating in standard multi-tone mode.

The contents of the single tone uplink channel used by a wireless terminal includes, in some embodiments, a multiplex of control data and user data. This multiplex may be at the field level within a code word, i.e. some bits from a channel coding block are used to represent control data the remainder represent user data. However in other embodiments the multiplexing in the single tone uplink channel is at the code word level, e.g., control data is coded within a channel coding block, user data is coded within a channel coding block, and the blocks are multiplexed together for transmission in the single tone uplink channel. In one embodiment, when the single tone channel is not fully occupied with user data (e.g., during silence suppression of a voice call) it is possible to blank the transmitter during the un-need transmit symbols thereby conserving transmitter power since no signals need be sent during this period. User data may be multiplexed packet data or regularly scheduled voice data, or a mix of the two.

For a terminal operating in single-tone mode, downlink acknowledgement signals can not be transmitted in a separate channel as is done in the multi-tone mode and thus downlink acknowledgements are either multiplexed into the logical single tone uplink channel tone, or ACKs are not used. In such a case, the base station may assume that downlink traffic channel segments have been successfully received with the wireless terminal expressly requesting retransmission if needed.

In accordance with the invention, a wireless terminal operating in single tone mode can achieve a benefit in transmitted power while using standard OFDM components to implement the transmitter. In standard mode, the average power transmitted is normally limited below the peak power capacity of the transmitter's power amp to allow for peak-to-average ratio (PAR), typically 9 dB, and avoid peak clipping which can cause excessive out-of-band emission. In single tone mode, in various embodiments, the PAR is limited to approximately 3 dB thus the average transmit power can be increased by almost 6 dB without increasing the probability of clipping.

At frequency hops (changes in the physical tone corresponding to the single logical tone occur at dwell boundaries), the phase of the transmitted waveform can be controlled to as to be phase continuous across frequencies. This can, and is accomplished in some but not necessarily all embodiments by changing the carrier frequency of the tone during the cyclic extension of the OFDM symbol from one symbol transmitted in the uplink to the next so that the signal phase at the end of the symbol is at a desired value equal to the starting phase of the subsequent symbol. This phase continuous operation will allow the PAR of the signal is bounded at 3 dB.

OFDM over geo-stationary satellite is possible with a few modifications of the basic existing basic OFDM communications protocols. Due to the extremely long round-trip time (RTT) there is little or no value of slaved acknowledgments for traffic channels.

Thus, in some embodiments of the invention, when operating in single tone uplink mode downlink acknowledgment are not sent. In some such embodiments, downlink acknowledgements are replaced with a repeat request mechanism in which a request is transmitted in the UL for a repeat transmission of the data which was not received successfully.

Numerous features, benefits and embodiments of the present invention are discussed in the detailed description which follows.

BRIEF DESCRIPTION OF THE FIGURES

FIG. 8A illustrates an embodiment of where multiple terrestrial base stations are associated with the same satellite base station coverage area, and terrestrial base station location and/or connection information is used to reduce WT/satellite base station timing ambiguity, in accordance with the present invention.

FIG. 16 comprising the combination of FIG. 16

DETAILED DESCRIPTION

Figure 1:
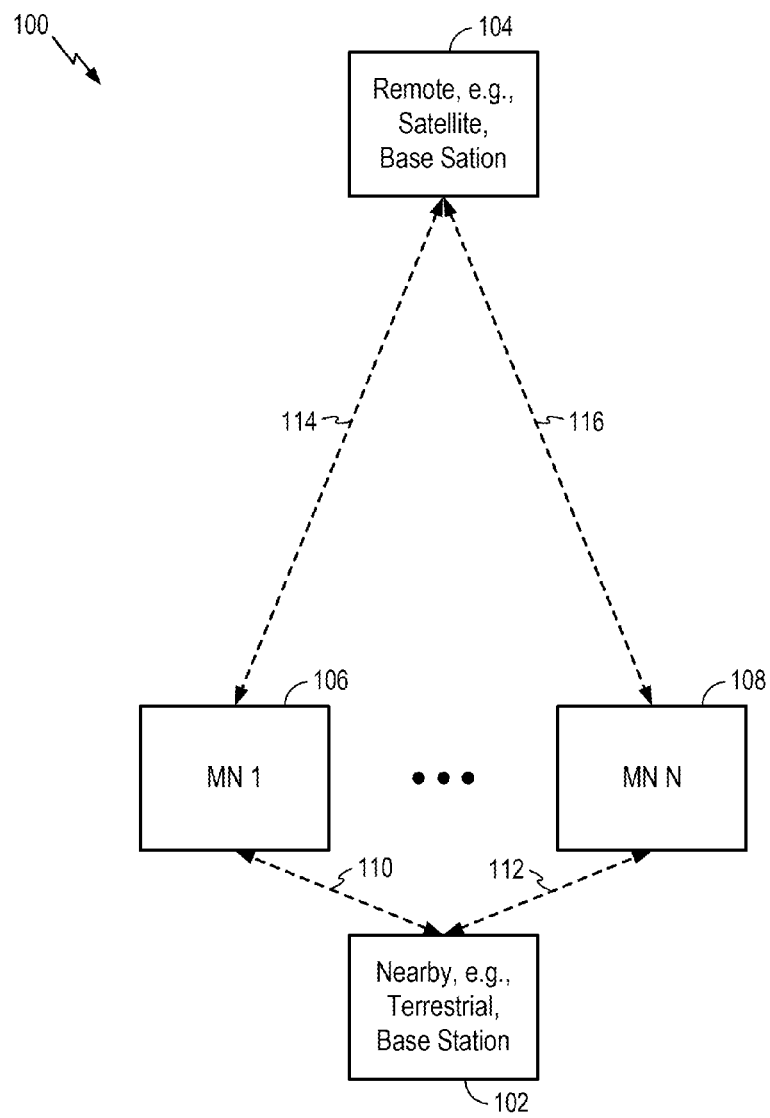
FIG. 1 is a drawing of an exemplary wireless communications system implemented in accordance with the present invention and using methods of the present invention.

FIG. 1 is a drawing of an exemplary wireless communications system 100 implemented in accordance with the present invention and using methods of the present invention. The exemplary system 100 is an exemplary Orthogonal Frequency Division Multiplexing (OFDM) multiple access spread spectrum wireless communications system. The exemplary system 100 includes a plurality of base stations (102, 104) and a plurality of wireless terminals (106, 108), e.g., mobile nodes. The various base stations (102, 104) may be coupled together via a backhaul network. The mobile nodes (NM1 106, MN N 108) may move throughout the system and use a base station, in whose coverage area it is currently located, as it point of network attachment. Some of the base stations are terrestrial based base stations, e.g., BS 102, and some of the base stations are satellite based base stations, e.g., BS 104. From the perspective of the MNs (106, 108), the terrestrial base stations are considered nearby base stations (102) while the satellite based base stations are considered remote base stations (104). The MNs (106, 108) include the capability to operate in two different modes of operation, e.g., an uplink multi-tone mode of operation tailored to the power and timing considerations of communicating with a nearby, e.g., terrestrial base 'station 102 and an uplink single tone mode of operation tailored to the power and timing considerations of communicating with a remote, e.g., satellite, base station 104. At some times, MN1 106 may be coupled to the satellite BS 104 via wireless link 114 and may be operating in an uplink single tone mode of operation. At other times, MN1 106 may be coupled to the terrestrial base station 102 via wireless link 110 and may be operating in a more conventional multi-tone uplink mode of operation. Similarly, at some times, MN N 108 may be coupled to the satellite BS 104 via wireless link 116 and may be operating in an uplink single tone mode of operation. At other times, MN N 108 may be coupled to the terrestrial base station 102 via wireless link 112 and may be operating in a more conventional multi-tone uplink mode of operation.

Other MNs may exist in the system that support communications with one type of base station, e.g., a terrestrial base station 102, but do not support communications with the other type of base station, e.g., the satellite base station 104.

Figure 2:
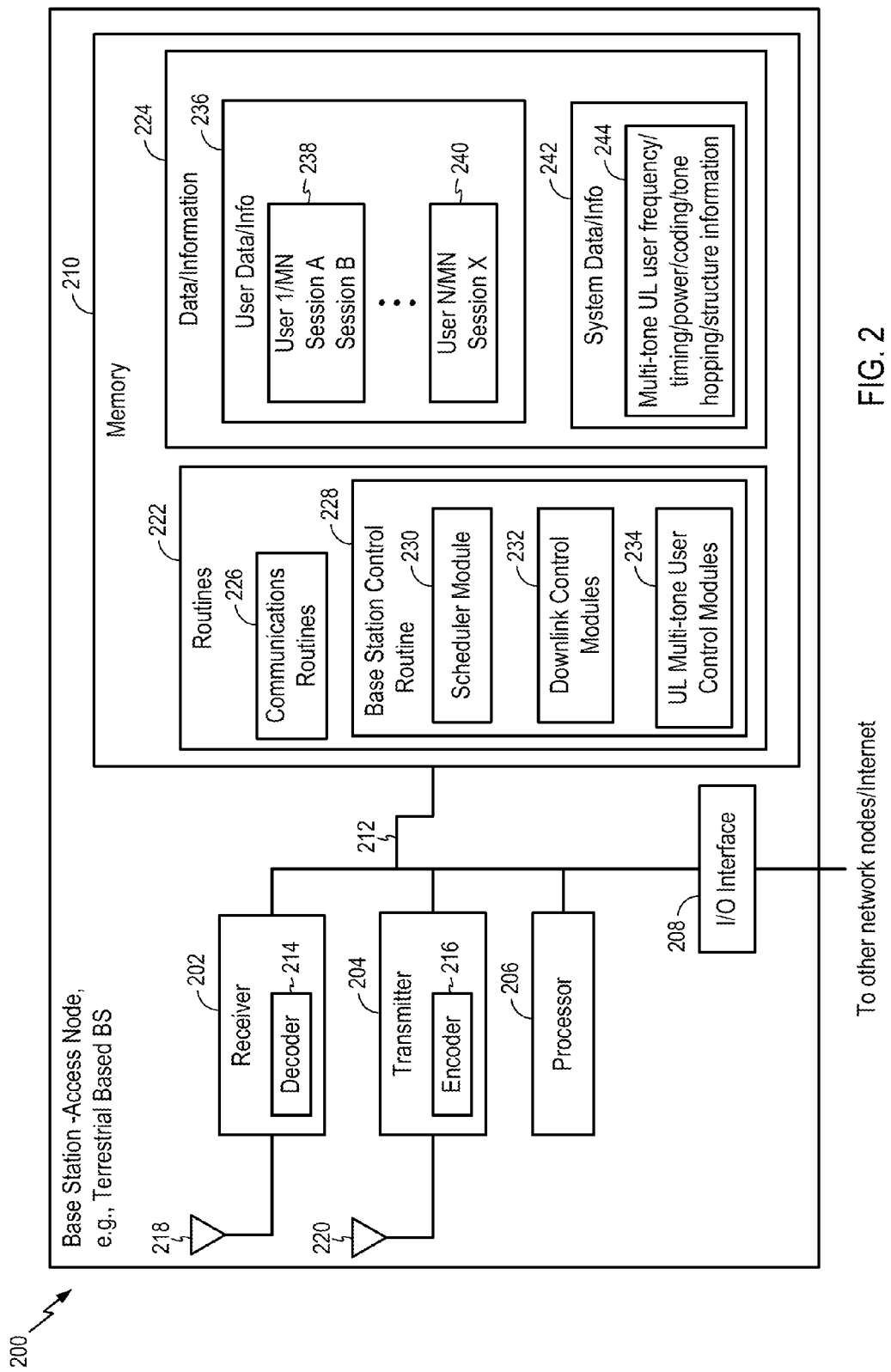
FIG. 2 is a drawing of an exemplary base station, e.g., a terrestrial based base station, implemented in accordance with the present invention and using methods of the present invention.

FIG. 2 is a drawing of an exemplary base station 200, e.g., a terrestrial based base station, implemented in accordance with the present invention and using methods of the present invention. Exemplary base station 200 may be the nearby, e.g., terrestrial, base station 102 of the exemplary system 100 of FIG. 1. The base station 200 is sometimes referred to an access node, as the base station 200 provides network access to WTs. The base station 200 includes a receiver 202, a transmitter 204, a processor 206, an I/O interface 208, and a memory 210 coupled together via a bus 212 over which the various elements may interchange data and information. The receiver 202 includes a decoder 214 for decoding received uplink signals from WTs. The transmitter 204 includes an encoder 216 for encoding downlink signals to be transmitted to WTs. The receiver 202 and transmitter 204 are each coupled to antennas (218, 220) over which uplink signals are received from WTs and downlink signals are transmitted to WTs, respectively. In some embodiments, the same antenna is used for receiver 202 and transmitter 204. The I/O interface 208 couples the base station 200 to the Internet/other network nodes. The memory 210 includes routines 222 an data/information 224. The processor 206, e.g., a CPU, executes the routines 222 and uses data/information 224 in memory 210 to control the operation of the base station 200 and implement the methods of the present invention. Routines 222 include a communications routine 226 and base station control routine 228. The communications routine 226 implements the various communications protocols used by the base station 200. The base station control routine 228 includes a scheduler module 230, which assigns uplink and downlink segments to WTs including uplink traffic channel segments, downlink control modules 232 and uplink multi-tone user control modules 234. Downlink control module 232 controls downlink signaling to WTs including beacon signaling, pilot signaling, assignment signaling, downlink traffic channel segment signaling, and automatic retransmission mechanisms regarding downlink traffic channel segments in accordance with acks/naks received. Uplink multi-tone user control modules 234 control operations related to a WT operating in multi-tone uplink mode, e.g., access operations, operations of receiving and processing uplink traffic channel user data from a WT communicated over multiple, e.g., 7, tones simultaneously in an assigned uplink traffic channel segment, with assignment changing between different WTs over time, timing synchronization operations, and processing of control information from a WT communicated over a dedicated control channel using a dedicated logical tone.

Data/information 224 includes user data/information 236 which includes a plurality of sets of information (user 1/MN session A session B data/information 238, user N/MN session X data/information 240) corresponding to the wireless terminals using the base station 200 as their point of network attachment. Such WT user data/information may include, e.g., WT identifiers, routing information, segment assignment information, user data/information, e.g., voice information, data packets of text, video, music, etc., coded blocks of information. Data/information 224 also includes system information 242 including multi-tone UL user frequency/timing/power/tone hopping/coding structure information 244.

Figure 2A:
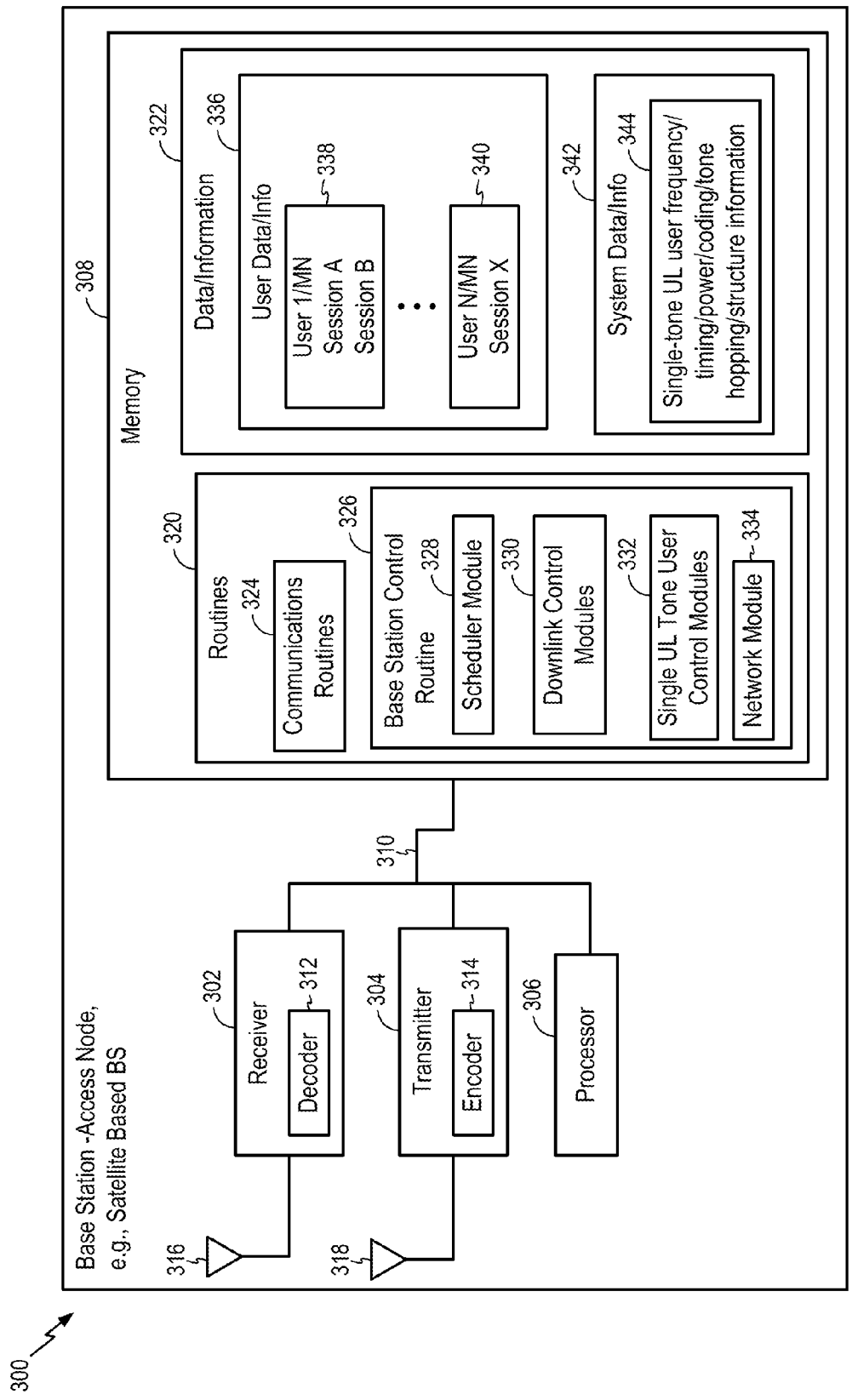
FIG. 2A is a drawing of an exemplary base station, e.g., a satellite based base station, implemented in accordance with the present invention and using methods of the present invention.

FIG. 2A is a drawing of an exemplary base station 300, e.g., a satellite based base station, implemented in accordance with the present invention and using methods of the present invention. Exemplary base station 300 may be BS 104 of exemplary system 100 of FIG. 1. The base station 300 is sometimes referred to an access node, as the base station provides network access to WTs. The base station 300 includes a receiver 302, a transmitter 304, a processor 306, and a memory 308 coupled together via a bus 310 over which the various elements may interchange data and information. The receiver 302 includes a decoder 312 for decoding received uplink signals from WTs. The transmitter 304 includes an encoder 314 for encoding downlink signals to be transmitted to WTs. The receiver 302 and transmitter 304 are each coupled to antennas (316, 318) over which uplink signals are received from WTs and downlink signals are transmitted to WTs, respectively. In some embodiments, the same antenna is used for the receiver 302 and transmitter 304. In addition to communicating with WTs, the base station 300 can communicate with other network nodes, e.g., a ground station with a directional antenna and high capacity link, the ground station coupled to other network nodes, e.g., other base stations, routers, AAA servers, home agent nodes and the Internet. In some embodiments, the same receivers 302, transmitters 304, and/or antennas previously described with BS-WT communication links are used for BS-network node ground station links, while in other embodiments separate elements are used for different functions. The memory 308 includes routines 320 and data/information 322. The processor 306, e.g., a CPU, executes the routines 320 and uses the data/information 322 in memory 308 to control the operation of the base station 300 and implement the methods of the present invention. The memory 308 includes a communications routine 324 and base station control routine 326. The communications routine 324 implements the various communications protocols used by the base station 300. The base station control routine 326 includes a scheduler module 328, which assigns downlink segments to WTs and reschedules downlink segments to WTs in response to received requests for retransmission, downlink control modules 330, single uplink tone user control modules 332, and network module 344. Downlink control module 330 controls downlink signaling to WTs including beacon signaling, pilot signaling, downlink segment assignment signaling, and downlink traffic channel segment signaling. The single UL tone user control modules 332 perform operations including: assigning a single dedicated logical tone to a WT user to be used for uplink signaling including both user data and control information and timing synchronization operations with a WT seeking to use the BS as its point of network attachment. Network module 334 controls operations related to the I/O interface with the network node ground station link.

Data/information 322 includes user data/information 336 which includes a plurality of sets of information (user 1/MN session A session B data/information 338, user N/MN session X data/information 340) corresponding the wireless terminals using the base station 300 as their point of network attachment. Such WT information may include, e.g., WT identifiers, routing information, assigned uplink single logical tone, downlink segment assignment information, user data/information, e.g., voice information, data packets of text, video, music, etc., coded blocks of information. Data/information 322 also includes system information 342 including single-tone UL user frequency/timing/power/tone hopping/coding structure information 344.

Figure 3:
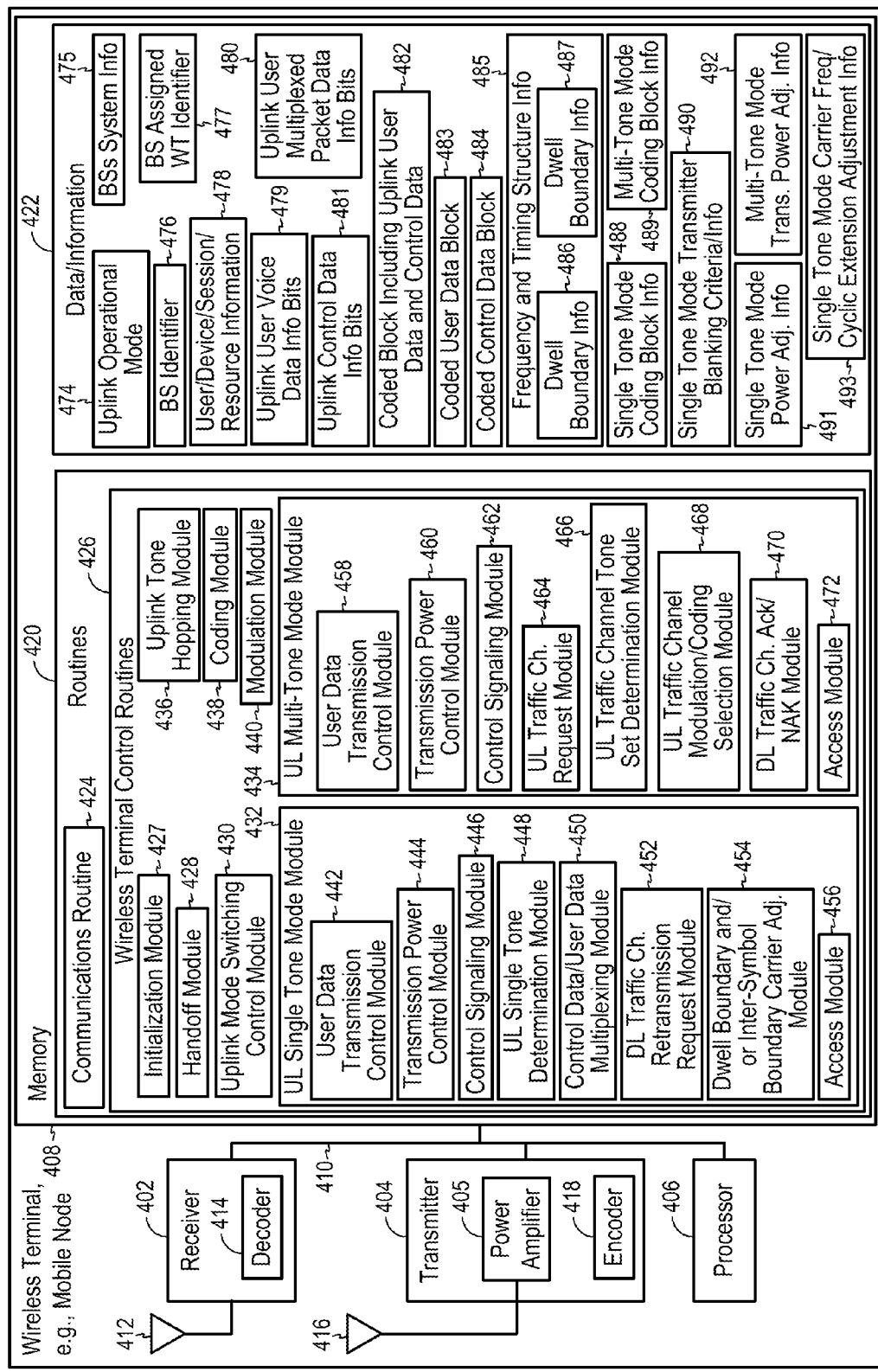
FIG. 3 is a drawing of an exemplary wireless terminal, e.g., mobile node, implemented in accordance in the present invention and using methods of the present invention.

FIG. 3 is a drawing of an exemplary wireless terminal 400, e.g., mobile node, implemented in accordance in the present invention and using methods of the present invention. Exemplary WT 400 may be any of the MNs 106, 108 of the exemplary system 100 of FIG. 1. The exemplary wireless terminal 400 includes a receiver 402, a transmitter 404, a processor 406, and memory 408 coupled together via a bus 410 over which the various elements may interchange data/information. The receiver 402, coupled to a receive antenna 412, includes a decoder 414 for decoding downlink signals received from BSs. The transmitter 404 coupled, to a transmit antenna 416, includes an encoder 418 for encoding uplink signals being transmitted to BSs. In some embodiments, the same antenna is used for the receiver 402 and transmitter 404. In some embodiments, an omni-directional antenna is used.

The transmitter 404 also includes a power amplifier 405. The same power amplifier 405 is used by the WT 400 for both the multi-tone uplink mode of operation and the single tone uplink mode of operation. For example, in the multi-mode uplink operational mode, where the uplink traffic channel segments may typically use 7, 14, or 28 tones simultaneously, the power amplifier needs to accommodate peak conditions where the 28 signals corresponding to the 28 tones simultaneously constructively align, this tends to limit the average output level. However, when the WT 400 is operated in a single uplink tone mode of operation, using the same power amplifier, the concern constructive alignment between signals from different tones is not an issue, and the average power output level for the amplifier can be considerably increased over the multi-tone operational mode. This approach, in accordance with the present invention, allows for a conventional terrestrial mobile node, to be adapted, with minor modifications, and used to communicate uplink signals to a satellite base station at a substantially increased distance.

The memory 408 includes routines 420 and data/information 422. The processor 406, e.g., a CPU, executes the routines 420 and uses the data/information 422 in memory 408 to control the operation of the wireless terminal 400 and implement the methods of the present invention. The routines 420 include a communications routine 424 and wireless terminal control routines 426. The communications routine 424 implements the various communications protocols used by the wireless terminal 400. The wireless terminal control routines 426 include an initialization module 427, a handoff module 428, an uplink mode switching control module 430, uplink single tone mode module 432, uplink multi-tone mode module 434, an uplink tone hopping module 436, a coding module 438, and a modulation module 440.

The initialization module 427 controls operations regarding start-up of the wireless terminal, e.g., including start-up from a power off to a power on state of operation, and operations related to the wireless terminal 400 seeking to establish a wireless communications link with a base station. The handoff module 428 controls operations related to handoffs form one base station to another, e.g., the WT 400 may be currently connected with a terrestrial base station, but be involved in a handoff to a satellite base station. Uplink switching control module 430 controls switching between different modes of operation, e.g., switching from a multi-tone uplink mode of operation to a single tone uplink mode of operation when the wireless terminal switches from communicating with a terrestrial base station to a satellite base station. Uplink single tone mode module 432 includes modules used in the single tone mode of operation with satellite base stations, while UL multi-tone mode module 434 includes modules used in the multi-tone mode of operation with terrestrial base stations.

Uplink single tone mode module 432 includes a user data transmission control module 442, a transmission power control module 444, a control signaling module 446, a UL single tone determination module 448, a control data/user data multiplexing module 450, a DL traffic channel retransmission request module 452, a dwell boundary and/or inter-symbol boundary carrier adjustment module 454, and an access module 456. The user data transmission module 442 controls operations related to uplink user data while in the single tone mode of operation. The transmission power control module 444 controls the transmission of power during the single tone uplink mode to maintain an average peak to average power ratio which is at least 4 dB lower than a peak to average power ratio maintained during said multi-tone uplink mode of operation. The control signaling module 446 controls signaling during the single tone mode of operation, and such control operations include reducing the frequency and/or number of the uplink control signals which are transmitted from the WT 400 when operation switches from the multi-tone mode of operation to the single tone mode of operation. The uplink single tone determination module 448 determines the single logical tone in the uplink timing structure which has been assigned to the WT to be used for uplink signaling, e.g., via an association with a base station assigned WT identifier. The control data/user data multiplexing module 450 multiplexes user data information bits with control data bits providing a combined input that may be coded as a block. The downlink traffic channel retransmission request module 452 issues requests for retransmission of downlink traffic channel segment which were not successfully decoded, e.g., provided the WT deems the data would still be valid given the large delay involved due to the long round trip signaling time. Dwell boundary carrier adjustment module 454 slightly changes the carrier frequency of the tone during the cyclic extension of the OFDM symbol that terminates a dwell so that the signal phase at the end of the symbol is at a desired value equal to the starting phases of the subsequent symbol. In this way, in accordance with a feature of some embodiments of the present invention, at frequency hops, the phase of the transmitted waveform can be controlled to be phase continuous across frequencies. In some embodiments, the frequency adjustment is performed, e.g., as part of a multi-part cyclic prefix included in each of successive OFDM symbols, to provide continuity between successive uplink OFDM symbols transmitted by the WT over the uplink during the single UL tone mode of operation. This continuity between symbols of the signal is advantageous in maintaining peak power level control, which affects the level to which the power amplifier 405 can be driven while in the single tone mode of operation.

The access module 456 controls operations related to establishing a new wireless link with a satellite base station. Such operation may include, e.g., timing synchronization operations including access probe signaling in accordance with various features of some embodiments of the present invention. For geo-stationary satellites with a beam covering a large geographical area there may be significant differences in the round trip time between the center of the beam and the edge. To resolve this RTT ambiguity, a ranging scheme capable of resolving delta-RTT of several milliseconds is used. For example, the timing structure may be divided into different time segments, such as, e.g., superslots, where a superslot represents 114 successive OFDM symbol transmission time intervals, and different coding of the access probe signal may be used for different superslots. This can be used to allow timing ambiguity between the WT and satellite BS to be resolved to within a superslot. In addition, repeated access attempts at various time offsets can be attempted repeatedly to cover the superslot ambiguity, e.g., (<11.4 msec). In some embodiments, position about the last terrestrial BS detected can be used to form an initial round trip time estimate (WT-SAT BS-WT) and this estimate can compress the range used to within the range supported by access signaling typically used with terrestrial base stations.

The uplink multi-tone module 434 includes a user data transmission control module 458, a transmission power control module 460, a control signaling module 462, an uplink traffic channel request module 464, an uplink traffic channel tone set determination module 466, an uplink traffic channel modulation/coding selection module 468, a downlink traffic channel ack/nak module 470, and an access module 472. The user data transmission control module 458 includes operations including controlling transmission of uplink traffic channel segments assigned to the WT.

User data transmission control module 458 controls uplink transmission related operations of user data in the multi-tone mode of operation, wherein user data is communicated in an uplink traffic channel segment, temporarily assigned to the WT, and including signals to be transmitted using multiple tones simultaneously. Transmission power control module 460 controls uplink transmission power levels in the multi-tone mode of uplink operation, e.g., adjusting output power levels in accordance with received base station uplink power control signals and within the capabilities of the power amplifier, e.g., in terms of not exceeding peak power output capability of power amplifier. Control signaling module 462 controls power and timing control signaling operations while in the multi-tone uplink mode of operation, the rate of control signaling being higher than in the single-tone uplink mode of operation. In some embodiments, control signaling module 462 includes the use of a dedicated control channel logical tone dedicated to the WT by the BS, e.g., corresponding to a BS assigned WT identifier, for use in uplink control signaling. Control signaling module 462 may code control information for transmission in uplink control channel segments which do not include user data. UL traffic channel request module 464 generates requests for traffic channel segments to be assigned, e.g., when the WT 400 has user data to communicate on the uplink. UL traffic channel tone set determination module 466 determines the set of tones to use corresponding to an assigned uplink traffic channel segment. The set of tones includes multiple tones to be used simultaneously. In the multi-tone mode of operation, the logical tone set assigned to a WT for communicating uplink traffic channel user data at one time may differ from the logical tone set assigned to the WT for communicating uplink traffic channel user data at a different time, even though the WT may have been assigned the same WT identifier by the same BS. Module 466 can also use tone hopping information to determine the physical tones corresponding to the logical tones. UL traffic channel modulation/coding selection module 468 selects and implements the uplink coding rate and modulation method to be used for an uplink traffic channel segment. For example, in the UL multi-tone mode, the WT may support a plurality of user data rates implemented using different coding rates and/or different modulation methods, e.g., QPSK, QAM 16. DL traffic channel Ack/Nak module 470 controls Ack/Nak determination and response signaling of received downlink traffic channel segments, while in the uplink multi-tone mode of operation. For example, for each downlink traffic channel segment in the downlink timing structure, there may be a corresponding Ack/Nak uplink segment in the uplink timing structure for the UL multi-tone mode of operation, and the WT, if assigned the downlink traffic channel segment sends an Ack/Nak back to the BS conveying the result of the transmission, e.g., to be used in an automatic retransmission mechanism. Access module 472 controls access operations while in the multi-tone mode of operation, e.g., access operations to establish a wireless link with a nearby, e.g., terrestrial base station, and achieve timing synchronization. In some embodiments, the access module 472 for multi-tone mode has a lower level of complexity than the access module 456 for single-tone mode.

Data/information 422 includes uplink operational mode 474, base station identifier 476, base stations system information 475, base station assigned wireless terminal identifier 477, user/device/session/resource information 478, uplink user voice data information bits 479, uplink user multiplexed packet data information bits 480, uplink control data information bits 481, coded block including uplink user data and control data 482, coded user data block, coded control data block 484, frequency and timing structure information 485, single tone mode coding block information 488, multi-tone mode coding block information 489, single tone mode transmitter blanking criteria/information 490, single tone mode transmitter power adjustment information 491, multi-tone mode transmitter power adjustment information 492, and single tone mode carrier frequency/cyclic extension adjustment information 493. The uplink operational mode 474 includes information identifying whether the WT 400 is currently in the multi-tone uplink mode, e.g., for communications with a terrestrial base station or in the single-tone uplink mode, e.g., for communications with a satellite base station. BSs system information 475 includes information associated with each of the base stations in the system, e.g., type of base station satellite or terrestrial, carrier frequency or frequencies used by the base station, base station identifier information, sectors in the base station, timing and frequency uplink and downlink structures used by the base station, etc.

BS identifier 476 includes an identifier of the BS the WT 400 is using as its current point of network attachment, e.g., distinguishing the BS from other BSs in the overall system. BS assigned WT identifier 477 may be an identifier, e.g., a value in the range 0 . . . 31, assigned by the BS being used as the WTs point of network attachment. In the single tone-tone uplink mode of operation, the identifier 477 may be associated with a single dedicated logical tone in the uplink timing structure to be used by the WT for uplink signaling including both user data and control data. In the multi-tone uplink mode of operation, the identifier 477 may be associated with a logical tone in the uplink timing structure to be used by the WT for a dedicated control channel for uplink control data. The BS assigned WT identifier 477 may also be used by the BS when making segment assignments, e.g., of an uplink traffic channel segment in the multi-tone mode of uplink operation.

User/device session/resource information 478 includes user and device identification information, routing information, security information, ongoing session information, and air link resource information. Uplink user voice data information bits 479 include input user data corresponding to a voice call. Uplink user multiplexed packet data information bits 480 includes input user data, e.g., corresponding to text, video, music, a data file, etc. Uplink control data information bits 481 includes power and timing control information that the WT 400 desires to communicate to the BS. Coded block including uplink user data and control bits 482 is the coded output block corresponding to a mixture of user information bits 478 and/or 479 in combination with control information bits 481, which is formed in some embodiments during the UL single tone mode of operation. Coded user data block 483 is a coded block of user information bits 478 and/or 479, while coded control data block 484 is a coded block of control information bits 481. Data and control information are coded separately in the UL multi-tone mode of operation, and in some embodiments, of the UL single tone mode of operation. In some embodiments of the single-tone mode of operation where coding between uplink user data and uplink control data is separate, the ability to blank the transmitter, when there is no user data to communicate, is facilitated. Single tone mode transmitter blanking criteria/information 490 is used in the blanking decisions, e.g., applying no output transmitter power on the single uplink tone during some intervals dedicated to user data, where there is no data to communicate, e.g., due to a lull in an ongoing conversation. This approach of transmitter blanking results in power saving for the wireless terminal, an important considerations where the average power output is relatively high to facilitate communications with a satellite in geo-stationary orbit. In addition, levels of interference may be reduced.

Single tone mode coding block information 488 includes information identifying the coding rate and modulation method used for the uplink in the single tone mode of operation, e.g., a low coding rate using QPSK modulation, e.g., supporting at least 4.8 KBits/sec. Multi-tone mode coding block information 489 includes a plurality of different data rate options that are supported for uplink traffic channel segments in the uplink during the multi-tone mode of operation, e.g., various coding rates and modulation schemes including QAM4, e.g., QPSK, and QAM16, such as to support at least the same coding rate as in the single tone mode plus some additional higher data rates.

Frequency and timing structure information 485 includes dwell boundary information 486 and tone hopping information 487, corresponding to the BS being used as the point of network attachment. Frequency and timing structure information 485 also includes information identifying logical tones within the timing and frequency structure.

Single tone mode transmitter power adjustment information 491 and multi-tone mode power adjustment information 492 includes information such as peak power, average power, peak to average power ratio, maximum power levels, for operation and control of the power amplifier 405, when in the single tone mode and multi-tone mode of operation, respectively. Single tone mode carrier frequency cyclic extension adjustment information 493 includes information used by the dwell boundary and/or inter-symbol boundary carrier adjustment module 454 to implement continuity between signals at symbol boundaries in the uplink during the single tone mode of operation, e.g., especially during hops at a dwell boundary from one physical tone to another.

Figure 4:
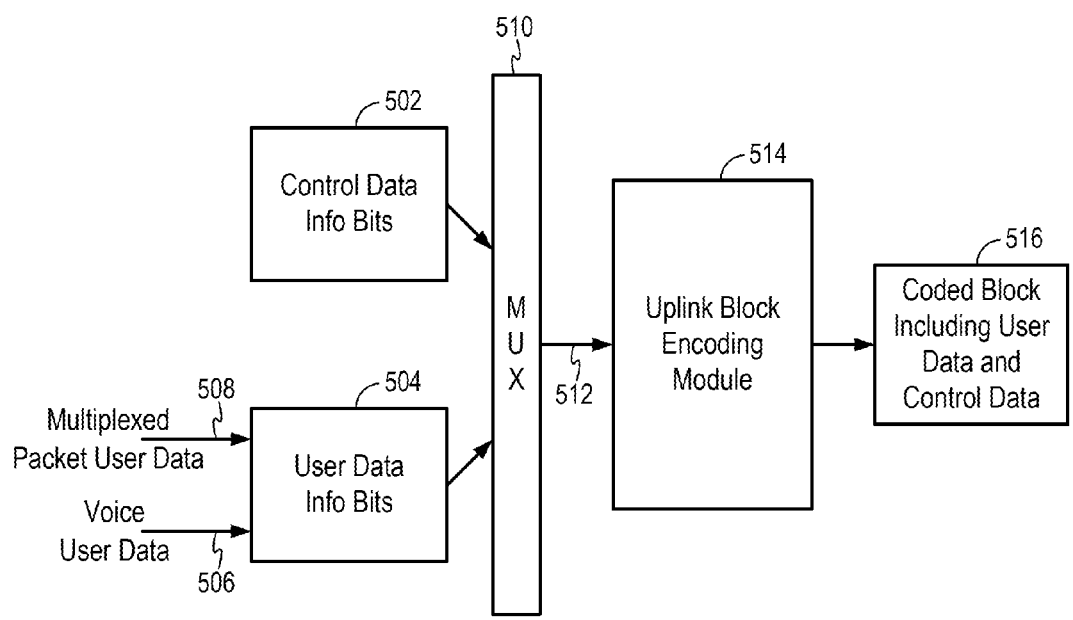
FIG. 4 is a drawing illustrating exemplary uplink information bit encoding for an exemplary WT, e.g., MN, operating in a single-tone uplink mode of operation, in accordance with various embodiments of the present invention.

FIG. 4 is a drawing 500 illustrating exemplary uplink information bit encoding for an exemplary WT, e.g., MN, operating in a single-tone uplink mode of operation, in accordance with various embodiments of the present invention. A logical tone, in the uplink frequency structure, is assigned directly or indirectly, e.g., by the base station, to the WT. For example, the BS may assign the single-tone mode WT a user identifier that may be associated with a specific dedicated logical tone. For example, the logical tone may be the same logical tone used as a dedicated control channel (DCCH) tone, if the WT is in a multi-tone mode of operation, e.g., where the WT normally communicates uplink traffic channel information using seven or more tones at the same time. The logical tone may be mapped to a physical tone in accordance with tone hopping information known to both the base station and the WT. Tone hopping between different physical tones may occur on dwell boundaries, where a dwell may be a fixed number, e.g., seven, of consecutive OFDM symbol transmission time intervals in a timing structure used in the uplink. The same logical tone in the uplink frequency structure is used in the single-tone mode of operation to convey both control information bits 502 and user data information bits 504. The control information bits 502 may include, e.g., power and timing control information. The user data bits 504 may include voice user data information bits 506 and/or multiplexed packet user data bits 508. A multiplexer 510 is used to receive the control data information bits 502 and the user data information bits 504. The output 512 of the multiplexer 510 is an input to an uplink block encoding module 514 which encodes the combination of control and user information bits and outputs a coded block of coded bits 516. The coded bits are mapped onto modulation symbols, in accordance with the uplink modulation scheme used, e.g., a low rate QSPK modulation scheme, and the modulation symbols are transmitted using the physical tone corresponding to the assigned logical tone. The uplink rate is such as to support at least one single voice call. In some embodiments, the uplink user information rate is at least 4.8 Kbits/sec.

Figure 5:
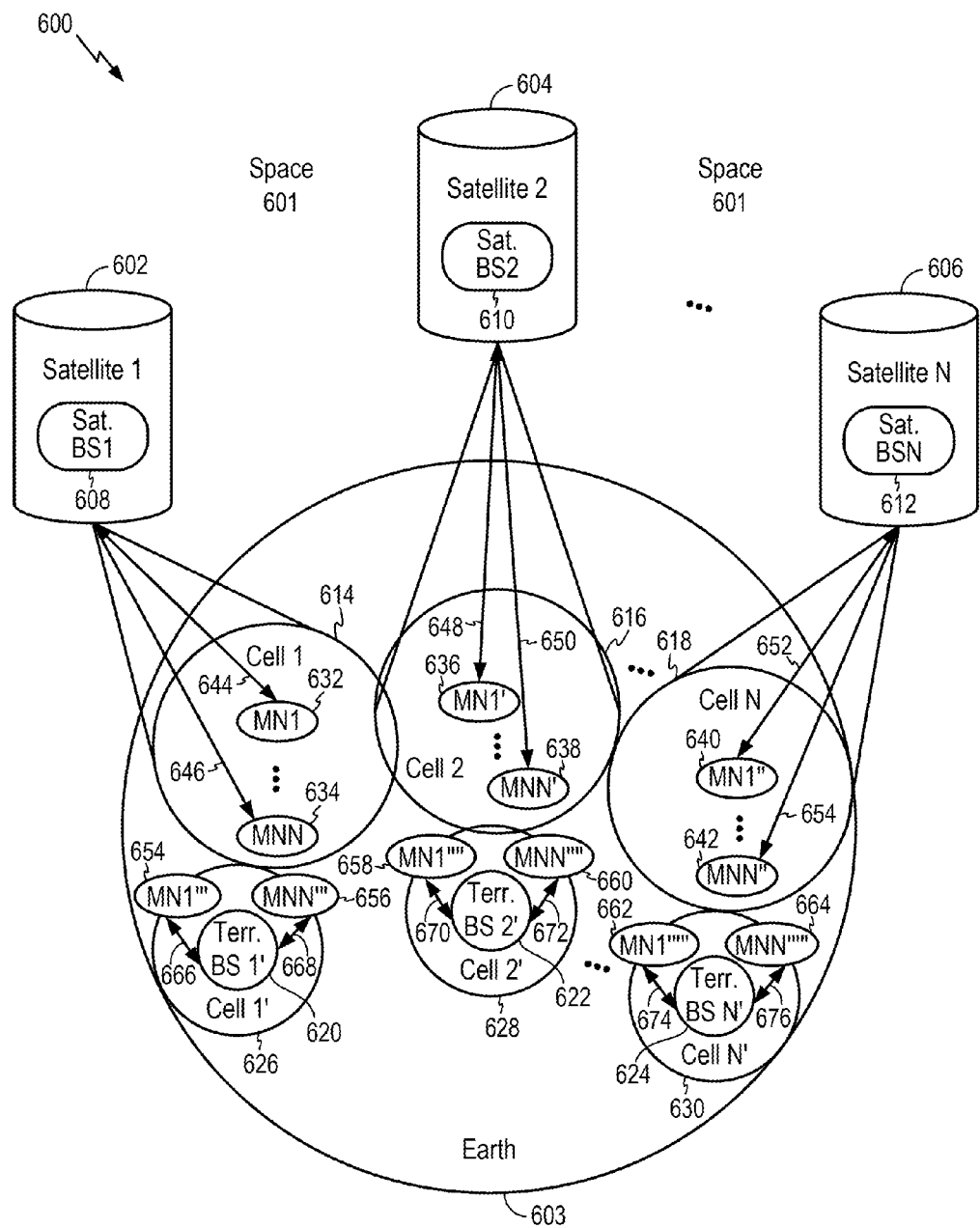
FIG. 5 is a drawing illustrating an exemplary OFDM wireless multiple access communications system including a hybrid of base stations that are both terrestrial based and space based, in accordance with various embodiments of the present invention.

FIG. 5 is a drawing illustrating an exemplary OFDM wireless multiple access communications system 600 including a hybrid of base stations that are both terrestrial based and space based, in accordance with various embodiments of the present invention. Each satellite (satellite 1 602, satellite 2 604, satellite N 606) includes a base station (satellite base station 1 608, satellite base station 2 610, satellite base station N 612), implemented in accordance with the present invention and using methods of the present invention. The satellites (602, 604, 608) may be, e.g., geo-stationary satellites, located in space 601 in a high earth orbit of approximately 22,300 mi around the equator of the earth 603. The satellites (602, 604, 606) may have corresponding cellular coverage areas on the surface of the earth (cell 1 614, cell 2 616, cell N 618), respectively. The exemplary hybrid communications system 600 also includes a plurality of terrestrial base station (terrestrial BS 1' 620, terrestrial BS 2' 622, terrestrial BS N' 624), each with a corresponding cellular coverage area (cell 1' 626, cell 2' 628, cell N' 630), respectively. Different cells or portions of different cell may or may not overlap with one another either partially or completely. Typically, the size of a terrestrial base stations cell is smaller than the size of a satellite's cell. Typically, the number of terrestrial base stations exceeds the number of satellite base stations. In some embodiments, many relatively small terrestrial BS cell are located within a satellites relatively large cell. For example, in some embodiments, terrestrial cells have a typical radius of 1-5 mi, while satellite cells typically have a radius of 100-500 mi. A plurality of wireless terminals, e.g., user communications devices such as cell phones, PDA, data terminals, etc., implemented in accordance with the present invention and using methods of the present invention exist in the system. The set of wireless terminals may include stationary nodes and mobile nodes; the mobile nodes may move throughout the system. A mobile node may use a base station, in whose cell it currently resides, as its point of network attachment. In some embodiments, the terrestrial BSs are used by the WTs as the default type of base station to first try to use in locations where access could be provided by either a terrestrial or satellite base station, with the satellite base stations being used primarily to provide access in those areas not covered by a terrestrial base station. For example, in some areas it may be impractical to install a terrestrial base station for economic, environmental, and/or terrain reasons, e.g., due to low population density, due to rugged inhospitable terrain, etc. In some terrestrial base station cells, there may be dead spots, e.g., due to obstructions such as mountains, high buildings, etc. In such dead spot locations satellite base stations could be used to fill in the gaps in coverage to provide the WT user with more seamless overall coverage. In addition, priority considerations, and user subscribed tier levels are used, in some embodiments, to determine access to satellite base stations. The base stations are coupled together, e.g., via a backhaul network, providing interconnectivity for the MNs located in different cells.

MNs communicating with a satellite base station may be operating in a single-tone mode of operation where a single tone is used for the uplink, e.g., supporting a voice channel. In the downlink, a larger set of tones may be used, e.g., 113 downlink tones, which are received and processed by the WT. For example, in the downlink the WT may be assigned temporarily, as needed, a downlink traffic channel segment using a plurality of tones simultaneously. In addition, the WT may receive control signaling simultaneously over different tones. Cell 1 614 includes (MN1 632, MN N 634) communicating with satellite BS 1 608 via wireless links (644, 646), respectively. Cell 2 616 includes (MN1' 636, MN N' 638) communicating with satellite BS 2 610 via wireless links (648, 650), respectively. Cell N 618 includes (MN1" 640, MN N' 642) communicating with satellite BS N 612 via wireless links (652, 654), respectively. In some embodiments, the downlink between the satellite BS and the MN supports a higher rate of user information than the corresponding uplink, e.g., supporting voice, data, and/or digital video broadcast in the downlink. In some embodiments, the downlink user data rate provided a WT, using a satellite BS as its point of network attachment, is approximately the same as the uplink user data rate, e.g., 4.8 Kbit/sec, thus supporting a single voice call, but tending to conserve power resources of the satellite base station.

MNs communicating with a terrestrial base stations may be operating in a conventional mode of operation, e.g., where multiple tones, e.g., seven or more, are used simultaneously for uplink traffic channel segments. Cell 1' 626 includes (MN 1''' 1 654, MN N''' 656) communicating with terrestrial BS 1' 620 via wireless links (666, 668), respectively. Cell 2' 628 includes (MN1''' 658, MN N''' 660) communicating with terrestrial BS 2 622 via wireless links (670, 672), respectively. Cell N' 630 includes (MN1'''' 662, MN N'''' 664) communicating with terrestrial BS N' 624 via wireless links (674, 676), respectively.

Figure 6:
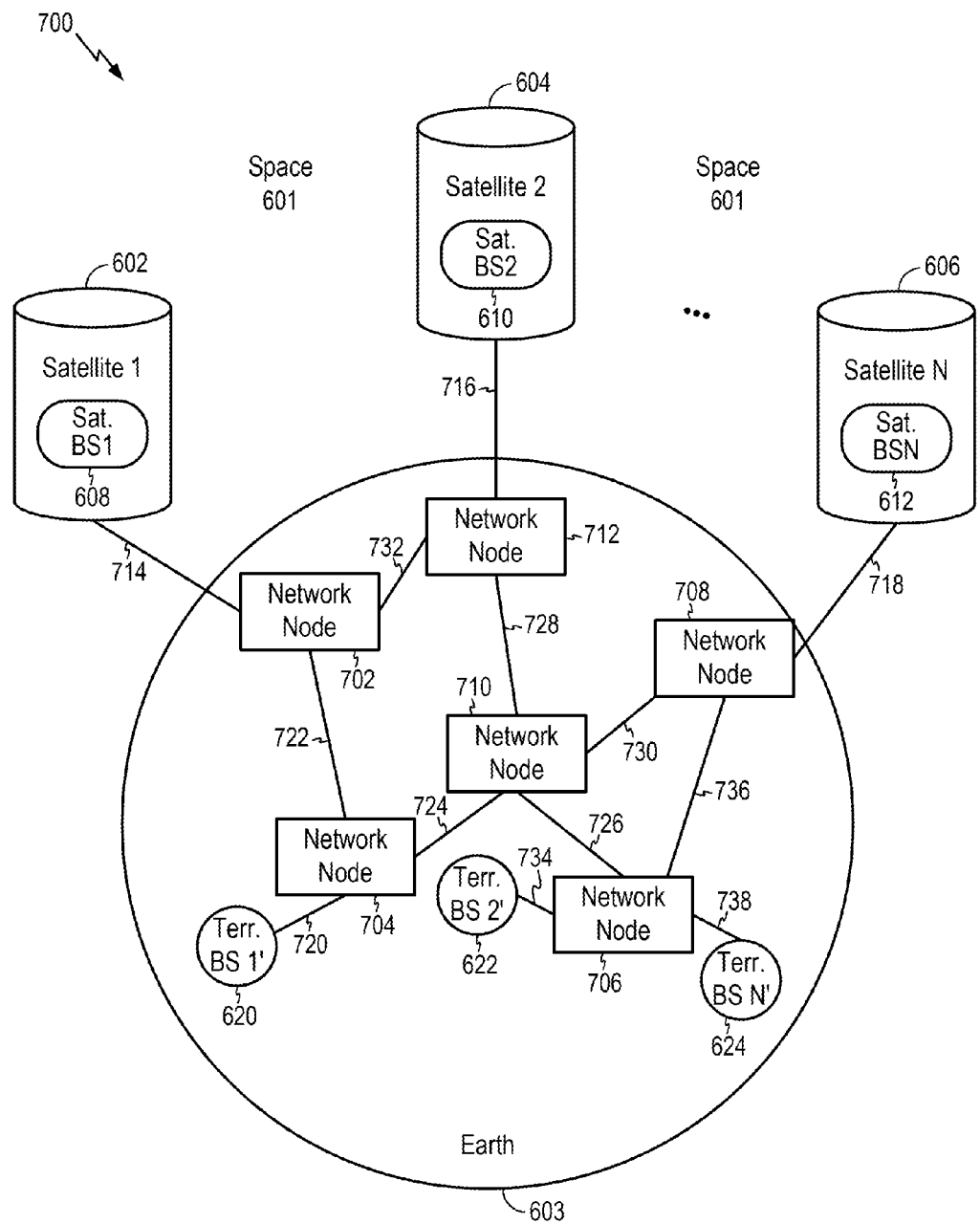
FIG. 6 is a drawing showing exemplary backhaul interconnectivity between the various satellite based and terrestrial based base stations of FIG. 5.

FIG. 6 is a drawing showing exemplary backhaul interconnectivity between the various satellite based and terrestrial based base stations of FIG. 5. Various network nodes (702, 704, 706, 708, 710, 712) may, include, e.g., routers, home agent nodes, foreign agent nodes, AAA server nodes, and satellite tracking/high communications data rate capacity ground stations for supporting and communicating with the satellites over the backhaul network. The links (714, 716, 718) between the network nodes (702, 716, 718) serving as ground stations and the satellite base stations (608, 610, 612) may be wireless links using directed antennas while, the links (720, 722, 724, 726, 728, 730, 732, 734, 736, 738) between the terrestrial nodes may be wire and/or wireless links, e.g., fiber optic cables, broadband cables, microwave links, etc.

Figure 7:
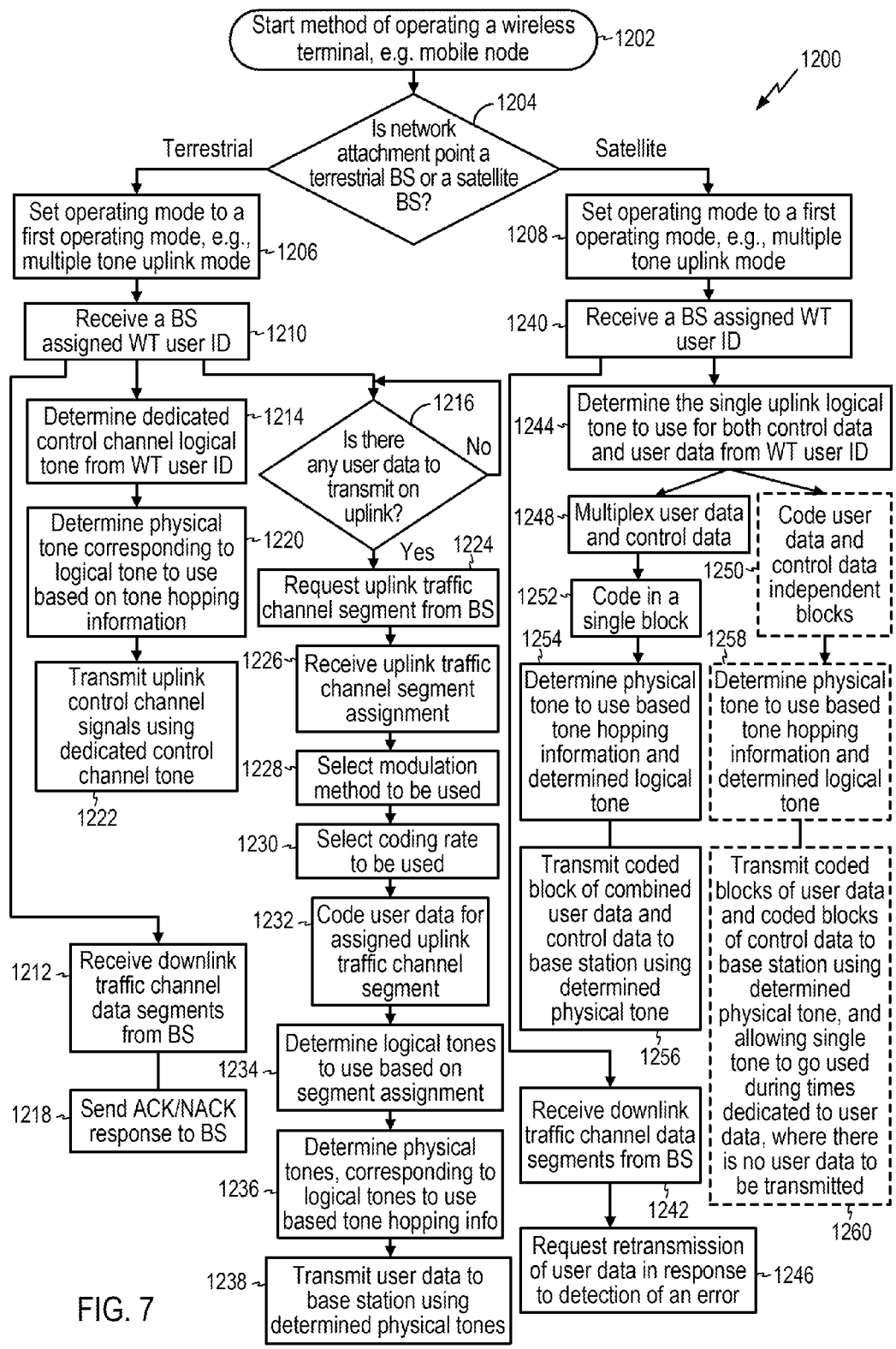
FIG. 7 is a flowchart of an exemplary method of operating a wireless terminal, e.g., mobile node, in accordance with the present invention.
Figure 7A:
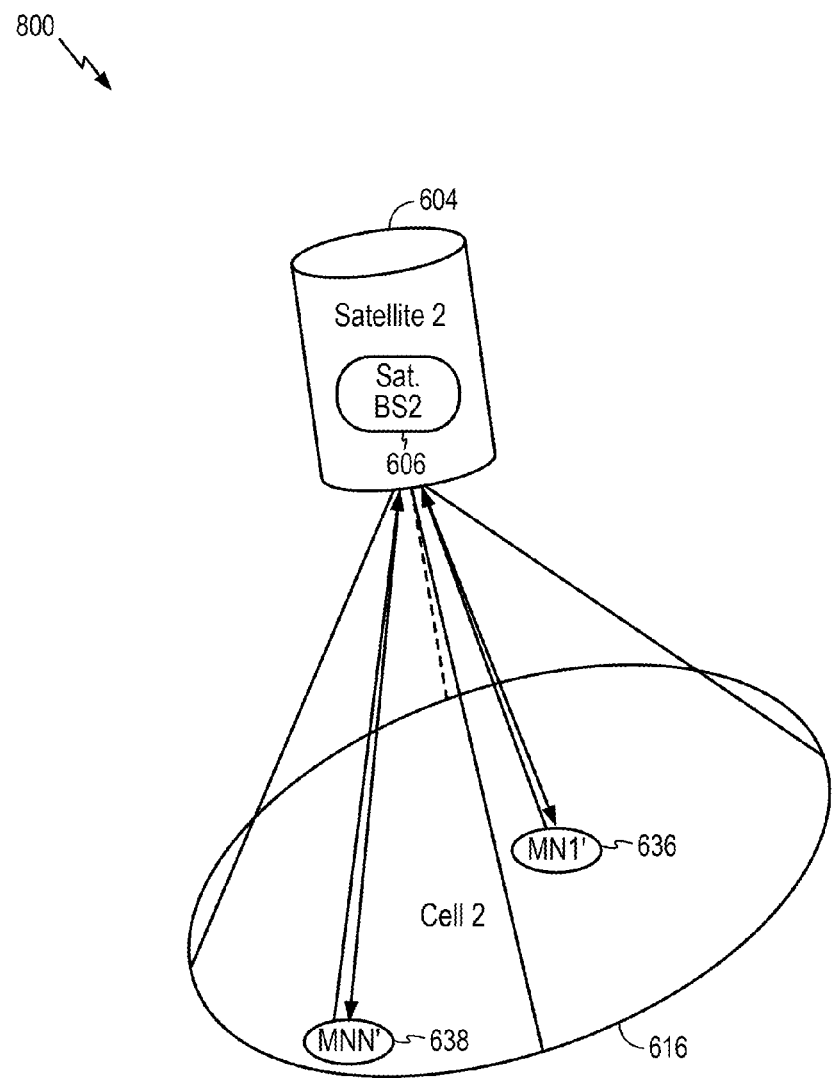
FIG. 7A is a drawing illustrating relatively long round trip signaling times and significantly different signal path lengths between an exemplary satellite base station and different mobile nodes located at different points in the satellite base station's cellular coverage area on the surface of earth, resulting in timing synchronization considerations, which are addressed in accordance with methods and apparatus of the present invention.

FIG. 7A is a drawing 800 illustrating an exemplary satellite 2 604 including its exemplary satellite base station 608 and corresponding cellular coverage area (cell 2) 616 on the surface of the earth. MN 1' 636 is located near the center of the cell 616 and is closer to the satellite 604 than is MN N' 638 which is situated near the outer perimeter of the cell 616. In this example, the beam from the satellite covers a large geographic area, and there is a significant difference in the round trip time (RTT) (WT-BS-WT) for the two different MNs, with MN1' 636 having the shorter RTT. To resolve TRR ambiguity, in accordance with the present invention, a ranging scheme capable of resolving delta-RTT of several milliseconds is implemented.

Typically, in a conventional, mode of operation, there are access intervals built-in to the system's timing structure where WTs, which may not be precisely timing synchronized or power controlled, may send a request signal on an uplink tone, e.g., a contention based uplink tone, to connect and synchronize with a base station and to use that BS as its point of network attachment. One exemplary scheme of resolving RTT considerations for the satellite based one-tone, in accordance with various embodiments, of the present invention, using the access interval, e.g., the same access interval used in the conventional mode of operation, with additional time varying coding on the access tone set to indicate which forward link super slot the reverse-link transmission is associated with. This coding can be used to resolve ambiguity to the superslot level. For example, a superslot may be approximately 11.4 msec in duration corresponding to 114 successive OFDM symbol transmission time intervals. The wireless terminal may need to try repeated access attempts at varying time offsets to cover the super-slot (<11.4 msec) ambiguity.

Figure 8:
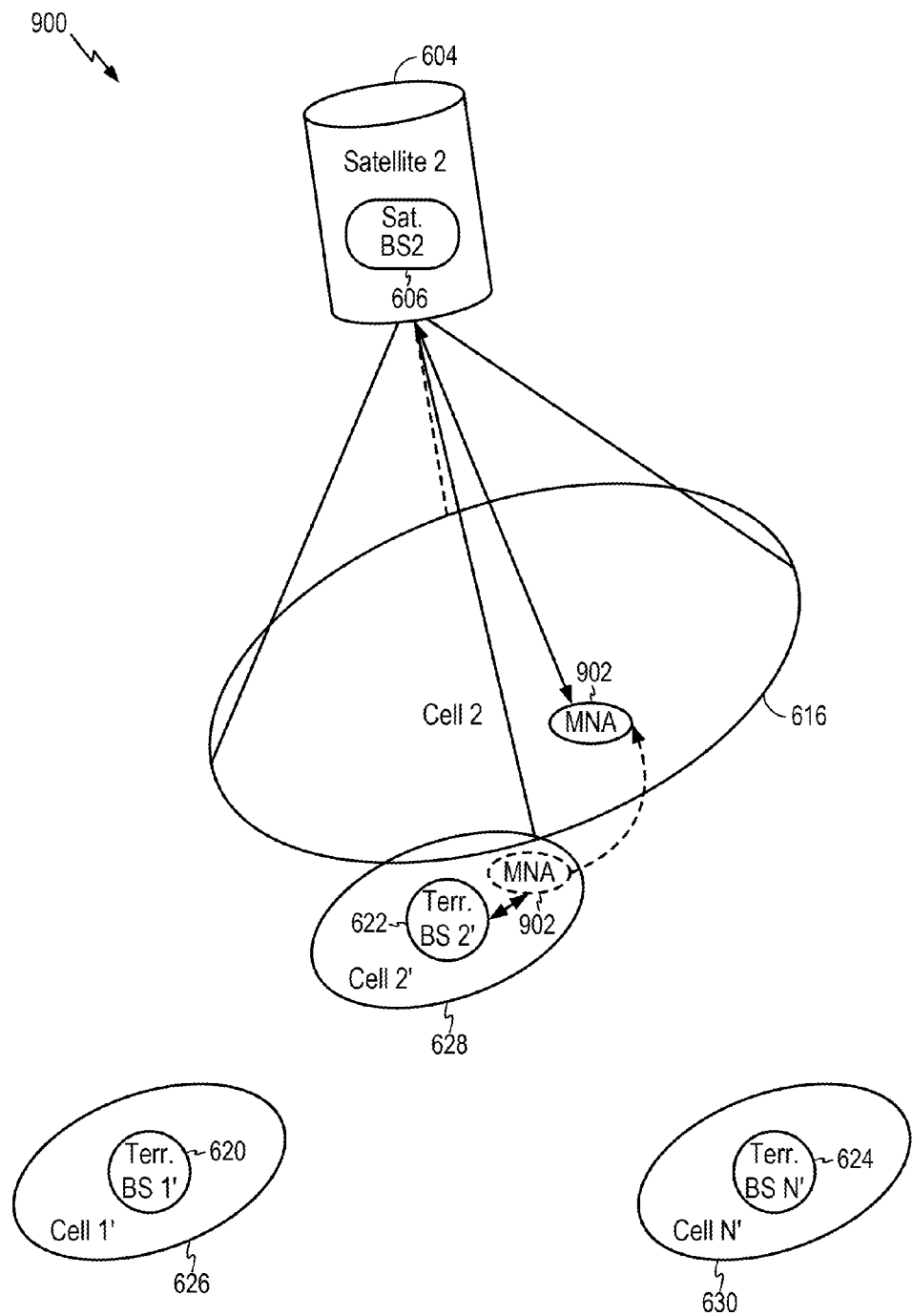
FIG. 8 illustrates an exemplary hybrid system including both terrestrial and satellite based base stations and a wireless terminal utilizing terrestrial base station location information to reduce round trip timing ambiguity with respect to a satellite base station.

FIG. 8 illustrates a drawing 800 of an exemplary hybrid system including both terrestrial and satellite based base stations and a wireless terminal utilizing terrestrial base station location information to reduce round trip timing ambiguity with respect to a satellite base station. Exemplary WT (MNA) 902 has been previously connected to terrestrial BS 2' 622 in cell 2' 628, but has moved into cell 2 616 covered by satellite BS 2. MN A 902 seeks to establish a wireless link with the satellite BS 2 608 but needs to resolve timing ambiguity. In accordance with a feature of the present invention, the WT includes information associating the position of terrestrial base stations with cells of satellite base stations. In some embodiments, multiple terrestrial base stations may be associated with the same satellite cell coverage area (See FIG. 8A). MNA 902 uses information about the position of the last terrestrial base station 622 detected to form an initial RTT estimate. In this manner, in accordance with the invention, the ambiguity associated with the RTT can be compressed. In some such embodiments, the ambiguity can be compressed to within the range supported by the access protocol used with a terrestrial base station.

FIG. 8A illustrates an exemplary embodiment, in accordance with the present invention, where multiple base stations are associated with the same satellite coverage area. Three exemplary base stations are shown for the purposes of illustration, although it is understood that in general there may be many more terrestrial base stations within or associated with a satellite base station's cellular coverage area, as a terrestrial BS may typically have a cellular cover area on the surface of the earth with a radius of approximately 1-5 mi while a satellite may typically have a cellular coverage area on the surface of the earth with a radius of approximately 100-500 mi. Terrestrial base stations (BS A 956, BS B 958, BS C 960) with corresponding cells (962, 964, 966) are associated with the coverage area (cell D 954) corresponding to satellite D 950, which includes satellite BS D 952. A wireless terminal, which does not know its precise position and is seeking to establish a connection with satellite D BS 952 can estimate its round trip signal time based on known position information of the location of terrestrial base stations, the known position of the satellite base station in geo-stationary orbit, and signaling information with regard to terrestrial base stations, e.g., using the known position of the last terrestrial base station to which the WT was connected as a starting point. For example, terrestrial BS A 956, which is located near the outer limit of the cell 954 may correspond to an estimated value representing the longest RTT, terrestrial BS B 958 located at an intermediate point between the outer limit of the cell and the center of the cell may represent an intermediate RTT, while terrestrial BS C 960 located near the center of the cell 954 may represent the shortest RTT.

FIG. 7 is a flowchart 1200 of an exemplary method of operating a wireless terminal, e.g., mobile node, in accordance with the present invention. The wireless terminal may be one of a plurality of first type wireless terminals in an exemplary wireless OFDM multiple access spread spectrum communications system including a plurality of base stations, some base stations being terrestrial based and some base stations being satellite based, said first type wireless terminals being capable of communicating with both terrestrial base stations and satellite base stations. The exemplary communications system may also include exemplary second type wireless terminals which can communicate with terrestrial base stations, but cannot communicate with satellite base stations.

Operation of the method of flowchart 1200 starts in step 1202 in response to a wireless terminal having powered on or in response to a handoff operation. Operation proceeds from start step 1202 to step 1204. In step 1204, the wireless terminal determines whether the network attachment point, that it intends to use as its new point of network attachment, is a terrestrial base station or a satellite base station. If it is determined in step 1204 that the new network attachment point is a terrestrial base station then operation proceeds to step 1206, where the wireless terminal sets its operating mode to a first operating mode, e.g., a multiple tone uplink mode of operation. However, if it is determined in step 1204 that the new network attachment point is a satellite base station, then operation proceeds to step 1208, where the wireless terminal sets its operating mode to a second operating mode, e.g., a one tone uplink mode of operation.

Returning to step 1206, operation proceeds from step 1206 to step 1210, where the WT having been accepted by the new terrestrial base station, receives a base station assigned wireless terminal user identifier. Operation proceeds from step 1210 to step 1212, 1214, and 1216. In step 1212, the WT is operated to receive signals corresponding to downlink traffic channel segments, conveying downlink user data, from the terrestrial base station. Operation proceeds from step 1212 to step 1218, where the WT sends an Acknowledgment/Negative Acknowledgment (Ack/Nak) response signal to the base station.

Returning to step 1214, in step 1214, the WT determines a dedicated control channel logical tone from the WT user ID received in step 1212. Operation proceeds from step 1214 to step 1220. In step 1220, the WT determines the physical tone corresponding to the logical tone to use based upon tone hopping information. For example, the WT assigned ID variable may have a range of 32 values (0 . . . 31), each ID corresponding to a different single logical tone in a uplink timing structure, e.g., an uplink timing structure including 113 tones. The 113 logical tones may be hopped in accordance with an uplink tone hopping pattern within the uplink timing structure. For example, excluding access intervals, the uplink timing structure may be subdivided into dwell intervals, each dwell interval having a duration of a fixed number, e.g., seven, successive OFDM symbol transmission time intervals, and tone hopping occurs at the dwell boundaries but not in-between. Operation proceeds from step 1220 to step 1222. In step 1222, the WT is operated to transmit uplink control channel signals using the dedicated control channel tone.

Returning to step 1216, in step 1216, the WT checks as to whether there is user data to transmit on the uplink. If there is no data waiting to be transmitted, operation proceeds back to step 1216, where the WT continues to check for data to transmit. However, if in step 1216, it is determined that there is user data to transmit on the uplink, then operation proceeds from step 1216 to step 1224. In step 1224, the WT requests an uplink traffic channel assignment from the terrestrial base station. Operation proceeds from step 1224 to step 1226. In step 1226, the WT receives an uplink traffic channel segment assignment. Operation proceeds to step 1228, where the WT selects a modulation method to use, e.g., QPSK or QAM16. In step 1230, the WT selects a coding rate to be used. Operation proceeds from step 1230 to step 1232, where the WT codes the user data for the assigned uplink traffic channel segment in accordance with the selected coding rate of step 1230 and maps the coded bits to modulation symbol values in accordance with the selected modulation method of step 1228. Operation proceeds from step 1232 to step 1234, where the WT determines the logical tones to use based on the uplink traffic channel segment assignment. In step 1236, the WT determines the physical tones, corresponding to the logical tones to use based on tone hopping information. Operation proceeds from step 1236 to step 1238. In step 1238, the WT transmits user data to the terrestrial base station using the determined physical tones.

Returning to step 1208, operation proceeds from step 1208 to step 1240. In step 1240, the WT, having been accepted by the satellite base station, receives a BS assigned WT user ID from the satellite base station. Operation proceeds from step 1240 to steps 1242 and step 1244.

In step 1242, the WT is operated to receive signals corresponding to downlink traffic channel segments, conveying downlink user data, from the satellite base station. Operation proceeds from step 1242 to step 1246, where the WT request retransmission of the downlink traffic channel user data in response to an error. If the downlink transmission was successfully received and decoded no response is communicated from the wireless terminal to the base station. In some embodiments, where an error is detected in the information recovery process, a request for retransmission is not sent, e.g., as the time window of validity for the lost downlink data will expire before a retransmission could be completed or due to a low priority level of the data.

Returning to step 1244, in step 1244, the WT determines the single uplink logical tone to use for both control data and user data for the assigned WT user ID. Operation proceeds to either step 1248 or step 1250, depending on the particular embodiment.

In step 1248, the WT multiplexes user data and control data to be communicated on the uplink. The multiplexed data of step 1248 is forwarded to step 1252, where the WT codes the mixture of user and control information bits into a single coded block. Operation proceeds from step 1252 to step 1254, where the WT determines the physical tone to use for each dwell based on the determined logical tone and tone hopping information. Operation proceeds from step 1254 to step 1256. In step 1256, the WT is operated to transmit the coded block of combined user data and control data to the satellite base station using the determined physical tone for each dwell.

In step 1250, the WT is operated to code the user data and control data in independent blocks. Operation proceeds from step 1250 to step 1258, where the WT is operated to determine the physical tone to be used for each dwell based on the determined logical tone and the tone hopping information. Operation proceeds from step 1258 to step 1260. In step 1260, the WT is operated to transmit coded blocks of user data and coded blocks of control data to the satellite base station using the determined physical tone, determined on a per dwell basis. With regard to step 1260, in accordance with a feature of some embodiments of the present invention, during time intervals dedicated to user data, where there is no user data to be transmitted, the single tone is allowed to go unused.

Operating a wireless terminal in accordance with the method of flowchart 1200 can result in operating the wireless terminal during a first period of time including a first plurality of consecutive OFDM symbol transmission time periods in the first mode of operation during which multiple OFDM tones are used simultaneously to transmit at least some user data in a first uplink signal having a first peak to average power ratio. For example, the WT may using a terrestrial base station as its point of network attachment and may be communicating uplink user data over air link resources corresponding to an uplink traffic channel segment using a plurality of tones simultaneously for uplink traffic channel data, e.g., 7, 14, or 28 tones; an additional tone or tones may also be used in parallel for control signaling, e.g., a dedicated control channel tone. Operating a wireless terminal in accordance with the method of flowchart 1200 can also result in operating the wireless terminal during a second period of time including a second plurality of consecutive OFDM symbol transmission time periods in the second mode of operation during which at most one OFDM tone is used to transmit at least some user data in a second uplink signal having a second peak to average power ratio, which is different from said first peak to average ratio. For example, during the second period of time, the WT may be using a satellite base station as its point of network attachment and may be communicating uplink user data and control data over air link resources corresponding to a single dedicated logical tone associated with a base station assigned WT user identifier, said single dedicated logical tone may be hopped to different physical tones on dwell boundaries.

In some embodiments, the second peak to average power ratio is lower than the first peak to average power ratio, e.g., by at least 4 dB. In some embodiments, the WT uses an omni-directional antenna. User data communicated over the uplink during the first mode of operation during the first period of time can include user data at a rate of at least 4.8 Kbits/sec. User data communicated over the uplink during the second mode of operation during the second period of time can include user data at a rate of at least 4.8 Kbits/sec. For example, a voice channel may be supported for WT operation in both the first and second modes of operation. In some embodiments, the WT supports a plurality of different uplink coding rate options in the first mode of operation including a plurality of different coding rates and a plurality of different modulation schemes, e.g., QPSK, QAM16. In some embodiments, the WT supports a single uplink rate option for operation in the second mode, e.g. QPSK using a single coding rate. In some embodiments, the information bit rate, regarding uplink user data signals, in the second mode of operation is less than or equal to the minimum information bit rate, regarding uplink user data signal, in the first mode of operation.

In some embodiments, the distance between the satellite base station and the wireless terminal, when said satellite base station is being used by the WT as its point of network attachment, is at least 3 times the distance between the terrestrial base station and the wireless terminal, when said terrestrial base station is being used by the WT as its point of network attachment. In some embodiments, at least some of the satellite base stations in the communications system are geo-stationary or geo-synchronous satellites. In some such embodiments, the distance between the geo-stationary or geo-synchronous satellite base station and the WT using it as its point of network attachment is at least 35,000 km, while the distance between a ground base station and the WT using it as its point of network attachment is at most 100 km. In some embodiments, the satellite base station being used by the WT as its point of network attachment is at least a distance away from the WT such that a signal round trip time exceeds 100 OFDM symbol transmission time period, each OFDM symbol transmission time period including an amount of time used to transmit one OFDM symbol and a corresponding cyclic prefix.

In some embodiments, switching from a first mode of operation to a second mode of operation occurs when a handoff occurs between a terrestrial base station and a satellite base station. In some such embodiments, wherein switching from the first mode of operation to the second mode of operation occurs, the WT ceases to send acknowledgment signals in response to received downlink user data. In some such embodiments, wherein switching from the first mode of operation to the second mode of operation occurs, the WT reduces the frequency and/or number of uplink control signals which are transmitted.

Other embodiments, in accordance with various features of the present invention, may include systems that include space based base stations but do not include terrestrial based base stations, systems that include terrestrial base stations but do not include space based base stations, and various combinations including airborne platform based base stations.

In various embodiments of the invention when communicating with remote base stations, some of which use multiple tones in an uplink, uplink segment assignments are used with the UL assignment slave structure being adjusted to account for assignment of traffic segments>2.times. the maximum RTT (round trip time). In some but not necessarily all cases of terminals without high gain antennas, e.g., handsets with omni-directional antennas or nearly omni-directional antennas, the extreme link budget requirements for successful receipt of a transmitted signal by a satellite base station may limit communication through the use of single one mode. Accordingly, in some embodiments when a handoff occurs from a terrestrial base station to a satellite base station, the wireless terminal detects the change and switches from multi-tone uplink mode to a single OFDM tone uplink mode operation.

For geo-stationary satellites with a beam covering a large geographical area there may be a significant difference in the round trip time between the center of the beam and the edge. To resolve this RTT ambiguity a ranging scheme capable of resolving delta-RTT of several milliseconds may be desirable.

Such a scheme can use the existing access interval in OFDM with additional time varying coding on the access tone set to indicate which forward link super slot the reverelink transmission is associated with. This coding can resolve ambiguity to the super slot level. The terminal may need to try repeated access attempts at varying time offsets to cover the sub-superslot (<11.4 msec) ambiguity. For a hybrid terrestrial-satellite network the terminal can use information about the position of the last terrestrial base station detected to form an initial RTT estimate and compress the ambiguity to within the range supported by the normal access protocol.

Figure 9:
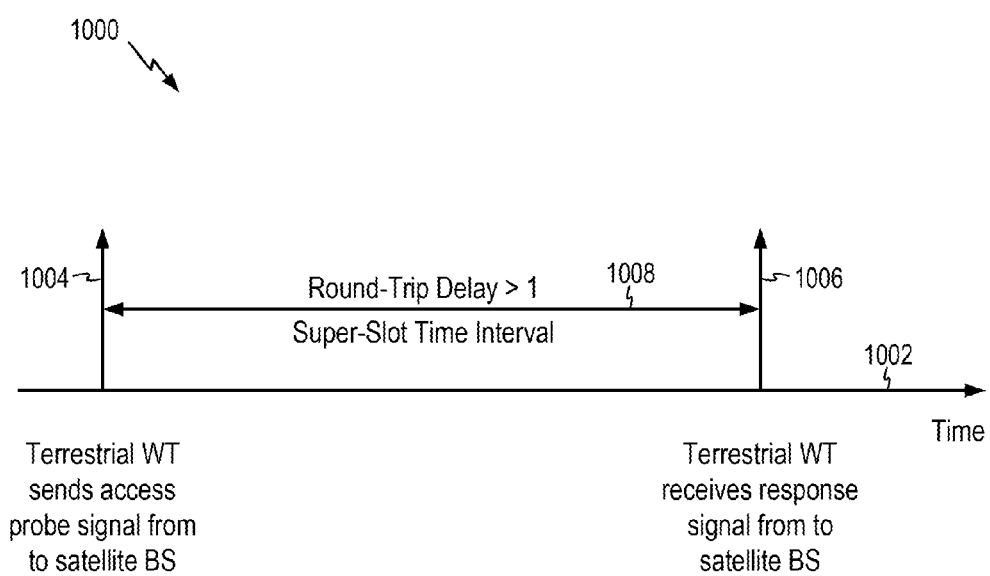
FIG. 9 is a drawing illustrating that in an exemplary satellite/terrestrial hybrid wireless communication system the round trip signal delay between a satellite base station and a terrestrially located wireless terminal will be greater than a typical superslot time interval used in some terrestrial based wireless communications systems.

FIG. 9 is a drawing 1000 illustrating that round trip signal delay between a satellite base station and a terrestrial located WT will be greater than a superslot. Drawing 1000 includes a horizontal axis 1002 representing time, an access probe signal 1004 being sent from a terrestrially located wireless terminal to the satellite base station, and a response signal 1006 from the satellite base station being received by the terrestrially located wireless terminal. Round trip delay time 1008 is greater than a super-slot time interval. For example, in some terrestrial wireless communications systems, an access interval is structured once every superslot providing an opportunity for a wireless terminal to request to establish a connection with a new terrestrial BS and timing synchronize. In the case of a terrestrially located wireless terminal seeking access with a terrestrial base station, where the round trip distance is relatively short, e.g., typically 2-10 miles, the round trip signal travel time is approximately 11 micro-sec to 54 micro-sec, and the round trip delay including signal processing by the terrestrial base station can be within a super-slot, e.g., a time interval of 114 super-slots representing approximately 11.4 msec. Therefore, there is no ambiguity with respect to which superslots the access probe and response signal are associated with. On the other hand, in the case of a terrestrial wireless terminal seeking access with a satellite base station in geo-synchronous orbit of approximately 22,300 mi with a round trip signal travel time is approximately 240 msec, the round trip delay will be greater than a super-slot interval time of 11.4 msec. In addition, there can be variation in the round trip delay due to the large coverage area of the satellite base station resulting in different RTTs depending upon the location of the WT within the cell. In accordance, with the present invention, the access method of a WT seeking to establish a wireless link with the satellite BS and timing synchronize is modified to address timing ambiguity issues that are present when a WT seeks to connect to a satellite BS which are not present when the WT seeks to connect to a terrestrial BS.

Figure 10:
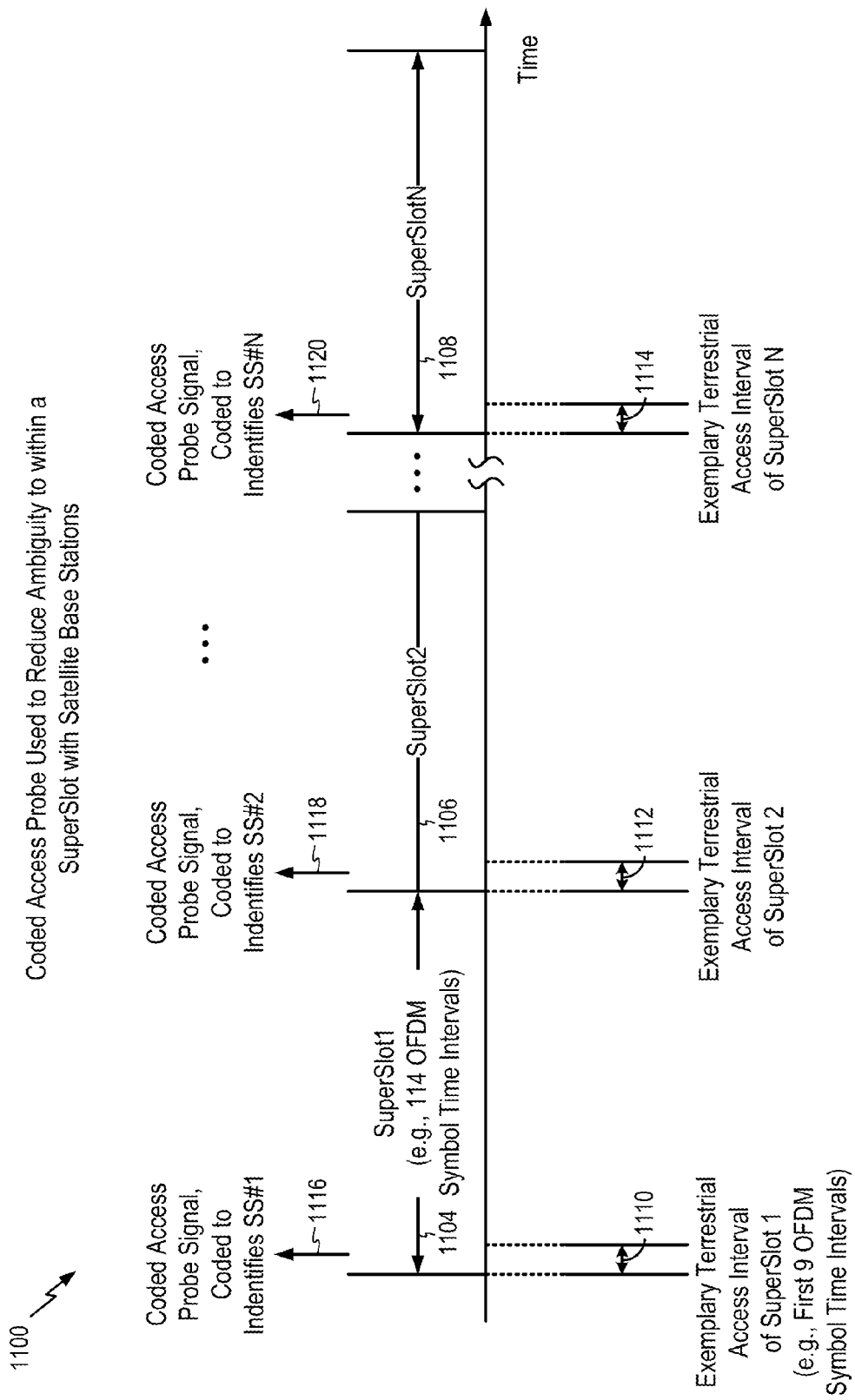
FIG. 10 is a drawing illustrating the feature of coding an access probe signal with information identifying a relative time interval value, e.g., a superslot index value, within a larger relative time interval, e.g., a beacon slot, within the timing structure, said coded information being used in the access process to determine timing synchronization between the satellite base station and the WT, in accordance with the present invention.

FIG. 10 is a drawing 1100 illustrating one feature of the present invention used in the access process to determine timing synchronization between the satellite base station and the WT. FIG. 10 illustrates that the exemplary timing structure is sub-divided into superslots, e.g., 114 OFDM symbol time intervals, with the start of each superslot being an access interval, e.g., 9 OFDM symbol time intervals. Drawing 1100 includes a horizontal axis 1102 representing time, superslot 1 1104, superslot 2 1106, superslot N 1108. Superslot 1 1104 includes exemplary terrestrial access interval 1110; superslot 2 1106 includes exemplary terrestrial access interval 1112; superslot N includes exemplary terrestrial access interval 1114. The base station can send out a reference signal, e.g., a beacon signal, defining a beacon slot, and the superslots can be indexed within the beacons slot. With the terrestrial BS, the WT that seeks to establish a link with a BS sends access probe signal during the access interval and the BS receiving the signal, can send back a WT identifier and a timing correction to provide synchronization. However, in the case of the satellite BS, the timing ambiguity is greater than a superslot. Therefore, the WT can code the access signal probe differently depending upon which superslot it was sent from. Coded access probe signal 1116, which occurs within access interval 1110, is coded to identify superslot 1 1104. Coded access probe signal 1118, which occurs during access interval 1112, is coded to identify superslot 2 1106. Coded access probe signal which occurs during access interval 1114 is coded to identify superslot N 1108. Therefore, when the base station receives the coded access probe signal, the BS can determine from the code, the superslot it was sent from.

Figure 11:
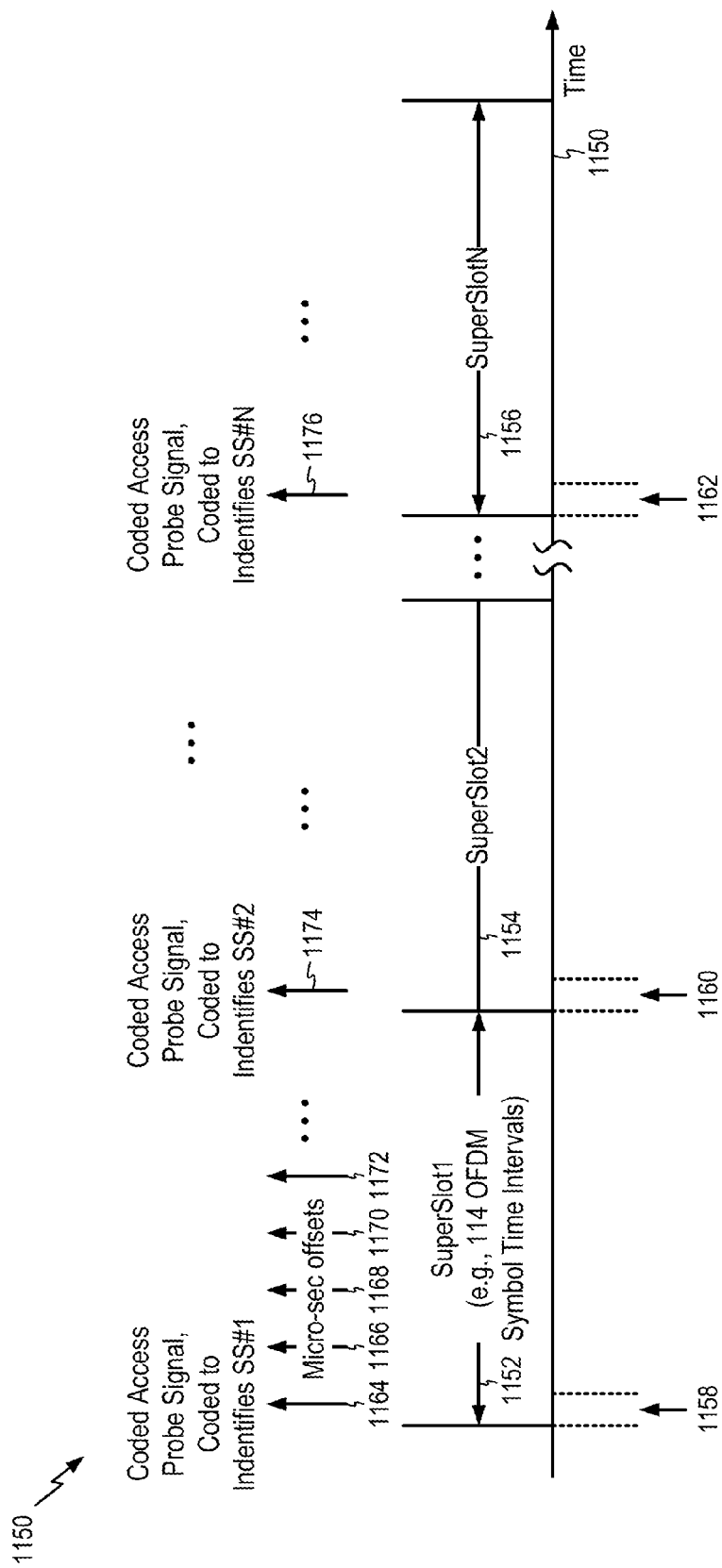
FIG. 11 is a drawing illustrating a feature of using multiple access probe signals, with different timing offsets such that the timing synchronization between the satellite base station and the WT can be further resolved to within a smaller time interval, in accordance with the present invention.

FIG. 11 is a drawing 1200 illustrating another feature of the present invention used in the access process to determine timing synchronization between the satellite base station and the WT. FIG. 11 illustrates that from the WTs perspective, the WT can offset the access probe signal, e.g., by different offsets, e.g., a 400 micro-second offset, such that the satellite can further resolve timing synchronization to within the superslot. Drawing 1200 includes a horizontal axis 1150 representing time, superslot 1 1152, superslot 2 1154, and superslot N 1156. Superslots (1152, 1154, 1156) include time intervals (1158, 1160, 1162), e.g., 9 OFDM symbol transmission time intervals at the start of each superslot, typically used for providing an opportunity for a WT to send an access probe signal to a terrestrial base station to establish a connection and timing synchronize. When operating in a mode to attempt access with a satellite base station, the WT can send access probes at different times, e.g., including times outside intervals (1158, 1160, 1162), within a superslot with respect to the WT's reference. Multiple access probe signals (1164, 1166, 1168, 1170, 1172, 1174, 1176) are shown with exemplary spacing offset between access probe signals being 400 micro-seconds, illustrating that access probes may occur at various times within a superslot. Access probe signals sent during superslot 1 1152, e.g., access probe signal (1164, 1166, 1168, 1170, or 1172) are coded to identify superslot 1. Access probe signals sent during superslot 2 1154, such as access probe 1174 are coded to identify superslot 2. Access probe signals sent during superslot N 1156, such as access probe signal 1176 are coded to identify superslot N.

The terrestrial located WT which is not tightly synchronized to the satellite base station, and in which there is a large degree of uncertainty in the timing due to large possible distance variations between the satellite and the WT, can monitor for access probe signals from WTs for a short interval within a superslot, e.g., the same interval corresponding to that used by a terrestrial base station. If the transmitted WT probe signal does not hit the access interval window of opportunity for reception in the satellite base station, the satellite base station will not decode the request. The WT, by sending multiple requests with different offsets can span the potential variation in timing, and eventually, a WT probe signal should be captured and decoded by the satellite BS. Then, the satellite BS, by decoding the signal can identify the superslot from which the signal was directed and resolve the timing to within the superslot, and the satellite BS can send a BS assigned WT identifier and a timing correction signal to the WT. The WT can apply the received timing correction information to synchronize with the satellite base station.

Figure 12:
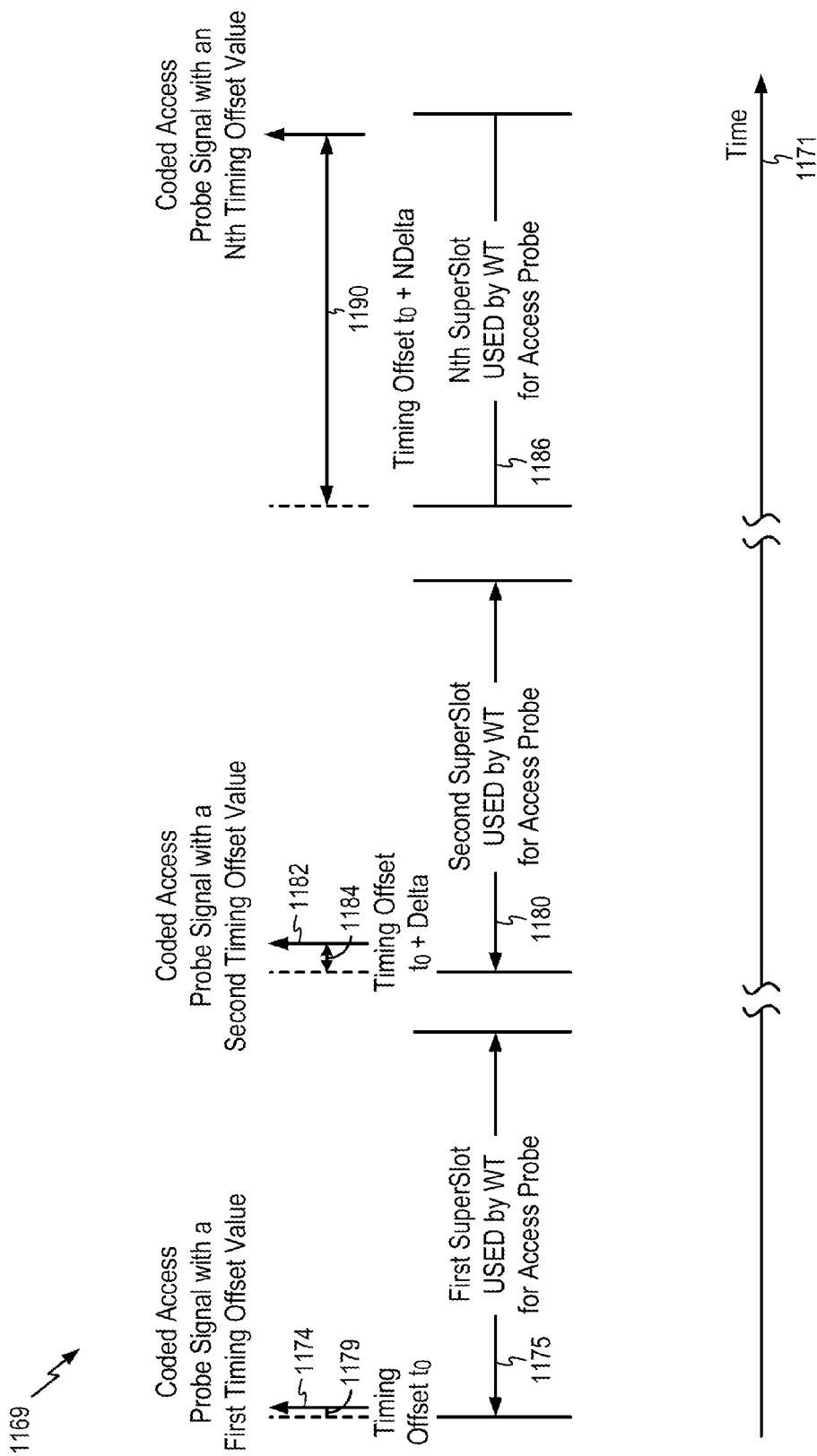
FIG. 12 further illustrates the concept of a wireless terminal sending multiple access probes to the satellite base station with different timing offsets, in accordance with the present invention.

FIG. 12 further illustrates the concept of the WT sending multiple access probes to the satellite base station with different timing offsets. FIG. 12 is a drawing 1169 including a horizontal axis 1171 representing time which shows ranges during which the WT sends access probes to the satellite base station. FIG. 12 includes: a first superslot used by the WT for sending an access probe signal 1175 during which the WT sends coded access probe signal 1177 in accordance with a first timing offset value $t.sub.0$ 1179, a second superslot used by the WT for sending an access probe signal 1180 during which the WT sends coded access probe signal 1182 in accordance with a second timing offset $t.sub.0+DELTA$ 1184, and an Nth superslot used by the WT for sending an access probe signal 1186 during which the WT sends coded access probe signal 1188 in accordance with an Nth timing offset value $t.sub.0+NDELTA$ 1190. Consider that the satellite BS will accept the one of the access probes, e.g., the kth probe, which happens to fall within the access interval monitored by the BS for accepting and processing access probe signals from WTs.

For example, consider that the ambiguity in timing between the satellite BS and the terrestrial WT is greater than a superslot. The WT seeks to connect to the satellite BS. The satellite BS is outputting beacon signals, each beacon signal associated with a beacon slot and a set of superslot. Each superslot has an access interval, e.g., 9 OFDM symbols during which the BS accepts coded access probes from WTs seeking to establish a connection with the satellite BS. If the access probe is outside this access interval window, from the perspective of the BS receiving the signal, the BS will not accept the signal. The WT seeking to use the satellite BS as its point of network attachment sends a coded access probe signal, coded to signify the super-slot index number. Since, the WTs access probe may be outside the window of acceptance when it reaches the BS, the WT may send out multiple probes, with different timing offsets, e.g., with respect to the start of a superslot. For example a timing offset of 400 microsec may be used. For example, a WT may send out a sequence of access probes, e.g., 10 access probes, at intervals of approximately ½ sec apart, with each successive access probe having a different timing offset with respect to the start of a superslot. However, the BS will only recognize the access probe signal which is received within its access interval window. Access probe signals outside the window are tolerated by the system as interference noise. When, the BS receives the one of the multiple access probes from the WT which is received within the access interval window, the BS determines the superslot information by decoding the signal, and determines a timing correction for achieving timing synchronization between the BS and WT. The BS sends a base station assigned WT identifier, a repeat of the superslot identification information, and a timing correction value to the WT. The WT can receive the base station assigned WT identifier, apply timing correction, and thus is allowed to use the satellite BS as its point of network attachment. A single dedicated logical uplink tone may be associated with the assigned WT identifier for the WT to use for uplink signaling to the satellite BS.

Figure 13:
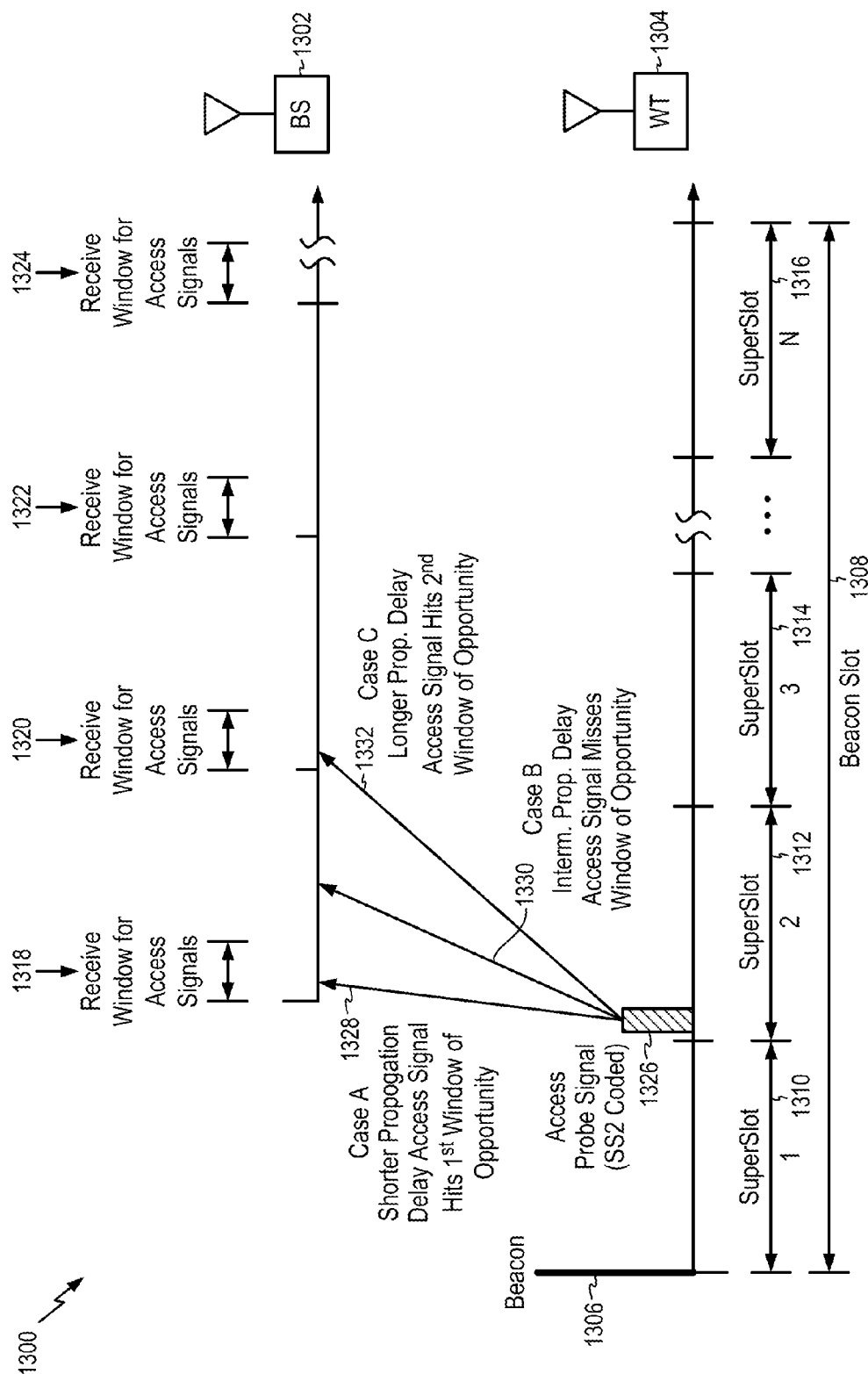
FIG. 13 is a drawing illustrating exemplary access signaling in accordance with methods of the present invention.

FIG. 13 is a drawing 1300 illustrating exemplary access signaling in accordance with methods of the present invention. FIG. 13 includes an exemplary base station 1302 and an exemplary wireless terminal 1304, implemented in accordance with the present invention. Exemplary BS 1302 transmits downlink signaling using a downlink timing and frequency structure. The downlink timing structure includes beacons slots, each beacon slot including a fixed number of indexed superslots, e.g. 8 indexed superslots per beacon slot, and, each superslot including a fixed number of OFDM symbol transmission time intervals, e.g., 114 OFDM symbol transmission time intervals per superslot. Each beacon slot also includes a beacon signal. Downlink signals from BS 1302 are received by WT 1304, the downlink signaling delay between when the BS 1302 transmits and when the WT 1304 receives varies as a function of the distance between the BS and WT. Received beacon signal 1306 is shown with the corresponding beacon slot 1308 including indexed superslots (superslot 1 1310, superslot 2 1312, superslot 3 1314, . . . , superslot N 1316). WT 1304 can reference uplink signaling with respect to the received beaconslot timing.

The BS 1302 also maintains an uplink timing and frequency structure synchronized at the base station with respect to the downlink timing structure. Within the uplink timing and frequency structure at BS 1302, there are receive windows for receiving access signals, e.g., one window corresponding to each superslot (1318, 1320, 1322, . . . , 1324).

WT 1304 sends an uplink access probe signal 1326 to BS 1302 seeking to gain access and register with BS 1302. Arrows (1328, 1330, 1332) indicates cases (A, B, C) of (shorter, intermediate, and longer) propagation delays corresponding to (short, intermediate, and long) distances, respectively, between BS 1302 and WT 1304.

In exemplary case A, the WT 1304 has sent access probe signal 1326 and it has successfully hit access window of opportunity 1318. BS 1302 can process the access probe signal, determine a timing offset and send the timing offset correction to WT 1304, allowing the WT 1304, to use the received timing offset correction to adjust uplink transmission timing to more precisely timing synchronize its uplink signaling, such that the uplink signals from WT 1304 arrive synchronized with BS 1302 uplink receive timing, e.g., allowing data communications.

In exemplary case B, the WT 1304 has sent access probe signal 1326 and it has missed the access windows of opportunity (1318, 1320). BS 1302 does not successfully process the access probe signal, the access probe signal is treated by BS 1302 as interference, and BS 1302 does not respond to WT 1304.

In exemplary case C, the WT 1304 has sent access probe signal 1326 and it has successfully hit access window of opportunity 1320. BS 1302 can process the access probe signal, determine a timing offset correction and send the timing offset correction to WT 1304, allowing the WT 1304, to use the received timing offset to adjust uplink transmission timing to more precisely timing synchronize its uplink signaling, such that the uplink signals from WT 1304 arrive synchronized with BS 1302 uplink receive timing, e.g., allowing data communications.

In some embodiments, e.g., with nearby terrestrial base stations such as a terrestrial BS with a cell radius of 5 miles, the amount of round trip time uncertainty is relatively small, and the WT 1304 when transmitting an access probe uplink signal can be expect to hit the next access window at the base station. In some embodiments, where the base station is far away from the WT, but the relative distance uncertainty is very small, the access probe signal can be expected to hit an access window at the base station.

However, in embodiments, where the uncertainty in round trip time is larger than supported by the access interval size, the access probe signal may or may not hit an access window of opportunity. In such a case, if an access probe misses, as in case B above, WT timing needs to be adjusted and another access probe sent. Access interval window time represents signaling overhead and it is desirable to keep the access interval short. For example, an exemplary access window time interval is 9 OFDM symbol transmission time intervals corresponding to an exemplary superslot of 114 OFDM symbol transmission time intervals.

In the examples of FIG. 13, it should be observed that the variation in propagation delay can be such that the access probe signal 1326 could hit different access windows 1318, 1320, e.g., depending upon the relative distance between WT 1304 and BS 1302. For example, consider that case A (arrow 1328) and case C (arrow 1332) correspond to the same BS whose relative distance to WT can vary to an extent that an access probe signal, when successfully received, may be received in different ones of access windows depending upon the relative BS-WT distance at a given time. Also consider that the WT is allowed to transmit access probe signals during superslots having different index values. When the BS receives an access probe signal, for the BS to calculate the correct timing correction, the base station needs to know more information from the WT 1304 in order to gain a timing reference point. In accordance with one feature of some embodiments of the present invention, the WT codes the access probe signal 1326 to identify the superslot index from which access probe signal 1326 was transmitted. The BS 1302 uses the slot index information to calculate a timing offset correction, which is sent via a downlink signal to WT 1304. WT 1304 receives the timing correction signal and adjusts its uplink timing accordingly.

In some embodiments of the present invention, an alternative method is employed, wherein the access probe signal does not code the superslot index; however, the base station communicates via the downlink a timing correction signal and a slot index offset indicator, e.g., distinguishing between access window 1318 and access window 1320. Then, the WT 1304, which knows the superslot index of the transmitted access probe signal can combine the information with the received timing correction signal and the received slot index indicator to calculate a composite timing adjustment, and apply the timing adjustment.

Figure 14:
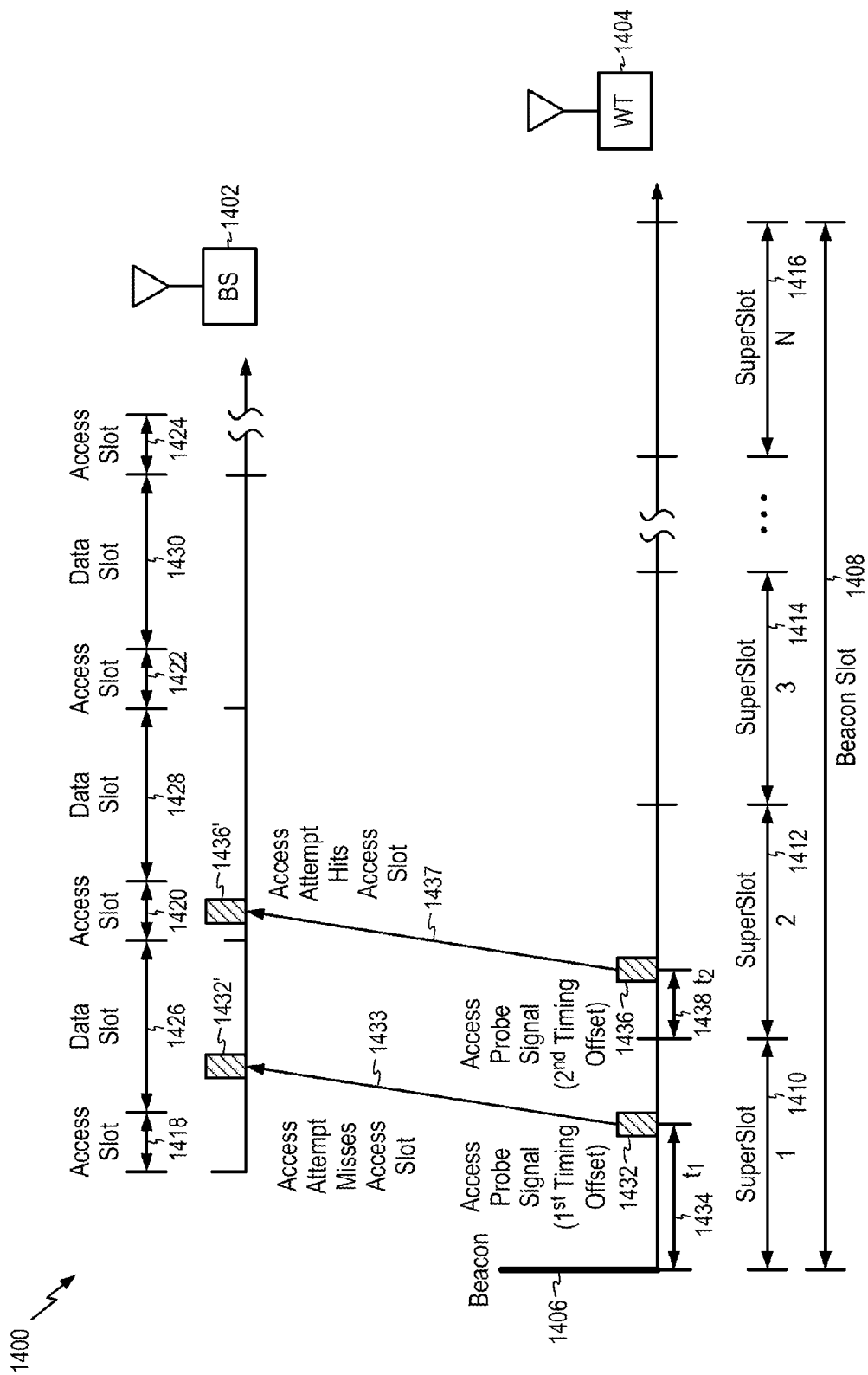
FIG. 14 is a drawing illustrating exemplary access signaling in accordance with methods of the present invention.

FIG. 14 is a drawing 1400 illustrating exemplary access signaling in accordance with methods of the present invention. FIG. 14 includes an exemplary base station 1402 and an exemplary wireless terminal 1404, implemented in accordance with the present invention. Exemplary BS 1402 transmits downlink signaling using a downlink timing and frequency structure. The downlink timing structure includes beacons slots, each beacon slot including a fixed number of indexed superslots, e.g. 8 indexed superslots per beacon slot, and, each superslot including a fixed number of OFDM symbol transmission time intervals, e.g., 114 OFDM symbol transmission time intervals per superslot. Each beacon slot also includes a beacon signal. Downlink signals from BS 1402 are received by WT 1404, the downlink signaling delay between when the BS 1402 transmits and when the WT 1402 receives varies as a function of the distance between the BS and WT. Received beacon signal 1406 is shown with the corresponding beacon slot 1408 including indexed superslots (superslot 1 1410, superslot 2 1412, superslot 3 1414, ..., superslot N 1416). WT 1404 can reference uplink signaling with respect to the received beaconslot timing. The RTT uncertainty is such that the WT 1404, when sending an access probe signal may or may not be successful in hitting an access slot at the base station 1402.

The BS 1402 also maintains an uplink timing and frequency structure synchronized at the base station with respect to its downlink timing structure. Within the uplink timing and frequency structure at BS 1402, there are receive windows for receiving access signals, access slots, e.g., one window corresponding to each superslot (1418, 1420, 1422, ..., 1424). In addition, the uplink timing is structured such that there are data slots (1426, 1428, 1428) between the access slots.

FIG. 14 illustrates a method, in accordance with the present invention, of adjusting access probe timing offsets with respect to the start of a superslot, such that an access probe uplink signal will be eventually received within an access slot. This method is useful in cases where variation in signal RTT, e.g., due to potential variations in BS-WT distance, is such that hitting an access window on the first attempt is not ensured.

WT 1404 transmits access probe signal 1432, the transmission timing being controlled such that there is a first timing offset, timing offset $t_1$ 1434 with respect to the start of the superslot during which the signal is transmitted. The transmitted access probe signal 1432 is an uplink signal which is delayed by signaling propagation as represented by slanted arrow 1433 and arrives as access probe signal 1432' at the receiver of BS 1402. However, access probe signal 1432' happens to arrive during data slot 1426, and thus is considered to be interference by BS 1402. BS 1402 does not send a response to WT 1404.

WT 1404 adjusts its timing offset to a 2.sup.nd timing offset value t.sub.2 1438 and transmits access probe signal 1436. The transmitted access probe signal 1436 is an uplink signal which is delayed by signaling propagation as represented by slanted arrow 1437 and arrives as access probe signal 1436' at the receiver of BS 1402. However, this time the received access probe signal 1436' is within access slot 1420, and the BS 1402 processes the access signal, accepts WT 1404 to be registered, calculates a timing correction signal and sends the timing correction signal via the downlink to WT 1404. The WT adjusts it uplink timing in accordance with the received timing correction signal.

Differences between access probe signaling timing offsets can be chosen in correlation to the size of access slot such that successive access probes with different offsets will eventually hit an access slot. For example in an exemplary system with access slots of 9 OFDM symbol transmission time intervals, different time offsets may differ by 4 OFDM symbol transmission time intervals, e.g., with an OFDM transmission time interval being approximately 100 micro-sec.

Figure 15:
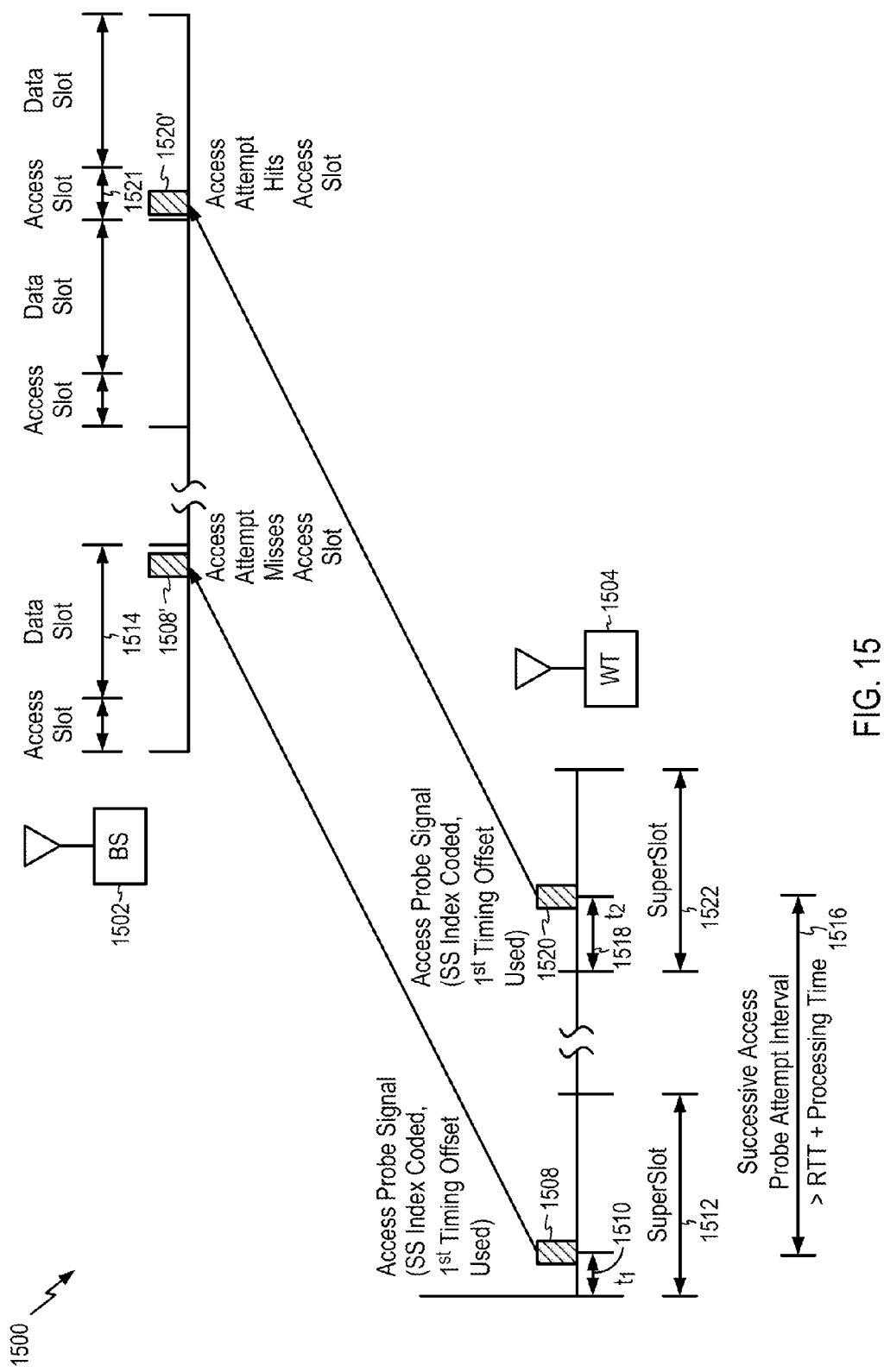
FIG. 15 is a drawing illustrating exemplary access signaling in accordance with methods of the present invention.

FIG. 15 is a drawing 1500 illustrating exemplary access signaling in accordance with methods of the present invention. FIG. 15 includes an exemplary base station 1502 and an exemplary wireless terminal 1504, implemented in accordance with the present invention. Consider that the exemplary BS 1502 may be a satellite BS in geo-stationary orbit having a large cellular coverage area on the surface of the earth, e.g., with a radius of 100, 200, 500 or more miles. In such as embodiment, consider that the RTT is greater than a superslot in the downlink, and that the RTT uncertainty, e.g., due to potential WT 1504 location variation, such that an exemplary access probe signal may or may not hit access time slot at the base station 1500. In this exemplary embodiment, the two features described above, coding superslot index identification information into the access probe and sending successive access probes with different timing offsets from the start of the superslot in which the access signal is transmitted, are used in combination to obtain a timing correction for the WT 1504.

BS 1502 transmits downlink signals including a downlink beacon signal per beaconslot which is part of a downlink timing structure including superslots, the downlink timing structure known to the BS and WT. The WT 1504 is able to synchronize with respect to the received downlink signals and can identify the index values of superslots within each beacon slot.

WT 1504 decides that it would like to use BS 1502, a satellite BS, as a point of network attachment; however, WT 1504 does not know its position and thus does not know the RTT. WT 1504 sends access probe signal 1508 with a 1.sup.st timing offset t.sub.1 1510, with respect to the start of the superslot 1512 during which the signal is transmitted. The index number of superslot 1512 within its beaconslot is known to WT 1504 and encoded in the access probe signal 1508. After a WT-BS propagation delay time, the access signal arrives at BS 1502 as access probe 1508'. However, the access probe signal 1508' hits data slot 1514, rather than an access slot. BS 1502 treats signal 1508' as interference and does not respond to WT 1504.

Wireless terminal 1504 waits for time interval 1516 before sending another access probe signal. Time interval 1516 is chosen to be greater than the RTT plus some additional time allowed for signal processing, providing enough time for a BS 1502 access probe response signal to be generated, transmitted, propagate, and be detected by WT 1504, if the access probe signal had successfully hit an access slot at BS 1502 and BS 1502 had accepted WT 1504 for registration.

Having not received a response in the expected time interval, WT 1504 adjusts its timing offset from the start of a superslot to a 2.sup.nd timing offset 1518, different than the first timing offset 1510, and sends another access probe signal 1520 during superslot 1522. The index number of the superslot 1522 within its beacon slot is coded in signal 1520, the index value may be the same or different than the index value coded in signal 1508. After a WT-BS propagation delay time, the access signal arrives at BS 1502 as access probe 1520'. In this case, the access probe signal 1520' hits access slot 1521. BS 1502 decodes the superslot index communicated, measures a received signal 1520' timing offset within the access slot 1521, and uses the measured timing offset and the superslot information to calculate a timing correction value for the WT 1504. BS 1502 sends the timing offset correction value as a downlink signal to WT 1504. WT 1504 receives and decodes the timing offset value and adjusts its uplink timing in accordance with the received correction. WT 1504 received signaling identifying that it is being accepted for registration by BS 1502, before the time that the WT 1504 would attempt to transmit another access probe signal, e.g., with a different offset.

Figure 16B:
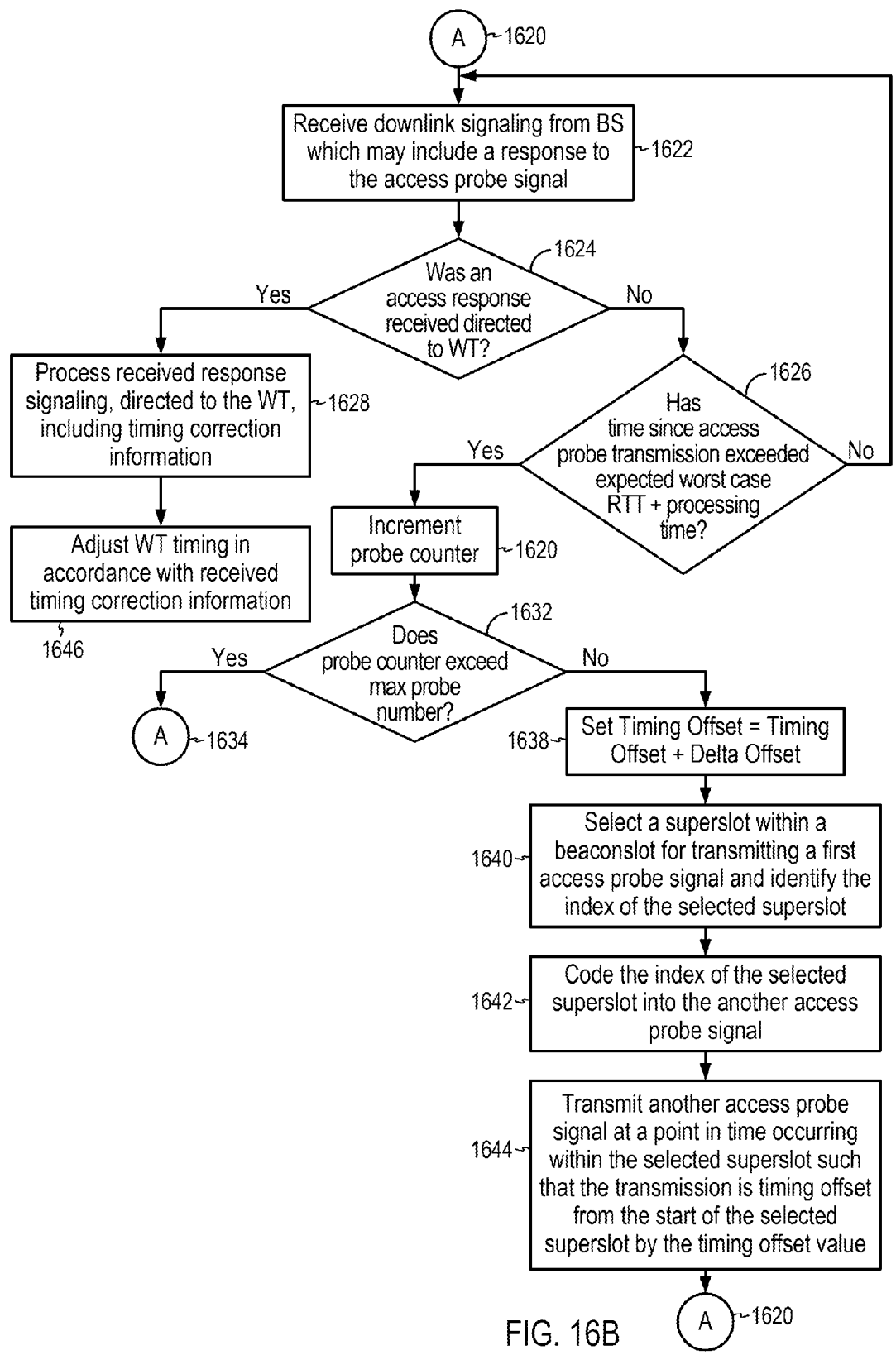
FIG. 16B is a flowchart of an exemplary method of operating a wireless terminal to access a base station and perform a timing synchronization operation in accordance with the present invention.

FIG. 16 is a flowchart 1600 of an exemplary method of operating a wireless terminal to access a base station and perform a timing synchronization operation in accordance with the present invention. Operation starts in start step 1602, where the WT is powered on, initialized, and starts to receive downlink signals from one or more base stations. Operation proceeds from step 1602 to step 1604.

In step 1604, the WT decides as it whether it is seeking to initiate access with a satellite or terrestrial base station. The exemplary WT, implemented in accordance with the present invention, may include implementation of different methods of access. A first method of access is tailored to satellite base stations, e.g., satellite base stations in geo-stationary orbit with cell coverage areas on the surface of the earth having a radius of approximately 100-500 mi, where the signal RTT is greater than a superslot, and the ambiguity in RTT is greater than the access time interval. A second method of access is tailored to terrestrial base stations, e.g., with a relatively small cell radius, e.g., 1, 2, or 5 mi, where the signal RTT is less than a superslot, and the ambiguity in RTT is small enough such that an access request signal transmitted from the WT should be expected to hit an access slot at the terrestrial BS on a single attempt. If the WT is seeking access with a satellite BS, operation proceeds from step 1604 to step 1606; while if the WT is seeking to access a terrestrial base station, operation proceeds from step 1604 to step 1608.

In step 1606, the WT is operated to receive a downlink beacon signal or signals from a satellite BS. The downlink timing and frequency structure used by the satellite base station in the exemplary system may include beacon slots which occur on a recurring basis, with each beaconslot including a beacon signal and with each beaconslot including a fixed number of superslots, e.g., eight, each of the superslots within a beaconslot being associated with an index value, and each of the superslots including a fixed number of OFDM symbol transmission time intervals, e.g., 114.

Operation proceeds from step 1606 to step 1608. In step 1608, the WT determines from the received beacon signal(s) a timing reference, e.g., determining the start of a beaconslot with respect to the received downlink signaling. In step 1610, the WT sets a probe counter equal to 1, and in step 1612 the WT sets a timing offset variable equal to an initial timing offset; e.g., the initial timing offset being a predetermined value stored in the WT. Operation proceeds from step 1612 to step 1614.

In step 1614, the WT selects a superslot within a beaconslot for transmitting a first access probe signal and identifies the index of the selected superslot. Then, in step 1614, the WT codes the index of the selected superslot into the first access probe signal. Next, in step 1618, the WT transmits the first access probe signal at a point in time occurring within the selected superslot such that the transmission is timing offset from the start of the selected superslot by the timing offset value of step 1612. Operation proceeds from step 1618 via connecting node A 1620 to step 1622.

In step 1622, the WT is operated to receive downlink signaling from the satellite base station, the received downlink signaling may include a response to the access probe signal. Operation proceeds from step 1622 to step 1624. In step 1624, the WT checks as to whether a response was received directed to the WT. If a response was not received, operation proceeds from step 1624 to step 1626; however if a response was received directed to the WT operation proceeds to step 1628.

In step 1626, the WT checks as to whether the change in time since the last access probe transmission has exceeded the expected worst case RTT+processing time, e.g., a predetermined limit value stored in the WT. If the time limit has not been exceeded, then operation returns to step 1622, where the WT continues the process of receiving downlink signals and checking for a response. However, if in step 1626, the WT determines that the time limit has been exceeded, then the WT operation proceeds to step 1630, where the WT increments the probe counter.

Next, in step 1632, the WT checks as it whether the probe counter exceeds a max probe counter number. The max probe counter number may be a predetermined value stored in WT memory selected such that a set of max probe counter number access probes with different timing offsets should be sufficient to cover the timing ambiguity such that at least one of the access probes should be expected to be timed to hit an access slot at the satellite base station.

If the probe counter has exceeded the max probe number in step 1632, it can be assumed that access attempt set has resulted in failure and operation proceeds via connecting node B 1634 to step 1604. For example, possible causes of failure may include: interference conditions such that the access probe signal that should have hit an access slot at the base station was not able to be successfully detected and processed, the satellite BS decided to deny the WT access, e.g., due to loading considerations, or the response signal from the satellite base station was not able to be successfully recovered. In step 1604, the WT can decide whether to repeat the process with the same satellite base station or attempt to access a different base station.

If in step 1632, the probe counter did not exceed the max probe counter number operation proceeds to step 1636, where the WT sets the timing offset equal to the current timing offset value plus a delta offset. For example, the delta offset can be fraction, e.g., less than half, of the access slot interval. Then, in step 1640, the WT selects a superslot within a beaconslot for transmitting another access probe signal and identifies the index of the selected superslot. Next in step 1642, the WT codes the index of the selected superslot into another access probe signal. Then, in step 1644, the WT transmits the another access probe signal at a point in time occurring within the selected superslot such that the transmission is timing offset from the start of the selected superslot by the timing offset value of step 1638. Operation proceeds from step 1644 via connecting node A 1620 back to step 1622 where the WT receives downlink signals and checks for a response to the access probe signal.

Returning to step 1624, if in step 1624 it was determined that the WT has received a response directed to the wireless terminal, operation proceeds to step 1628, where the WT processes the received response, directed to the WT including the timing correction information. Operation proceeds from step 1628 to step 1646. In step 1646, the WT adjusts WT timing in accordance with received timing correction information.

Returning to step 1604, in step 1604 if the wireless terminal seeks to initiate access via a terrestrial BS station, operation proceeds to step 1608, where the WT is operated to receive a downlink beacon signal or signals from the terrrestrial base station, that the WT wishes to use as it point of network attachment. Then, in step 1646, the WT determines from the received beacon signal or signals, a timing reference, and in step 1648, the WT uses the determined time reference to determine when to transmit an access request signal such that the access request signal should be expected to be received at the terrestrial base station during an access interval. Operation proceeds from step 1648 to step 1650.

In step 1650, the WT is operated to transmit an access request signal such that the access request signal at the determined time, said access request signal not including coded superslot identification information. Next, in step 1652, the WT is operated to receive downlink signaling from the terrestrial BS which may include access grant information. Operation proceeds from step 1652 to step 1654.

In step 1654, the WT is operated to determine whether the WT received an access grant signal in response to its access request transmission. If the access grant was not received, operation proceeds from step 1654 via connecting node B 1634, where the WT decides whether to retry access with the same terrestrial base station or to attempt access with a different BS. If it is determined in step 1654, that the WT was granted access to use the terrestrial BS as its point of network attachment, then operation proceeds to step 1656, where the WT is operated to process the access grant signaling directed to the WT, including timing correction information. Then, in step 1658, the WT is operated to adjust WT timing in accordance with the received timing correction information of step 1656.

Figure 17A:
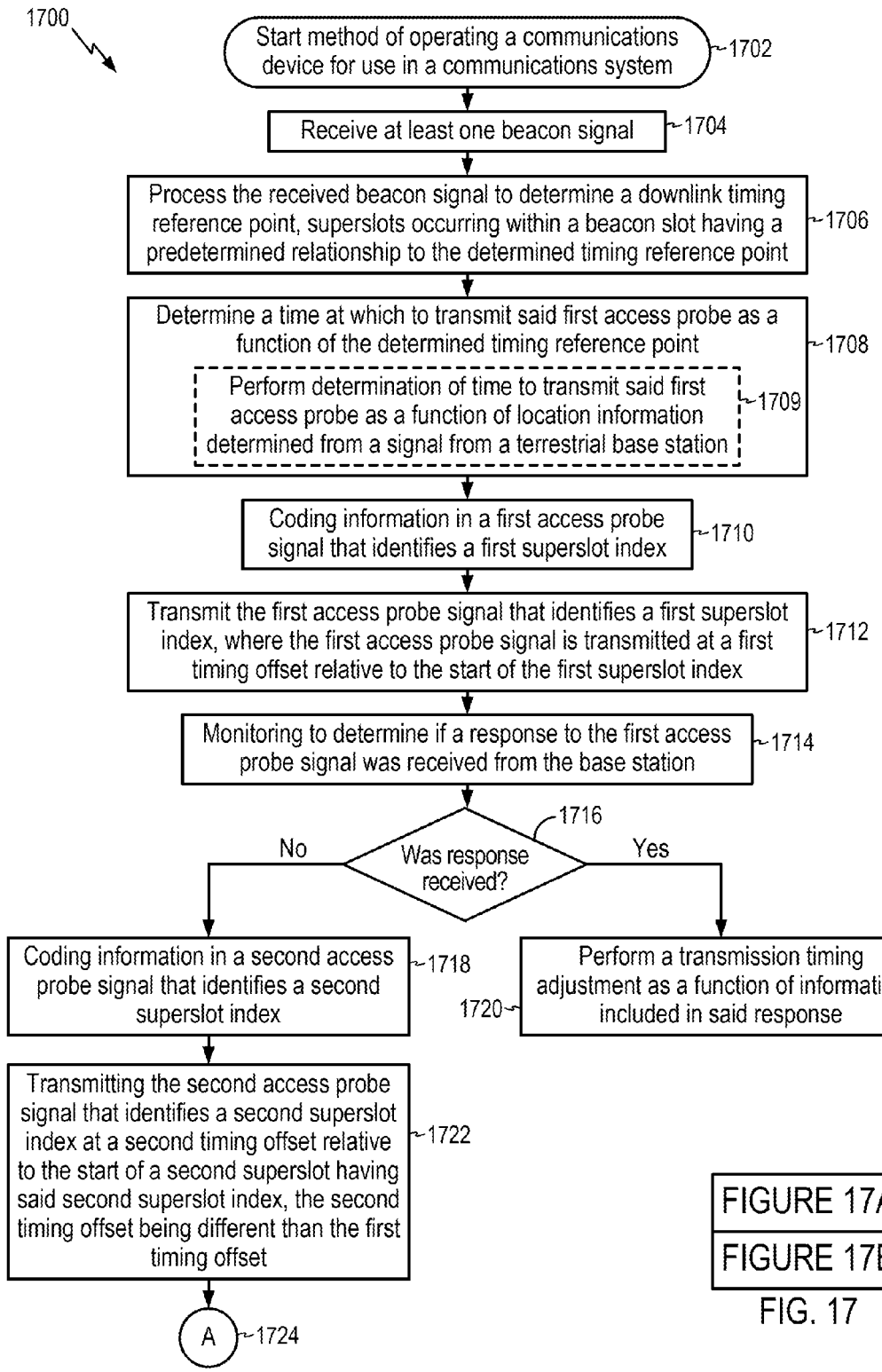
FIG. 17 comprising the combination of FIG. 17A
FIG. 17B is a flowchart of an exemplary method of operating a communications device for use in a communications system.
Figure 17B:
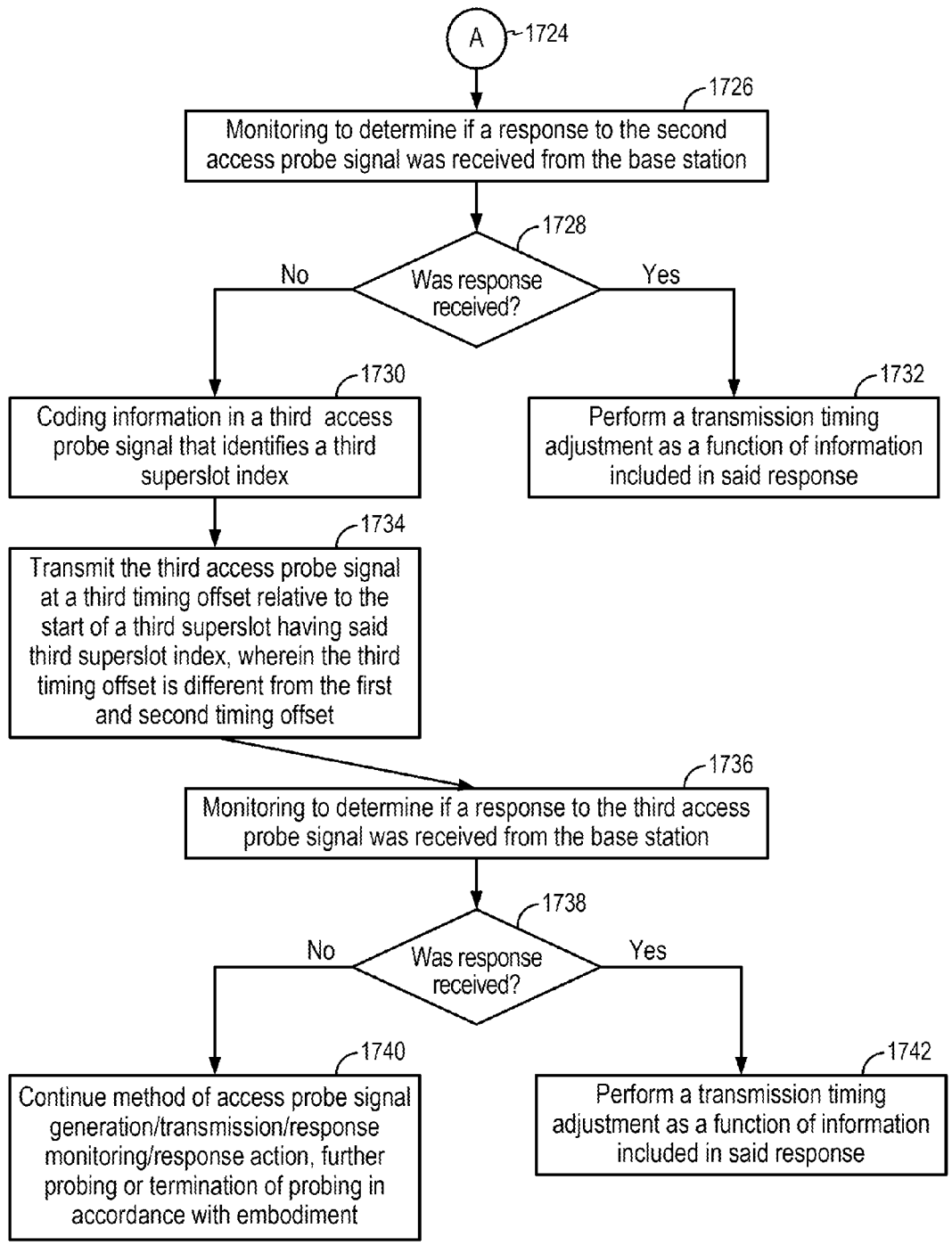

FIG. 17 comprising the combination of FIG. 17A and FIG. 17B is a flowchart 1700 of an exemplary method of operating a communications device for use in a communications system. For the example, the exemplary communications device may be a wireless terminal such as a mobile node, implemented in accordance with the present invention, and the exemplary communications system may be a multiple access spread spectrum OFDM wireless communications system. The communications system may include one or more base stations, and each base station may transmit downlink beacon signals. The various base stations in the system may or may not be timing synchronized with respect to one another. In the exemplary communications system, beacon signaling broadcast by a base station may be used in providing timing reference information with respect to the base station. In the exemplary communications system, the timing structure for a base station is such that beacon time slots occur on a periodic basis, a beacon signal being transmitted by a base station during each beacon time slot according to a periodic downlink timing structure, said downlink timing structure including a plurality of superslots within each beaconslot, the individual superslots within each beacon slot being suitable for identification through the use of a superslot index, each superslot including a plurality of symbol transmission time periods.

Operation starts in start step 1702, where the communications device is powered on and initialized. Operation proceeds from step 1702 to step 1704. In step 1704, the communications device receives at least one beacon signal from the base station that the communications device wishes to use a network attachment point, e.g., a satellite BS. In some embodiments the communications device receives multiple beacon signals and/or other downlink broadcast information from the base station, e.g., pilot signals, before proceeding. Operation proceeds from step 1704 to step 1706. In step 1706, the communications device processes the received beacon signal to determine a downlink timing reference point, superslots occurring within a beaconslot having a predetermined reference to the determined timing reference point. Operation proceeds from step 1706 to step 1708.

In step 1708, the communications device determines a time at which to transmit a first access probe as a function of the determined timing reference point. For example, the first access probe has an initial time offset from the determined timing reference point. In some embodiments, e.g., some hybrid system including both satellite and terrestrial base stations, the communications device performs sub-step 1709, and in sub-step 1709, the communications device determines a time at which to transmit a first access probe as a function of location information determined from a signal from a terrestrial base station. In some such embodiments, determining the time at which to transmit the first access probe is further performed as a function of known information indicating the location of said terrestrial base station and the location of said satellite base station. For example, the base station to which the communications device now wishes to send an access probe signal may be a satellite base station, and there may be a relatively large amount of uncertainty in the timing to use for transmitting the access probe due to a relatively large variation in signal RTT due to a large coverage area on the surface of the earth, and the current position of the communications device not being known. However, the satellite's cell coverage area may include, overlap with and/or be near a number of smaller cells, the smaller cells corresponding to terrestrial base stations. By approximating the communication device's current location determined from terrestrial base station signals, the communications device may reduce the timing uncertainty as to when to transmit the access probe, thus increasing the likelihood that the access probe with be accepted by the satellite base station, and reducing the time and number of different timing offset access probes that need to be sent to the satellite BS. For example, the communications device may have stored information identifying the last terrestrial BS that the communications device used as an access point, the location of terrestrial BS being known and stored in the communications device, and information correlating the terrestrial BS cells to the satellite position and/or satellite cell location may also be stored and used. In some embodiments, the communications device may triangulate its position based on beacon signals received from a plurality of terrestrial base stations. In some embodiments, it may be possible to reduce the level of timing uncertainty, by using location information derived from terrestrial base stations, such that a first access probe signal to a satellite base station should be expected to hit an access slot of the satellite base station.

Operation proceeds from either step 1708 to step 1710. In step 1710, the communications device codes information in a first access probe signal that identifies a first superslot index. Then, in step 1712, the communications device transmits the first access probe signal that identifies a first superslot index, where the first access probe signal is transmitted at a first timing offset relative to the start of the first superslot index. Operation proceeds from step 1712 to step 1714, where the communications device monitors to determine if a response to the first access probe signal was received from the base station. Then, in step 1716, operation proceeds to step 1718 if a response was not received or operation proceeds to step 1720 if a response was received.

If a response was received, then in step 1720, the communications device performs a transmission timing adjustment as a function of information included in the response.

However, if a response was not received, then in step 1718, the communications device codes information in a second access probe signal that identifies a second superslot index and in step 1722 the communications device transmits the second access probe signal that identifies a second superslot index at a second timing offset relative to the start of a second superslot having said second superslot index, the second timing offset being different than the first timing offset. Operation proceeds from step 1722 via connecting node A 1724 to step 1726.

In step 1726, the communications device monitors to determine if a response to the second access probe signal was received from the base station. Then, in step 1728, operation proceeds to step 1732 if a response was not received or operation proceeds to step 1730 if a response was received.

If a response was received, then in step 1732, the communications device performs a transmission timing adjustment as a function of information included in the response.

However, if a response was not received, then in step 1730, the communications device codes information in a third access probe signal that identifies a third superslot index and in step 1734 the communications device transmits the third access probe signal at a third timing offset relative to the start of a third superslot having said third superslot index, wherein the third timing offset is different from the first and second timing offsets.

Operation proceeds from step 1734 to step 1736. In step 1736, the communications device monitors to determine if a response to the third access probe signal was received from the base station. Then, in step 1740, operation proceeds to step 1742 if a response was not received or operation proceeds to step 1740 if a response was received.

If a response was received, then in step 1742, the communications device performs a transmission timing adjustment as a function of information included in the response. If a response was not received in step 1740, the communications device continues with the process of access signal generation/transmission/response determination/further action in accordance with the embodiment. For example, in some embodiments, the communications device may communicate access probes with different timing offsets for each of successive access probes, until a probe is responded to or until a fixed number of access probes have been sent. For example, the total number of access probes may be at least enough to cover the expected timing ambiguity.

In some embodiments, the first and second access probes are transmitted in different beacons slots and the second superslot index is the same or different from the first superslot index. In some embodiments, the first and second access probes are transmitted in different beacons slots and the second superslot index is different from the first superslot index.

In some embodiments, the first and second access probes are transmitted in the same beaconslot, and the second superslot is different than the first superslot. In some such embodiments, the response includes information identifying the one of the probe signals being responded to.

In some embodiments, where a sequence including at least three access probes are transmitted, the second timing offset is different from the first timing offset by an initial timing offset value plus a first integer multiple of a fixed step size offset, and the third timing offset is different from the first timing offset by the initial timing offset value plus a second integer multiple of the fixed step size timing offset, which is different from the first integer multiple of the fixed step size offset. In some embodiments, the first and second integer multiples of the fixed step size timing offset can be either positive or negative numbers.

In some embodiments, the fixed step size is less than the duration of a base station access interval, the base station access interval being a period of time during which the the base station is responsive to access probe signals.

In various embodiments, the base station to which the communications device is sending access probes is a satellite base station, and the round trip time (RTT) between the satellite base station and the communications device for signals traveling at the speed of light is greater than the duration of a superslot. In some such embodiments, the RTT is also greater than the duration of a beaconslot. In some embodiments the RTT is greater then 0.2 seconds.

Figure 18:
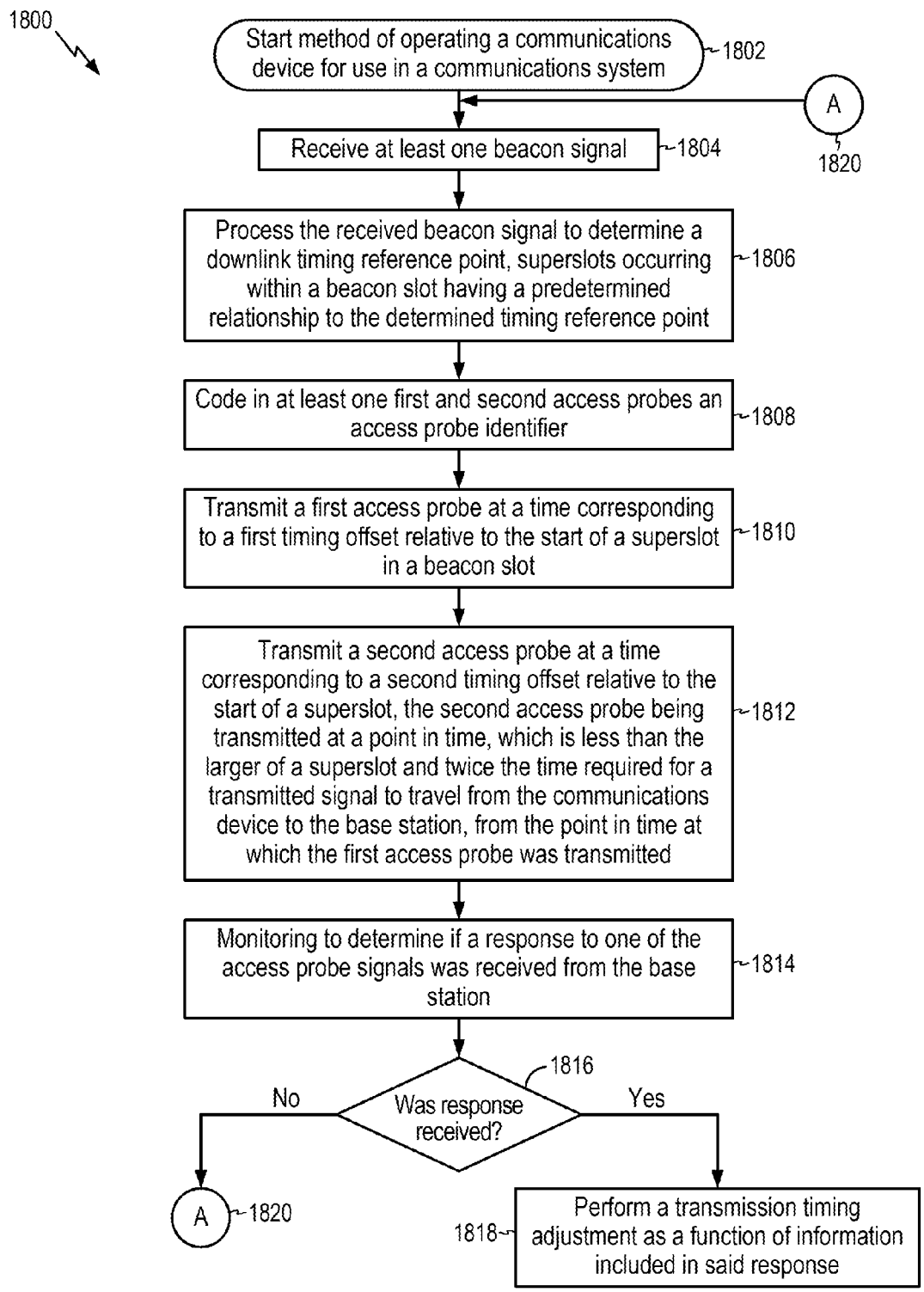
FIG. 18 is a flowchart of an exemplary method of operating an exemplary communications device in accordance with the present invention.

FIG. 18 is a flowchart 1800 of an exemplary method of operating an exemplary communications device in accordance with the present invention. The exemplary method of flowchart 1800 is a method of operating a communications device for use in a communications system where beacon time slots occur on a periodic basis, a beacon signal being transmitted by a base station during each beacon time slot according to a periodic downlink timing structure, said downlink timing structure including a plurality of superslots within each beaconslot, the individual superslots within a beacon slot being suitable for identification through the use of a superslot index, each superslot including a plurality of symbol transmission time periods.

Operation starts in step 1802, where the communications device is powered on and initialized. Operation proceeds from step 1802 to step 1804, where the communications device is operated to receive at least one beacon signal, and then in step 1806, the communications device processes the received beacon signal to determine a downlink timing reference point, superslots occurring within a beaconslot having a predetermined relationship to the determined timing reference point. Operation proceeds from step 1806 to step 1808.

In step 1808, the communications device codes in at least one of first and second access probes an access probe identifier. In step 1810, the communications device transmits a first access probe at a time corresponding to a first timing offset relative to the start of a superslot in a beaconslot. Then, in step 1812, the communications device transmits a second access probe at a time corresponding to a second timing offset relative to the start of a superslot, the second access probe being transmitted at a point in time, which is less than the larger of a superslot duration and twice the time required for a transmitted signal to travel from the communications device to the base station, from the point in time at which the first access probe was transmitted. Operation proceeds from step 1812 to step 1814.

In step 1814, the communications device is operated to monitor to determine whether a response was received from the base station, and in step 1816 operation proceeds based upon the determination. If a response was received from the base station, operation proceeds from step 1816 to step 1818. In step 1818 the communications device performs a transmission timing adjustment as a function of information included in the response. If a response was not received from the base station, operation proceeds from step 1816 via connecting node A 1820 to step 1804, where the communications device can restart the process of initiating access signaling.

In some embodiments, the maximum timing ambiguity is less than the duration of a superslot and the time between the transmission of the first and second access probes is less than the duration of a superslot. In some embodiments, the first and second access probes are transmitted at intervals from one another less than or equal to an access interval during which the base station will respond to received access probes.

In various embodiments, wherein the received response includes information identifying the access probe to which the response corresponds, the step of performing a transmission timing adjustment as a function of information included the response includes determining an amount of timing adjustment to be performed from timing correction information received from the base station and information about the transmission time of identified probe relative to the determined downlink timing reference point.

Figure 19:
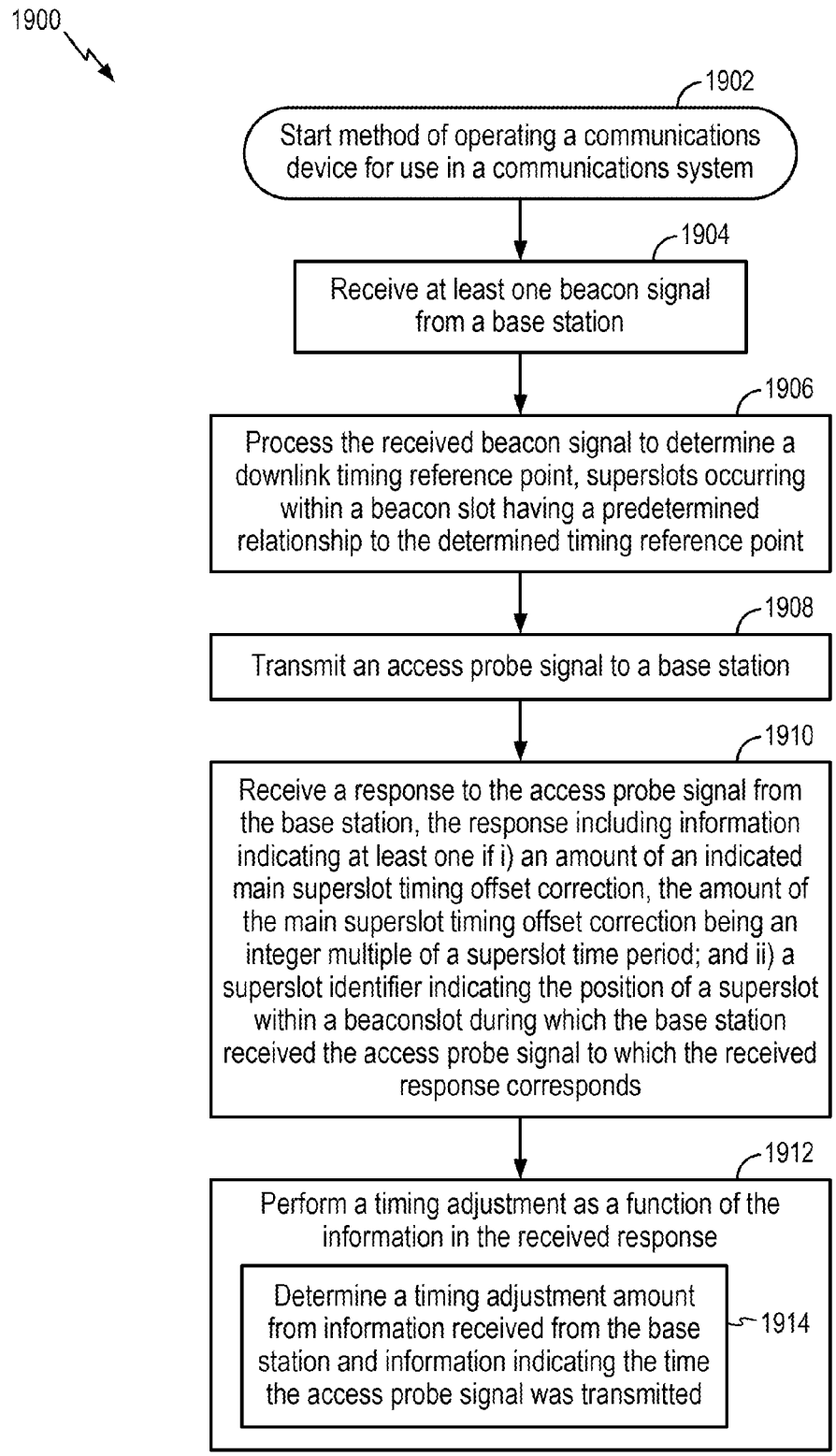
FIG. 19 is a flowchart of an exemplary method of operating an exemplary communications device in accordance with the present invention.

FIG. 19 is a flowchart 1900 of an exemplary method of operating an exemplary communications device in accordance with the present invention. The exemplary method of flowchart 1900 is a method of operating a communications device for use in a communications system, e.g., an OFDM system, where beacon time slots occur on a periodic basis, a beacon signal being transmitted by a base station, e.g., satellite base station, during each beacon time slot according to a periodic downlink timing structure, said downlink timing structure including a plurality of superslots within each beaconslot, the individual superslots within a beacon slot being suitable for identification through the use of a superslot index, each superslot including a plurality of symbol transmission time periods.

Operation starts in step 1902, where the communications device is powered on and initialized. Operation proceeds from step 1902 to step 1904, where the communications device is operated to receive at least one beacon signal from the base station, and then in step 1906, the communications device processes the received beacon signal to determine a downlink timing reference point, superslots occurring within a beaconslot having a predetermined relationship to the determined timing reference point. Operation proceeds from step 1906 to step 1908.

In step 1908, the communications device is operated to transmit an access probe signal to a base station. Then, in step 1910, the communications device receives a response to the access probe signal from the base station, the response including information indicating at least one of i) an mount of indicated main superslot timing offset correction, the amount of main superslot correction being an integer multiple of a superslot time period; and ii) a superslot identifier indicating the position of a superslot within a beaconslot during which the base station received the access probe signal to which the received response corresponds. Operation proceeds from step 1910 to step 1912, where the communications device performs a timing adjustment as a function of the information received in the received response. Step 1912 includes substep 1914. In sub-step 1914, the communications device determines a timing adjustment amount from information received from the base station and information indicating the time the access probe signal was transmitted.

In some embodiments, the received response from the base station includes a superslot identifier indicating the position of the superslot within a beacon slot during which the base station received the access probe signal and performing a transmission timing adjustment as a function of information included in the response includes determining a main superslot timing offset from the superslot identifier included in the received response and information indicating the superslot position, relative to the downlink timing reference point, within a beaconslot at which the access probe was transmitted, the main superslot timing offset being an integer multiple of a duration of a superslot. In some such embodiments, the received response further includes sub-superslot timing correction information including a sub-superslot time offset and performing a transmission timing adjustment includes adjusting the transmission timing by an amount corresponding to the sum of the determined main superslot timing offset and the sub-superslot time offset.

In various embodiments, the received response from the base station includes sub-superslot timing correction information indicating a main superslot timing offset which is an integer multiple of a duration of a superslot and a sub-superslot time offset which is a time offset that is less than the duration of a superslot. In some such embodiments, the step of performing a transmission timing adjustment includes adjusting the transmission timing by an amount corresponding to the sum of the main superslot timing offset and the sub-superslot time offset. In some such embodiments, the main superslot timing offset and sub-superslot time offset are communicated as part of a single coded value. In other embodiments, the main superslot timing offset and the sub-superslot time offset are communicated as two separately coded values.

Figure 20:
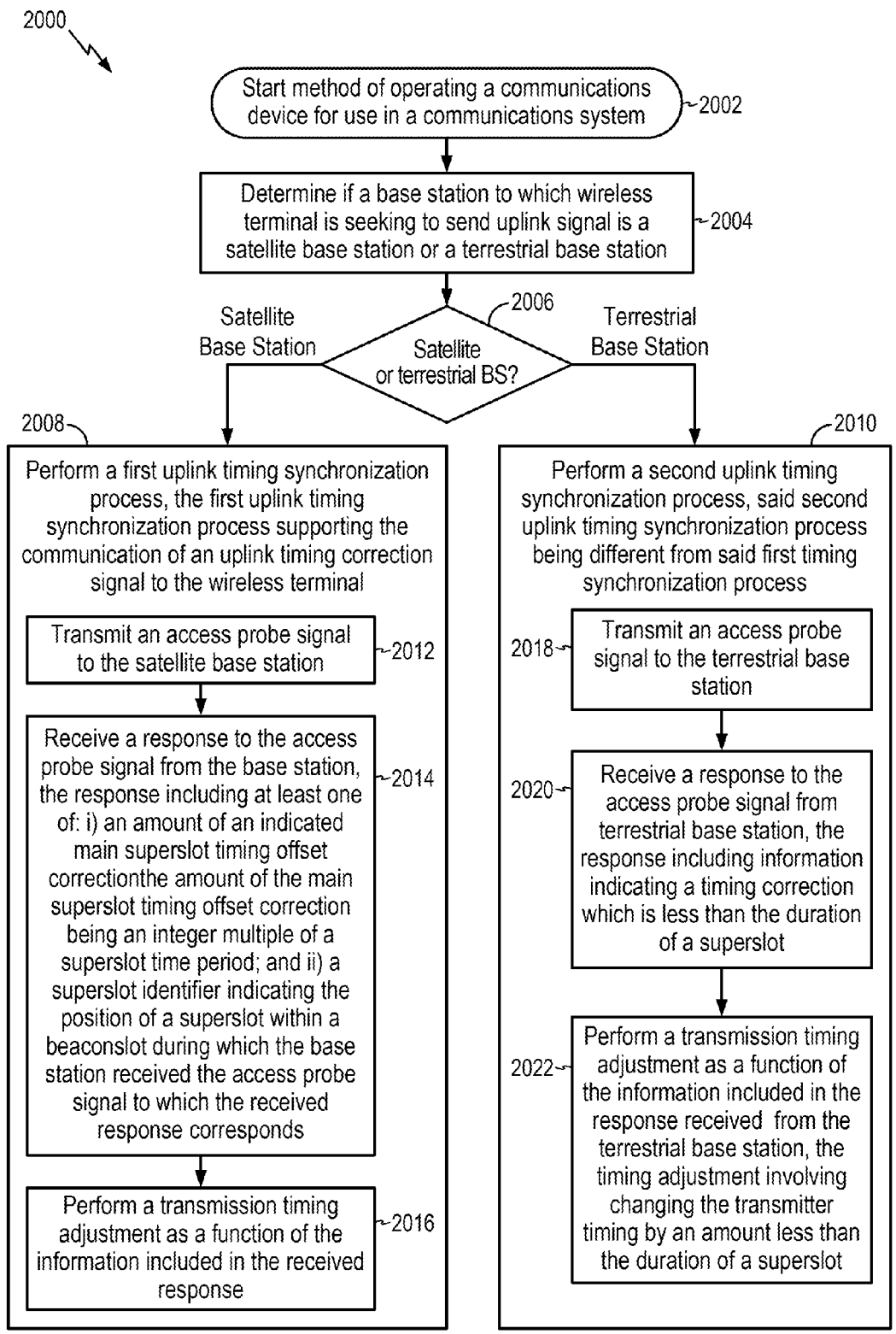
FIG. 20 is a flowchart of an exemplary method of operating a wireless communications terminal in a system in accordance with the present invention.

FIG. 20 is a flowchart 2000 of an exemplary method of operating a wireless communications terminal in a system where base stations have a downlink timing structure that includes a plurality of superslots which recur in a periodic manner, each superslot including a plurality of OFDM symbol transmission time periods. Operation starts in step 2002, where the wireless terminal is powered on and initialized. Operation proceeds from start step 2002 to step 2004, where the wireless terminal is operated to determine if a base station to which the wireless terminal is seeking to send uplink signals is a satellite base station or a terrestrial base station. Based on the determination of step 2004, operation proceeds from step 2006 to either step 2008, in the case of a satellite BS or step 2010 in the case where the base station is a terrestrial base station.

In step 2008, the wireless terminal is operated to perform a first uplink timing synchronization process, the first timing uplink synchronization process supporting the communication of an uplink timing correction signal to the communications terminal. Step 2008 includes sub-step 2012, 2014 and 2016. In sub-step 2012, the wireless terminal is operated to transmit an access probe signal to the satellite base station 2012. In step 2014, the wireless terminal is operated to receive a response to the access probe signal from the base station, the response including at least one of: i) an amount of an indicated main superslot timing offset correction, the amount of the main superslot timing offset correction being an integer multiple of a superslot time period; and ii) a superslot identifier indicating the position of a superslot within a beaconslot during which the base station received the access probe signal to which the received response corresponds. Then in step 2016, the wireless terminal performs a transmission timing adjustment as a function of the information included in the received response.

In step 2010, the wireless terminal performs a second uplink timing synchronization process, said second uplink timing synchronization process being different from said first timing synchronization process. Step 2010 includes sub-step 2018, 2020 and 2022. In sub-step 2018, the wireless terminal transmits an access probe signal to the terrestrial base station. In step 2018, the wireless terminal receives a response to the access probe signal from the terrestrial base station, the response including information indicating a timing correction which is less than the duration of a superslot. In some embodiments, the timing correction is less than the duration of an access interval. In some embodiments, the timing correction is less than the duration of half an access interval. Then, in step 2022, the wireless terminal performs a transmission timing adjustment as a function of the information included in the response received from the terrestrial base station, the timing adjustment involving changing the transmitter timing by an amount less than the duration of a superslot.

Figure 21:
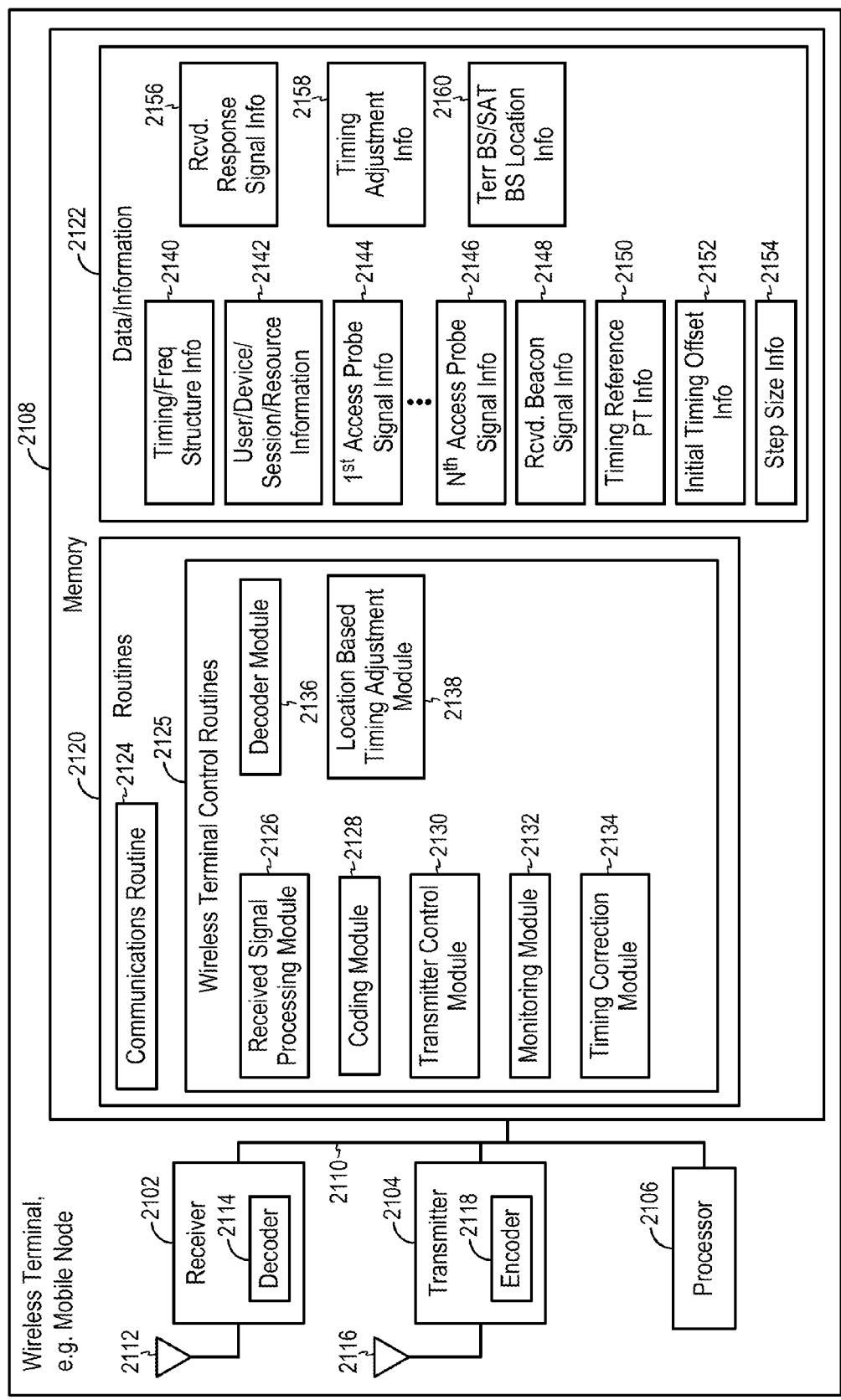
FIG. 21 is a drawing of an exemplary wireless terminal, e.g., mobile node, implemented in accordance with the present invention.

FIG. 21 is a drawing of an exemplary wireless terminal 2100, e.g., mobile node, implemented in accordance with the present invention. Exemplary WT 2100 may be used in various embodiments of wireless communications systems of the present invention. Exemplary WT 2100 includes a receiver 2102, a transmitter 2104, a processor 2106, and a memory 2108 coupled together via a bus 2110 over which the various elements may interchange data and information. The memory 2108 includes routines 2120 and data/information 2122. The processor 2106, e.g., a CPU, executes the routines and uses the data information 2122 in memory 2108 to control the operation of the WT 2100 and implement methods of the present invention.

Receiver 2102, e.g., an OFDM receiver, is coupled to a receive antenna 2112 via which WT 2100 can receive downlink signals from a base station including beacon signals and response signals including timing adjustment information. Transmitter 2104, e.g., an OFDM transmitter, is coupled to a transmit antenna 2116 via which the WT 2100 can transmit uplink signals to a base station including access probe signals. Timing of access probe signals including offsets from superslots, which superslot and which beaconslot in which to transmit a given access probe signal is controllable in transmitter 2104. Receiver 2102 includes a decoder module 2114 used for decoding downlink signals, while transmitter 2104 includes an encoder module 2118 for encoding uplink signals.

Routines 2120 includes a communications routine 2124 for implementing communications protocols used by the WT 2100 and WT control routines 2125 for controlling operations of WT 2100. WT control routines 2125 include a received signal processing module 2126, a coding module 2128, a transmitter control module 2130, a monitoring module 2132, a timing correction module 2134, a decoder module 2136, and a location based timing adjustment module 2138. Received signal processing module 2126 processes signals including beacon signals and determines a downlink timing reference point from at least one beacon signal. Coding module 2128 operating, either alone or in conjunction with encoder 2118, in some embodiments, codes information in an access probe signal that identifies superslot index corresponding to the access probe signal. In some embodiments, a WT identifier and/or a unique access probe identifier is encoded and included in an access probe signal. Transmitter control module 2130 operates to control operations of transmitter 2104 include controlling coded access probe signals to be transmitted with timing offsets, e.g., different timing offsets for different access probes. In some embodiments, transmitter control module 2130 controls the transmission of successive access probes to be greater than the twice the signaling time from the WT to the base station plus a signal processing time, e.g., allowing for the WT 2100 to see whether an access probe has been responded to before issuing another access probe. Monitoring module 2132 is used to determine if a response to an access probe signal is received from the base station. Timing correction module 2134 is responsive to the monitoring module 2132 and performs a transmission timing adjustment as a function of information included in a received access probe response. Decoder module 2136 operating either alone or in conjunction with decoder 2114, decodes information in a response identifying the one of the access probe signals. Location based timing adjustment module 2138 determines a time at which to transmit a first access probe as a function of location information determined from a signal received from a terrestrial base station. Location based timing adjustment module 2138 may be used to reduce the timing ambiguity associated with a satellite base station due to a large coverage area, thus reducing the number of access probe needed and/or the average time of the access process with the satellite base station.

Data/information 2122 includes timing/frequency structure information 2140, user/device/session/resource information 2142, a plurality of access probe signal information sets (1.sup.st access probe signal info 2144, ..., Nth access probe signal info 2146), received beacon signal info 2148, timing reference point information 2150, initial timing offset information 2152, step size information 2154, received response signal information 2156, timing adjustment information 2158, and terrestrial BS/satellite BS location information 2160. Timing/frequency structure information 2140 includes downlink and uplink timing and frequency structure information, periodicity information, indexing information, OFDM symbol transmission time interval information, information regarding grouping of OFDM symbol transmission time intervals such as slots, superslots, beaconslots, etc., base station identification information, beacon signal information, repetitive interval information, access interval information, uplink carrier frequencies, downlink carrier frequencies, uplink tone block information, downlink tone block information, uplink and downlink tone hopping information, base station identification information, etc. Timing/frequency structure information 2140 includes information corresponding to a plurality of base stations that may be in the wireless communications system. User/device/session/resource information 2142 includes information corresponding to users of WT 2100, and information corresponding to peers in a communications session with WT 2100, including, e.g., identifiers, addresses, routing information, air link resources allocated, e.g., downlink traffic channel segments, uplink traffic channel segments for a multi-tone mode with terrestrial base stations, a single dedicated logical tone for uplink signaling with a satellite BS, a base station assigned WT user identifier, etc. 1.sup.st access probe information 2144 includes timing offset information, e.g., relative to the start of a superslot, corresponding to the access probe, information identifying a superslot index, coded information, information identifying a beaconslot, etc. Nth access probe information 2146 includes timing offset information, e.g., relative to the start of a superslot, corresponding to the access probe, information identifying a superslot index, coded information, information identifying a beaconslot, etc. Different sets of access probe information (2144, 2146) may include different information, either partially or completely, e.g., different timing offsets, different superslot index values or different timing offsets, the same superslot index value. Access probe signal information (2144, 2146) may also include user identification information, e.g. a WT user identifier and/or a unique access probe signal identifier, and tone information associated with the access probe signal. Received beacon signal information 2148 includes information from a received beacon signal, e.g., information associating the beacon with a particular base station, carrier frequency, and/or sector, beacon signal strength information, information allowing the WT to establish a timing reference point, etc. Timing reference point information 2150 includes information, e.g., determined using downlink beacon signaling, which establishes a reference point, e.g., beaconslot start upon which superslot indexing is based. Access probe signaling transmission timing can be referenced with respect to the established timing reference point information 2150. Initial timing offset information 2152 includes information identifying an initial timing offset value used in the calculation of timing offset, e.g., with respect to superslot start, for access probes. Step size information 2154 includes information identifying a fixed step size timing offset, which is added in integer multiples to the initial timing offset, to determine the offset from the start of a superslot for a particular access probe, e.g., with different access probes using different integer multiples of the step size timing offset. The fixed step size is in some embodiments less than the duration of a base station access interval, the base station access interval being a period of time during which the base station is responsive to access probe signals. Received response signal information 2156 includes information received in response to the access probe signaling including timing correction information. The timing correction information may be coded. In some embodiments, the response signal information 2156 also includes information identifying which one of the access probe signal is being responded to, e.g., via a WT identifier and/or a unique access probe signal identifier. Timing adjustment information 2158 includes timing correction information extracted from the received response signal and information indicating changes to the transmission timing as a result of applying the correction information. Terrestrial base station/satellite base station location information 2160 includes information indicating the location of terrestrial base stations and the location of satellite base stations in the system. Information 2160 may also include information correlating the cell coverage areas or satellite base stations with terrestrial base stations.

Figure 23:
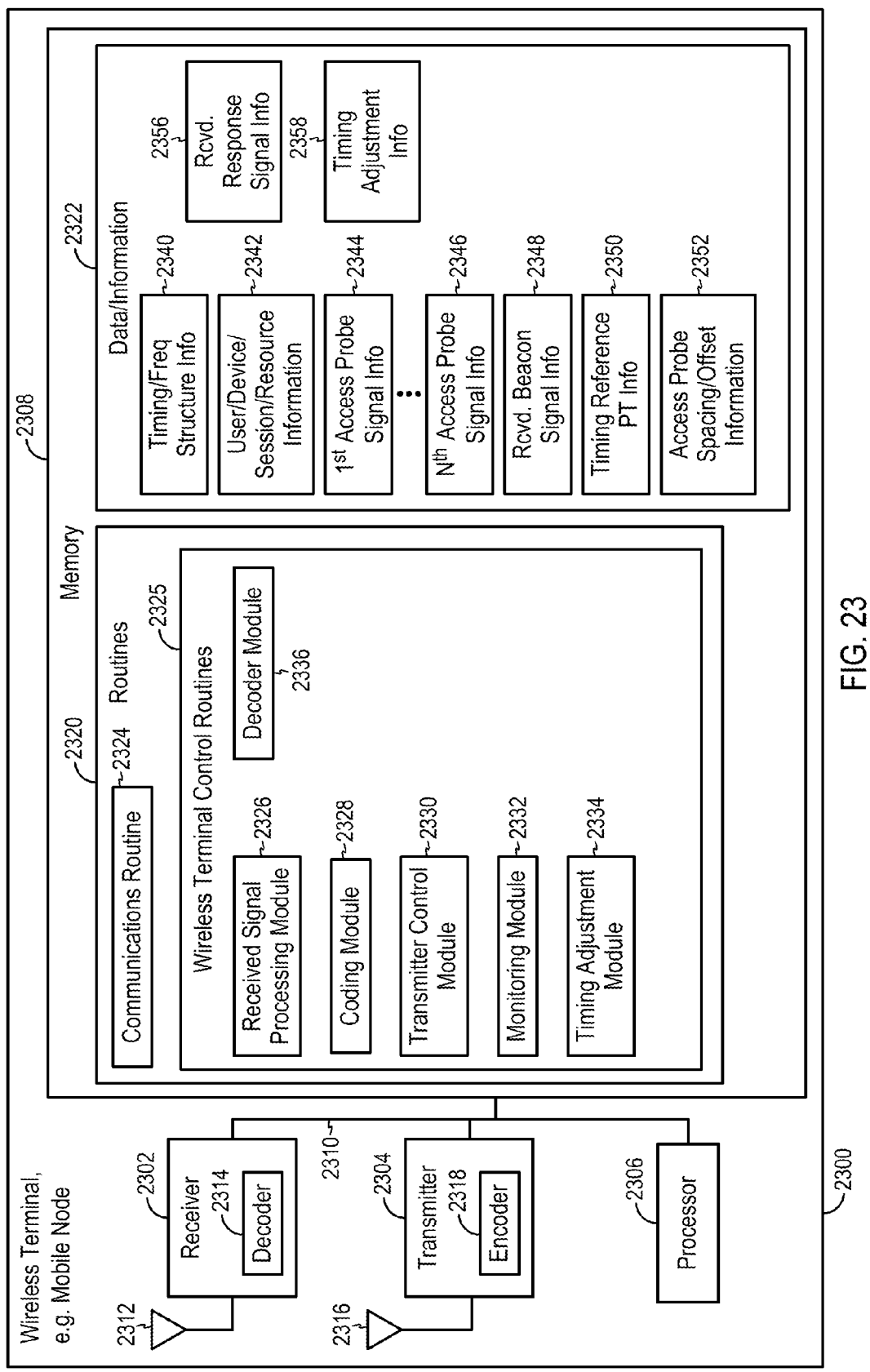
FIG. 23 is a drawing of an exemplary wireless terminal, e.g., mobile node, implemented in accordance with the present invention.

FIG. 23 is a drawing of an exemplary wireless terminal 2300, e.g., mobile node, implemented in accordance with the present invention. Exemplary WT 2100 may be used in various embodiments of wireless communications systems of the present invention. Exemplary WT 2300 includes a receiver 2302, a transmitter 2304, a processor 2306, and a memory 2308 coupled together via a bus 2310 over which the various elements may interchange data and information. The memory 2308 includes routines 2320 and data/information 2322. The processor 2306, e.g., a CPU, executes the routines and uses the data information 2322 in memory 2308 to control the operation of the WT 2300 and implement methods of the present invention.

Receiver 2302, e.g., an OFDM receiver, is coupled to a receive antenna 2312 via which WT 2300 can receive downlink signals from a base station including beacon signals and response signals including timing adjustment information. Transmitter 2304, e.g., an OFDM transmitter, is coupled to a transmit antenna 2316 via which the WT 2300 can transmit uplink signals to a base station including access probe signals. Timing of access probe signals including offsets from superslots, which superslot and which beaconslot in which to transmit a given access probe signal is controllable in transmitter 2304. Receiver 2302 includes a decoder module 2314 used for decoding downlink signals, while transmitter 2304 includes an encoder module 2318 for encoding uplink signals.

Routines 2320 includes a communications routine 2324 for implementing communications protocols used by the WT 2300 and WT control routines 2325 for controlling operations of WT 2300. WT control routines 2325 include a received signal processing module 2326, a coding module 2328, a transmitter control module 2330, a C monitoring module 2332, a timing adjustment module 2334, and a decoder module 2136. Received signal processing module 2326 processes signals including beacon signals and determines a downlink timing reference point from at least one beacon signal. Coding module 2328 operating, either alone or in conjunction with encoder 2318, in some embodiments, codes information in an access probe signal that identifies a corresponding access probe signal, e.g., within a sequence of access probe signals. A wireless terminal identifier and/or a unique access probe signal identifier may also be encoded to allow distinction between the plurality of WTs in the system which may transmit access probes. Transmitter control module 2330 operates to control operations of transmitter 2304 include controlling coded access probe signals to be transmitted with timing offsets, e.g., different timing offsets for different access probes. In some embodiments, the time between successive access probes may be less than the larger of the duration of a superslot and twice the time required for a signal to travel from the WT to the base station. For example, consider that a superslot includes one access interval; however the timing ambiguity may be greater than the access interval but less than the superslot duration, and the WT may transmit a sequence of access probes, e.g., coded to identify the access probe, spaced apart by a time interval less than the access interval to cover the possible timing range ambiguity within the superslot. Monitoring module 2332 is used to determine if a response to an access probe signal is received from the base station. Timing adjustment module 2334 is responsive to the monitoring module 2332 and performs a transmission timing adjustment as a function of information included in a received access probe response. Decoder module 2336 operating either alone or in conjunction with decoder 2314, decodes information in a response identifying the one of the access probe signals.

Data/information 2322 includes timing/frequency structure information 2340, user/device/session/resource information 2342, a plurality of access probe signal information sets (1.sup.st access probe signal info 2344, . . . , Nth access probe signal info 2346), received beacon signal info 2348, timing reference point information 2350, access probe spacing/offset information 2352, received response signal information 2356, and timing adjustment information 2358. Timing/frequency structure information 2340 includes downlink and uplink timing and frequency structure information, periodicity information, indexing information, OFDM symbol transmission time interval information, information regarding grouping of OFDM symbol transmission time intervals such as slots, superslots, beaconslots, etc., base station identification information, beacon signal information, repetitive interval information, access interval information uplink carrier frequencies, downlink carrier frequencies, uplink block information, downlink tone block information, uplink and downlink tone hopping information, base station identification information, etc. Timing/frequency structure information 2340 includes information corresponding to a plurality of base stations that may be in the wireless communications system. User/device/session/resource information 2342 includes information corresponding to users of WT 2300, and information corresponding to peers in a communications session with WT 2300, including, e.g., identifiers, addresses, routing information, air link resources allocated, e.g., downlink traffic channel segments, uplink traffic channel segments for a multi-tone mode with terrestrial base stations, a single dedicated logical tone for uplink signaling with a satellite BS, a base station assigned WT user identifier, etc. 1.sup.st access probe information 2344 includes timing offset information, e.g., relative to the start of a superslot, corresponding to the access probe, information identifying a superslot index, coded information, information identifying a beaconslot, etc. Nth access probe information 2346 includes timing offset information, e.g., relative to the start of a superslot, corresponding to the access probe, information identifying a superslot index, coded information, information identifying a beaconslot, etc. Different sets of access probe information (2344, 2346) may include different information, either partially or completely, e.g., different timing offsets but the same superslot. Access probe signal information (2344, 2346) may also include user identification information, e.g. a WT identifier and/or a unique access probe signal identifier, and tone information associated with the access probe signal. Received beacon signal information 2348 includes information from a received beacon signal, e.g., information associating the beacon with a particular base station, carrier frequency, and/or sector, beacon signal strength information, information allowing the WT to establish a timing reference point, etc. Timing reference point information 2350 includes information, e.g., determined using downlink beacon signaling, which establishes a reference point, e.g., beaconslot start upon which superslot indexing is based. Access probe signaling transmission timing can be referenced with respect to the established timing reference point information 2350. Access probe spacing/offset information 2352 includes timing information relating to access probes in a sequence of access probes, e.g., a delta time interval between successive access probes. For example, in a case where each an access interval duration is less than a superslot, but the timing ambiguity is greater than an access interval duration, a number of successive access probes may be spaced by a delta time interval less than or equal to the access interval duration, and the number being such to cover the timing ambiguity range. Received response signal information 2356 includes information received in response to the access probe signaling including timing correction information. The timing correction information may be coded. In some embodiments, the response signal information 2356 also includes information identifying which one of the access probe signals in the sequence of successive access probes is being responded to. Timing adjustment information 2358 includes timing correction information extracted from the received response signal and information indicating changes to the transmission timing as a result of applying the correction information. Received response signal information 2356 may also include a WT identifier and/or a unique access probe signal identifier.

Figure 24:
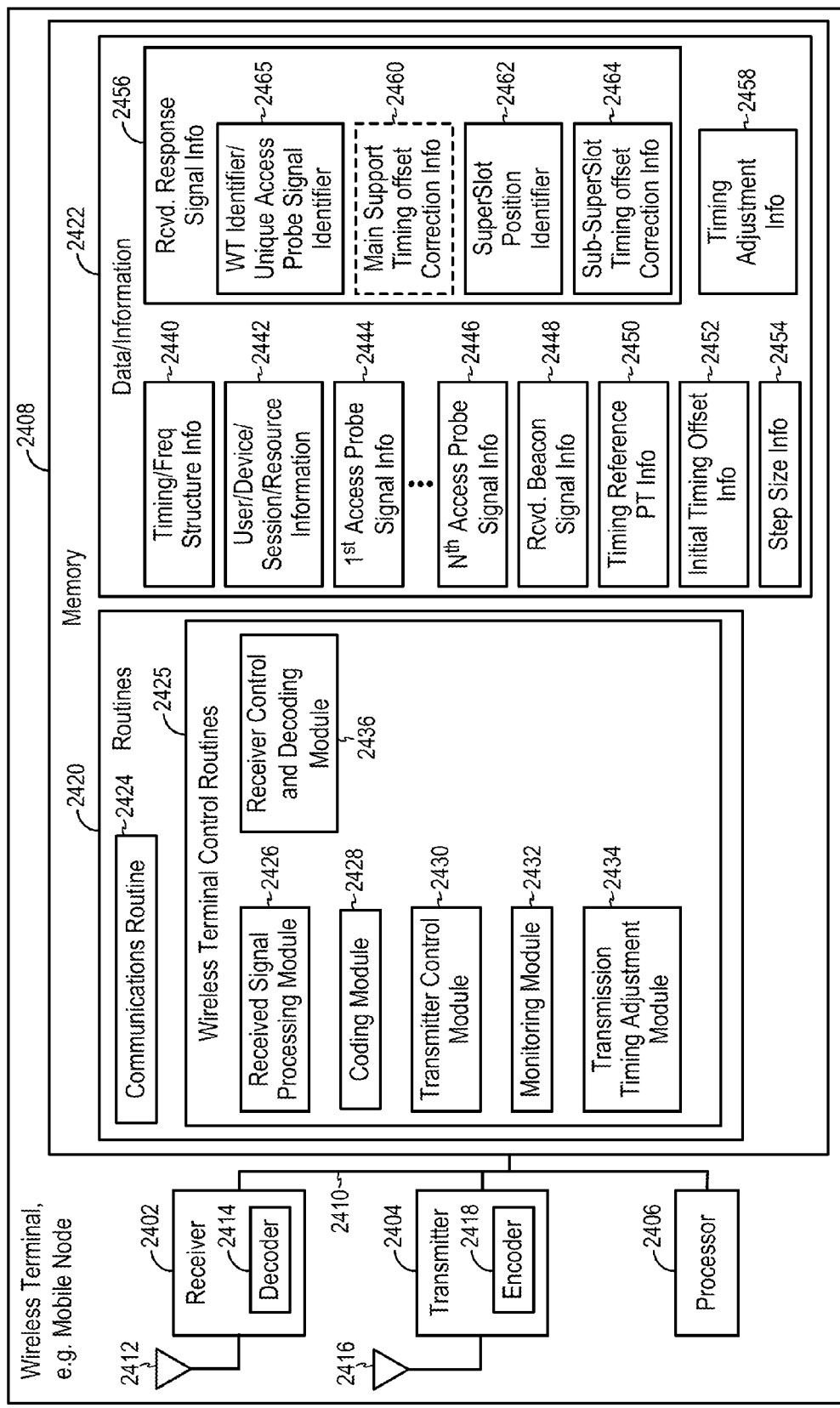
FIG. 24 is a drawing of an exemplary wireless terminal, e.g., mobile node, implemented in accordance with the present invention.

FIG. 24 is a drawing of an exemplary wireless terminal 2400, e.g., mobile node, implemented in accordance with the present invention. Exemplary WT 2400 may be used in various embodiments of wireless communications systems of the present invention. Exemplary WT 2400 includes a receiver 2402, a transmitter 2404, a processor 2406, and a memory 2408 coupled together via a bus 2410 over which the various elements may interchange data and information. The memory 2408 includes routines 2420 and data/information 2422. The processor 2406, e.g., a CPU, executes the routines and uses the data information 2422 in memory 2408 to control the operation of the WT 2400 and implement methods of the present invention.

Receiver 2402, e.g., an OFDM receiver, is coupled to a receive antenna 2412 via which WT 2400 can receive downlink signals from a base station including beacon signals and response signals including timing adjustment information. Transmitter 2404, e.g., an OFDM transmitter, is coupled to a transmit antenna 2416 via which the WT 2400 can transmit uplink signals to a base station including access probe signals. Timing of access probe signals including offsets from superslots, which superslot and which beaconslot in which to transmit a given access probe signal is controllable in transmitter 2404. Receiver 2402 includes a decoder module 2414 used for decoding downlink signals, while transmitter 2404 includes an encoder module 2418 for encoding uplink signals.

Routines 2420 includes a communications routine 2424 for implementing communications protocols used by the WT 2400 and WT control routines 2425 for controlling operations of WT 2400. WT control routines 2425 include a received signal processing module 2426, a coding module 2428, a transmitter control module 2430, a monitoring module 2432, a transmission timing adjustment module 2434, and a receiver control and decoding module 2436. Received signal processing module 2426 processes signals including beacon signals and determines a downlink timing reference point from at least one beacon signal. Coding module 2128 operating, either alone or in conjunction with encoder 2118, codes information in uplink signals, e.g., encoding a WT identifier and/or a unique access probe identifier in an access probe signal to be transmitted by WT 2400, allowing the access probe to be distinguished by the BS from other access probes which may have been transmitted by other WTs. Transmitter control module 2430 operates to control operations of transmitter 2404 include controlling access probe signals to be transmitted with timing offsets, e.g., different timing offsets from the start of a superslot for different access probes. In some embodiments, transmitter control module 2430 controls the transmission of successive access probes to be greater than the twice the signaling time from the WT to the base station plus a signal processing time, e.g., allowing for the WT 2400 to see whether an access probe has been responded to before issuing another access probe. Monitoring module 2432 is used to determine if a response to an access probe signal is received from the base station. Transmission timing adjustment module 2434 is responsive to the monitoring module 2432 and performs a transmission timing adjustment as a function of information included in a received access probe response signal. For example, the transmission timing adjustment module 2434 may use the information in the received response signal, e.g., sub-superslot timing offset correction information 2464, and one of a main superslot timing offset correction value or a superslot position indicator indicative of reception in the base station, in conjunction with information known to the WT 2400 as to when the access probe was transmitted, to calculate a timing adjustment. In some embodiments, the received response signal conveys sub-superslot timing offset information, e.g., via coded bits in the response signal, and main superslot timing offset information is conveyed via the time of transmission of the response signal. In some embodiments, receiver control and decoder module 2436 operating either alone or in conjunction with decoder 2414, receives an access probe response signal from the base station and decodes information in a response extracting at least one of i) an amount of an indicated main superslot timing offset correction, the amount of the main superslot timing offset correction being an integer multiple of a superslot time period; and ii) a superslot identifier indicating the position of a superslot within a beacon slot during which the base station received the access probe signal to which the received response corresponds. In some embodiments, a main superslot timing offset has been coded with a sub-superslot time offset as a single coded value and module 2436 performs the decoding operation. In some embodiments, a main superslot timing offset has been coded separately from a sub-superslot time offset as a two separately coded values and module 2436 performs the decoding operation. In some embodiments, sub-slot timing offset is conveyed via coded bits of the response signal and main superslot offset is conveyed via controlling the time of transmission of the response signal, e.g., within the response signal being offset by different amounts. In some embodiments the response signal also includes a WT identifier and/or a unique access probe signal identifier 2465 such that the WT 2400 can recognize that the response signal is directed to the WT 2400 and not to another WT in the system.

Data/information 2422 includes timing/frequency structure information 2440, user/device/session/resource information 2442, a plurality of access probe signal information sets (1.sup.st access probe signal info 2444, ..., Nth access probe signal info 2446), received beacon signal info 2448, timing reference point information 2450, initial timing offset information 2452, step size information 2454, received response signal information 2456, and timing adjustment information 2458. Timing/frequency structure information 2440 includes downlink and uplink timing and frequency structure information, periodicity information, indexing information, OFDM symbol transmission time interval information, information regarding grouping of OFDM symbol transmission time intervals such as slots, superslots, beaconslots, etc., base station identification information, beacon signal information, repetitive interval information, access interval information, uplink carrier frequencies, downlink carrier frequencies, uplink tone block information, downlink tone block information, uplink and downlink tone hopping information, base station identification information, etc. Timing/frequency structure information 2440 includes information corresponding to a plurality of base stations that may be in the wireless communications system. User/device/session/resource information 2442 includes information corresponding to users of WT 2400, and information corresponding to peers in a communications session with WT 2400, including, e.g., identifiers, addresses, routing information, air link resources allocated, e.g., downlink traffic channel segments, uplink traffic channel segments for a multi-tone mode with terrestrial base stations, a single dedicated logical tone for uplink signaling with a satellite BS, a base station assigned WT user identifier, etc. 1.sup.st access probe information 2444 includes timing offset information, e.g., relative to the start of a superslot, corresponding to the access probe, information identifying a superslot index, information identifying a beaconslot, etc. Nth access probe information 2446 includes timing offset information, e.g., relative to the start of a superslot, corresponding to the access probe, information identifying a superslot index, information identifying a beaconslot, etc. Different sets of access probe information (2444, 2446) may include different information, either partially or completely, e.g., different timing offsets, different superslot index values or different timing offsets, the same superslot index value. Access probe signal information (2444, 2446) may also include user identification information, e.g., a WT identifier and/or a unique access probe signal identifier, and tone information associated with the access probe signal. The WT identifier and/or unique access probe signal identifier may be encoded into the access probe signal such that the BS can distinguish among a plurality of access probes, e.g., from different WTs in the system, and the BS may include identification in response signals allowing WT 2400 to know that a response signal is directed to WT 2400. Received beacon signal information 2448 includes information from a received beacon signal, e.g., information associating the beacon with a particular base station, carrier frequency, and/or sector, beacon signal strength information, information allowing the WT to establish a timing reference point, etc. Timing reference point information 2450 includes information, e.g., determined using downlink beacon signaling, which establishes a reference point, e.g., beaconslot start upon which superslot indexing is based. Access probe signaling transmission timing can be referenced with respect to the established timing reference point information 2450. Initial timing offset information 2452 includes information identifying an initial timing offset value used in the calculation of timing offset, e.g., with respect to superslot start, for access probes. Step size information 2454 includes information identifying a fixed step size timing offset, which is added in integer multiples to the initial timing offset, to determine the offset from the start of a superslot for a particular access probe, e.g., with different access probes using different integer multiples of the step size timing offset. The fixed step size is in some embodiments less than the duration of a base station access interval, the base station access interval being a period of time during which the base station is responsive to access probe signals. Received response signal information 2456 includes information received in response to the access probe signaling including timing correction information. Received response signal information 2456 may include a WT identifier and/or a unique access probe signal identifier 2465, allowing the WT 2400 to recognize that the response signal it directed to itself and not to another WT in the system. In some embodiments, the response signal information 2156 also includes information identifying which one of the access probe signals transmitted by WT 2400 is being responded to, e.g., if the WT 2400 transmits a plurality of access probes in a time interval less than twice the signal transmit time from the WT to BS. The timing correction information may be coded. In some embodiments, the response signal information 2156 also includes information identifying which one of the access probe signal is being responded to. Received response signal information 2456 includes a sub-superslot timing offset correction information 2464, and, in some embodiments, at least one of a main superslot timing offset correction information 2460, e.g., an integer multiple of a superslot time period, and a superslot position identifier 2462, e.g., identifying the position of a superslot within a beaconslot during which the base station received the access probe signal to which the received response corresponds. Timing adjustment information 2458 includes timing correction information extracted from the received response signal and information indicating changes to the transmission timing as a result of applying the correction information, e.g., in combination with know timing information corresponding to the access probe.

Figure 22:
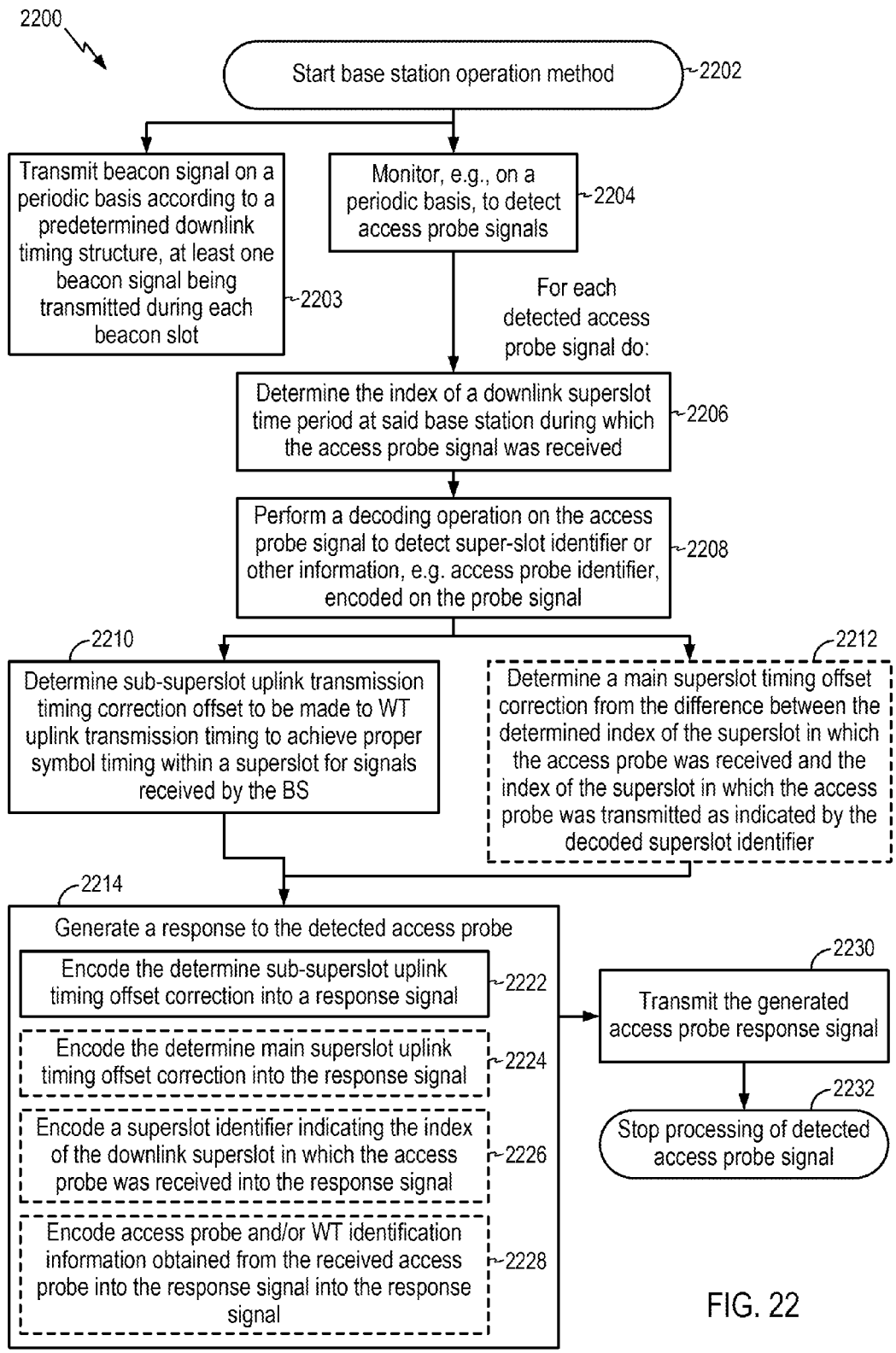
FIG. 22 is a flowchart of an exemplary method of operating a base station in accordance with the present invention.

FIG. 22 illustrates a method of operating a base station, e.g, a satellite base station, in accordance with one exemplary embodiment of the invention. All or portions of the method may be used depending on the particular embodiment and type of wireless terminal signaling sent to the base station, e.g., the type of information encoded on transmitted access probes.

The method starts in step 2202, e.g., with the base station being initialized and placed into operation. Operation proceeds along parallel paths to steps 2203 and 2204 which may be performed in parallel. In step 2203 the base station transmits beacon signals on a periodic basis according to a predetermined downlink timing structure, at least one beacon signal being transmitted during each beacon slot. The beacon signal, in various embodiments, is a signal transmitted at a higher power level than is normally used to transmit user data, e.g., text, video or application data. The beacon signal, in some embodiments is a narrowband signal. In some embodiments a beacon signal is implemented as a single tone signal which is transmitted for one a few consecutive symbol transmission time periods, e.g., less than 3 or 4 consecutive OFDM symbol time periods. The beacon signals are transmitted on a periodic basis as determined by the downlink timing structure.

In step 2204, which can occur in parallel with the beacon transmission step 2203, the base station monitors, e.g., during access intervals which occur on a periodic basis, to detect access probe signals. In some embodiments, the periodic access intervals have a duration shorter than the period of a downlink superslot. The access probe signals may be received from one or more communications devices which have not yet fully achieved uplink timing synchronization with the base station. Superslot and/or sub-superslot uplink timing corrections may be required before the wireless terminals sending the access probes will achieve symbol level uplink timing synchronization with the base station. For each access probe signal detected in step 2204, operation proceeds to step 2206, In step 2206, the base station determines the index of a downlink superslot time period at said base station during which the access probe signal was received. This may be different from the superslot in which the transmitting communications device believed it was transmitting the access probe in. The determination of which downlink superslot an access probe signal was received in can be done using internal base station timing information and knowledge of when the access probe was received.

Operation proceeds from step 2206 to step 2208. In step 2208, the base station performs a decoding operation on the access probe signal to detect information that may have been encoded on the signal, e.g., an access probe identifier, communications device identifier which identifies the transmitting communication device, and/or a downlink superslot identifier indicating for example, an index of a superslot within a beacon slot in which the transmitting device sent the access probe.

With the access probe information having been decoded, operation procees to steps 2210 and 2212. In step 2210 the base station determines a sub-superslot uplink transmission timing correction offset to be made by the communications device which transmitted the received probe to achieve proper symbol level timing within a superslot for signals, e.g., OFDM symbols, transmitted to the base station. This timing correction value is a value which indicates a correction which is less than the duration of a superslot. Operation proceeds form step 2210 to step 2214.

Step 2212 is an optional step performed in some embodiments where a superslot index is encoded on the received access probe. In step 2212 which is performed in some but not necessarily all embodiments, a main superslot timing offset correction is determined from the difference between the determined index of the downlink superslot in which the access probe was received and the index of the superslot in which the access probe was transmitted as indicated by the decoded superslot identifier. Operation proceeds from step 2212 to step 2214.

Step 2214 is a step in which a response to the received access probe is generated and transmitted. In some embodiments, the response is transmitted in a downlink superslot having a predetermined downlink superslot offset from the downlink superslot time period in which the access probe to which the response corresponds was received by the base station. The superslot offset is sufficient for the base station to process and generate the necessary response, e.g., one or two superslots from the superslot in which the access probe was received. Such an embodiment, which transmits responses in a downlink superslot having a predetermined known superslot offset from the superslot in which a response was received allows a wireless terminal to estimate the superslot timing offset error from the response timing.

In some embodiments where access probe response signals transmit the response at a predetermined superslot offset to the point in time in which the access probe is received, the wireless terminal receiving the access probe response calculates a main timing adjustment to be implemented according to the following equation:

main timing adjustment=2.times.(index of superslot in which the response to the access probe was received−index of superslot determined by the communications device in which the access probe was transmitted)−a fixed superslot delay) times the period of a superslot. The fixed superslot delay is a function of the predetermined offset. The 2 multiplier takes into consideration that the delay involved is a round trip delay while the multiplication times the period of a downlink superslot takes into consideration the duration of superslots.

In step 2214, the sub-superslot uplink timing offset correction determined in step 2210 is encoded into the response. In addition, other information may also be encoded into the access probe response signal which is generated. Each of the elements may be coded separately, e.g., as separate error values or may be combined, e.g., with main and sub-superslot error information being coded as a single value. In sub-step 2224, the main superslot uplink timing offset correction, e.g., the correction value generated in step 2212, is coded into the response signal. In sub-step 226, the superslot identifier indicating the index of the downlink superslot in which the access probe signal was received is encoded into the response signal. In sub-step 2228. the communications device identifier and/or access probe identifier corresponding to the received access probe which is being responded to is encoded into the response signal. Identification of the communications device to which the response is directed can be useful in a multi-user system particularly where multiple devices may make requests, e.g., as part of a contention based access process. Operation proceeds from step 2214 to step 2230 where the generated probe is transmitted as an access probe response signal. Processing corresponding to the received detected access probe stops in step 2232 however, the receipt and processing of other access probes may continue.

Figure 25:
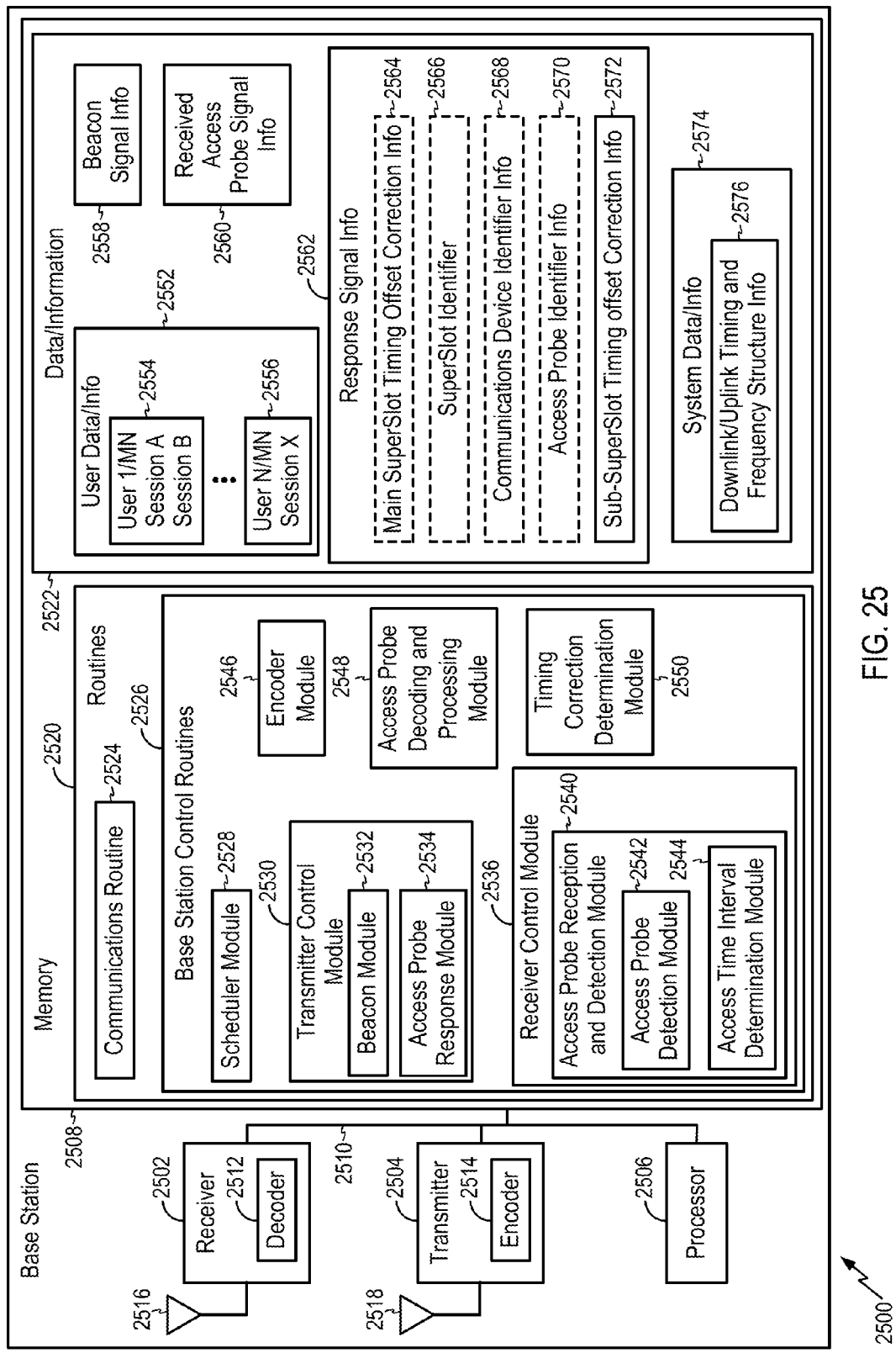
FIG. 25 is a drawing of an exemplary base station implemented in accordance with the present invention and using methods of the present invention.

FIG. 25 is a drawing of an exemplary base station 2500, e.g., a satellite based base station, implemented in accordance with the present invention and using methods of the present invention. Exemplary base station 2500 may be the BS of an exemplary wireless communications system, implemented in accordance with the present invention. The base station 2500 is sometimes referred to an access node, as the base station provides network access to WTs. The base station 2500 includes a receiver 2502, a transmitter 2504, a processor 2506, and a memory 2508 coupled together via a bus 2510 over which the various elements may interchange data and information. The receiver 2502 includes a decoder 2512 for decoding received uplink signals from WTs, e.g., including access probe signals. The transmitter 2504 includes an encoder 2514 for encoding downlink signals to be transmitted to WTs, e.g., including downlink beacon signals and downlink response signals to access probes. The receiver 2502 and transmitter 2504 are each coupled to antennas (2516, 2518) over which uplink signals are received from WTs and downlink signals are transmitted to WTs, respectively. In some embodiments, the same antenna is used for the receiver 2502 and transmitter 2504. In addition to communicating with WTs, the base station 2500 can communicate with other network nodes. In some embodiments where the BS 2500 is a satellite BS the BS communicates with a ground station with a directional antenna and high capacity link, the ground station coupled to other network nodes, e.g., other base stations, routers, AAA servers, home agent nodes and the Internet. In some such embodiments, the same receivers 2502, transmitters 2504, and/or antennas previously described with BS—WT communication links are used for BS—network node ground station links, while in other embodiments separate elements are used for different functions. In embodiments, where the BS 2500 is a terrestrial base station, BS 2500 includes a network interface which couples the BS 2500 to other network nodes and/or the Internet. The memory 2508 includes routines 2520 and data/information 2522. The processor 2506, e.g., a CPU, executes the routines 2520 and uses the data/information 2522 in memory 2508 to control the operation of the base station 2500 and implement the methods of the present invention.

The memory 2508 includes a communications routine 2524 and base station control routine 2526. The communications routine 2524 implements the various communications protocols used by the base station 2500. The base station control routine 2526 includes a scheduler module 2528, which assigns segments, e.g., downlink traffic channel segments, to WTs, a transmitter control module 2530, a receiver control module 2536, an encoder module 2546, an access probe decoding and processing module 2548, and a timing correction determination module 2550.

Transmitter control module controls operation of transmitter 2504. The transmitter control module 2530 includes a beacon module 2532 and an access probe response module 2534. Beacon module controls transmission of beacon signals, e.g., the transmission of at least one beacon signal during a beaconslot. In some embodiments, the beacon signal is a single tone signal. In some embodiments, the beacons signal has a duration of less than three OFDM symbol transmission time periods. Access probe response module 2542 controls the generation and transmission of response signals, which are responding to access probe signals.

The receiver control module 2536 includes an access probe reception and detection module 2540. Receiver control module 2536 controls the receiver 2502 operation. Access probe reception and detection module 2540 is used in receiving and detecting access probe signals from wireless terminals. The access probe detection module 2540 includes an access probe detection module 2542 and an access time interval determination module 2544. Access time interval determination module 2544 identifies the predetermined periodic time periods occurring during a portion of each superslot during a beaconslot, said portion being less than one half of a superslot, the predetermined time periods sometimes referred to as access intervals or slots being reserved for receiving access probes. Access probes arriving outside the access intervals are treated by the base station as interference and not responded to. In some embodiments, an access interval is less than 25% of a superslot interval. For example, an access interval may be 8 or 9 OFDM symbol transmission time intervals corresponding to a superslot of 114 OFDM symbol transmission time intervals. In some embodiments, an OFDM symbol transmission time interval is approximately 100 micro-sec. Access probe detection module 2542 detects and processes received access probes which arrive during time intervals deemed acceptable by the access time interval determination module 2544.

Encoder module 2546, operating either alone or in conjunction with encoder 2514, in some embodiments, includes in the response signal a superslot identifier indicating the position of the superslot within a beaconslot during which the base station received the access probe signal. In some embodiments, the encoder module, operating either alone or in conjunction with encoder 2514, encodes sub-superslot timing correction information in the response signal, said superslot timing correction information indicating a timing adjustment smaller than the duration of a superslot.

Access probe decoding and processing module 2548, operating either alone or in conjunction with decoder 2512, decodes received access probe signals to recover encoded information, e.g., an encoded superslot identifier, encoded information identifying a WT, encoded information identifying the access probe signal.

In some embodiments, timing correction determination module 2550 determines a main superslot timing offset correction, e.g., an integer multiple of the duration of a superslot from the difference between the decoded superslot identifier and the superslot index within a beaconslot of the superslot in which the access probe was received. In some embodiments, timing correction determination 2550 determines a main superslot timing offset correction based on a beacon transmission reference point, and a reference point of the received access probe signal. In some such embodiments, the access probe signal does convey information identifying the index of the superslot during which the WT transmitted the access probe signal. In some such embodiments, the response signal conveys timing adjustment information which is combined by the WT with access signal offset information known to the WT, but not known to the BS. In some such embodiments, a sub-superslot timing correction is conveyed in the response signal via coded bits while the main timing offset information is conveyed by the transmission time of the response signal.

Data/information 2522 includes user data/information 2552 which includes a plurality of sets of information (user 1/MN session A session B data/information 2554, user N/MN session X data/information 2556) corresponding to the wireless terminals using the base station 2500 as their point of network attachment. Such WT information may include, e.g., WT identifiers, routing information, assigned uplink single logical tone, downlink segment assignment information, user data/information, e.g., voice information, data packets of text, video, music, etc., coded blocks of information. Data/information 2522 also includes system information 2574 including downlink/uplink timing and frequency structure information 2576, beacon signal information 2558, received access probe signal information 2560 and response signal information 2562. The response signal information includes sub-superslot timing offset correction information 2572, and at least one of main superslot timing offset correction information 2564, superslot identifier information 2566, communications device identifier information 2568, and access probe identifier information 2570.

In some embodiments, the main superslot timing offset correction is an integer multiple of a superslot time period. A superslot identifier can be used to indicate the position of the superslot within a beaconslot during which the base station received the access probe signal to which the received response corresponds. A communications device identifier can be used to identify the communications device which transmitted the access probe signal to which the received response corresponds. An access probe identifier can be used to identify the access probe to which the response signal corresponds.

Downlink/uplink timing and frequency structure information 2576 including OFDM symbol transmission timing information, information corresponding to grouping of OFDM symbols, e.g., slot, superslot, beaconslot, access interval, etc. information, beacon timing and tone information, indexing information, e.g., of superslots within a beaconslot, carrier frequencies used for uplink and downlink, tone blocks used for uplink and downlink, tone hopping information for uplink and downlink, timing relationships and offsets between uplink and downlink timing structure at the base station, periodic intervals within the timing structures, etc.

The techniques of the present invention may be implemented using software, hardware and/or a combination of software and hardware. The present invention is directed to apparatus, e.g., mobile nodes such as mobile terminals, base stations, communications system which implement the present invention. It is also directed to methods, e.g., method of controlling and/or operating mobile nodes, base stations and/or communications systems, e.g., hosts, in accordance with the present invention. The present invention is also directed to machine readable medium, e.g., ROM, RAM, CDs, hard discs, etc., which include machine readable instructions for controlling a machine to implement one or more steps in accordance with the present invention.

In various embodiments nodes described herein are implemented using one or more modules to perform the steps corresponding to one or more methods of the present invention, for example, signal processing, message generation and/or transmission steps. Thus, in some embodiments various features of the present invention are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, the present invention is directed to a machine-readable medium including machine executable instructions for causing a machine, e.g., processor and associated hardware, to perform one or more of the steps of the above-described method(s).

The timing synchronization methods and apparatus of the present invention can be used with a wide variety of devices and systems. The methods and apparatus of the present invention are well suited for use, and can be used in combination with the methods and apparatus described in U.S. Utility patent application Ser. No. 11/184,051, titled "COMMUNICATIONS SYSTEM, METHODS AND APPARATUS" which is filed on the same day as the present application and names the same inventors as the present application. This utility patent application is hereby expressly incorporated by reference and is to be deemed as part of the disclosure of the present patent application.

While described in the context of an OFDM system, at least some of the methods and apparatus of the present invention, are applicable to a wide range of communications systems including many non-OFDM and/or non-cellular systems.

Numerous additional variations on the methods and apparatus of the present invention described above will be apparent to those skilled in the art in view of the above description of the invention. Such variations are to be considered within the scope of the invention. In some embodiments the base stations server as access nodes which establish communications links with mobile nodes (WTs) using OFDM signals. In various embodiments the WTs are implemented as cell phones, notebook computers, personal data assistants (PDAs), or other portable devices including receiver/transmitter circuits and logic and/or routines, for implementing the methods of the present invention.

What is claimed is:

1. A method of operating a communications device for use in a communications system Where beacon time slots occur on a periodic basis, a beacon signal being transmitted by a satellite base station during each beacon time slot according to a periodic downlink timing structure, said downlink timing structure including a plurality of superslots within each beacon slot, the individual superslots within a beacon slot being identifiable through the use of a superslot index, each superslot including a plurality of symbol transmission time periods, the method comprising:

receiving at least one beacon signal from the satellite base station;

processing the received beacon signal to determine a downlink timing reference point, superslots occurring within a beacon slot having a predetermined relationship to the determined downlink timing reference point;

transmitting an access probe signal to said base station;

receiving a response to the access probe signal from the base station, the response including information indicating at least one of: i) an amount of an indicated main superslot timing offset correction, the amount of the main superslot timing offset correction being an integer multiple of a superslot time period; ii) a superslot identifier indicating the position of a superslot within a beacon slot during which the base station received the access probe signal to which the received response corresponds; iii) an identifier that identifies the communications device which transmitted the access probe signal to which the received response corresponds or iv) an identifier that identifies the access probe to which the response being responding to; and performing a transmission timing adjustment as a function of the information included in the received response.

2. The method of 1, wherein said identifier of the received access probe includes information that identifies the downlink superslot in which the communication device determined the probe was transmitted.

3. The method of claim 1, wherein said received response is transmitted to the communications device at a fixed predetermined superslot time offset from the time it was received by the base station.

4. The method of claim 1, wherein said access probe signal is an OFDM signal.

5. The method of claim 4, wherein said beacon signal is a single tone signal.

6. The method of claim 1, wherein the received response from the base station includes a superslot identifier indicating the position of the superslot within a beacon slot during which the base station received the access probe signal, and wherein performing a transmission timing adjustment as a function of information included in said response includes: determining a main supers lot timing offset from the superslot identifier included in the received response and information indicating the superslot position, relative to said downlink timing reference point, within a beacon slot at which said access probe was transmitted, the main superslot timing offset being an integer multiple of the duration of a superslot.

7. The method of claim 6, wherein the received response further includes sub-superslot timing correction information including a sub-superslot time offset; and wherein performing a transmission timing adjustment includes adjusting said transmission timing by an amount corresponding to the sum of the determined main superslot timing offset and said sub-superslot time offset.

8. The method of claim 1, wherein the received response from the base station includes information indicating a main supers lot timing offset which is an integer multiple of the duration of a superslot and a sub-superslot time offset which is a time offset that is less than the duration of a superslot.

9. The method of claim 8, wherein said main superslot timing offset and said sub-superslot time offset are communicated as part of a single coded value.

10. The method of claim 8, wherein said main superslot timing offset and said sub-superslot time offset are communicated as two separately coded values.

11. The method of claim 8, wherein performing a transmission timing adjustment includes adjusting said transmission timing by an amount correspond to the sum of the main superslot timing offset and said sub-superslot time offset.

12. The method of claim 1, wherein performing a transmission timing adjustment includes determining a timing adjustment amount from the location in a beaconslot of the superslot which included the received access probe response and information about the time the access probe signal was transmitted.

13. The method of claim 12, wherein said information indicating the time the access probe signal was transmitted indicates the index of a downlink superslot as determined from said determined reference point in time in which said access probe, to which a response was received, was transmitted.

14. The method of claim 1, wherein performing a transmission timing adjustment includes determining a main timing adjustment amount from information received from said base station and information indicating a superslot index, determined by said communications device to be the index within a beacon slot at which the probe being responded to was transmitted.

15. The method of claim 14, wherein said main timing adjustment is a timing adjustment corresponding to an integer multiple of a superslot time period, determining the main timing adjustment further being performed as a function of a fixed superslot delay between the time the base station receives an access request and transmits a response to the received access request.

16. The method of claim 14, wherein the main timing adjustment is determined according to the following equation:

main timing adjustment =2×(index of superslot in which the response to the access probe was received−index of superslot determined by the communications device in which the access probe was transmitted)−a fixed superslot delay) times the period of a superslot.

17. The method of claim 16 wherein performing a transmission timing adjustment further includes: adjusting said timing by a sub-superslot offset specified by said base station in said response to the transmitted access request.

18. A communications device for use in a communications system where beacon time slots occur on a periodic basis, a beacon signal being transmitted by a satellite base station during each beacon time slot according to a periodic downlink timing structure, said downlink timing structure including a plurality of superslots within each beacon slot, the individual superslots within a beacon slot being identifiable through the use of a superslot index, each superslot including a plurality of symbol transmission time periods, the method comprising:

a receiver configured to receive at least one beacon signal from the satellite base station;

a processing module configured to process the received beacon signal to determine a downlink timing reference point, superslots occurring within a beacon slot having a predetermined relationship to the determined downlink timing reference point;

a transmitter module for transmitting an access probe signal to said base station;

a receiver module for receiving a response to the access probe signal from the base station, the response including information indicating at least one of: i) an amount of an indicated main superslot timing offset correction, the amount of the main superslot timing offset correction being an integer multiple of a superslot time period; ii) a superslot identifier indicating the position of a superslot within a beacon slot during which the base station received the access probe signal to which the received response corresponds, iii) an identifier that identifies the communications device which transmitted the access probe signal to which the received response corresponds or iv) an identifier that identifies the access probe to which the response being responding to; and a transmission timing adjustment module for performing a transmission timing adjustment as a function of the information included in the received response.

19. The communications device of aim 18, wherein said access probe signal is an OFDM signal.

20. The communications ice of claim 19, wherein said beacon signal is a single tone signal.

21. A method of operating a communications terminal in an OFDM system including terrestrial and satellite base stations which use OFDM signals for both uplink and downlink signaling, the method comprising:

determining if a base station to which said communications terminal is seeking to send OFDM uplink signals is a satellite base station or a terrestrial base station;

performing a first uplink timing synchronization process if it is determined that said base station is a satellite base station;

performing a second uplink timing synchronization process if it is determined that said base station is a terrestrial base station, said second uplink timing synchronization process being different from said first uplink timing synchronization process;

wherein both said terrestrial and satellite base stations have a downlink timing structure that includes a plurality of superslots which recur in a periodic manner, each superslot including a plurality of OFDM symbol transmission time periods; and wherein said first uplink timing synchronization process supports the communication of an uplink timing correction signal to the communications terminal which indicates an uplink transmission timing synchronization correction exceeding the duration of a downlink superslot.

22. The method of claim 21, wherein performing the first uplink timing synchronization process includes:

transmitting an access probe signal to said satellite base station;

receiving a response to the access probe signal from the base station, the response including information indicating at least one of i) an amount of an indicated main superslot timing offset correction, the amount of the main superslot timing offset correction being an integer multiple of a superslot time period; or ii) a superslot identifier indicating the position of a superslot within a beacon slot during which the base station received the access probe signal to which the received response corresponds; and performing an uplink transmission timing adjustor as a function of the information included in the received response.

23. The method of claim 21, wherein performing the second uplink timing synchronization process includes:

transmitting an access probe signal to said terrestrial base station;

receiving a response to the access probe signal from the terrestrial base station, the response including information indicating a timing correction which is less than the duration of a superslot; and performing a transmission timing adjustment as a function of the information included in the response received from the terrestrial base station, the timing adjustment involving changing transmitter timing by an amount less then the duration of a superslot.

24. A method of operating a wireless terminal to communicate with base stations in a communications system including a plurality of base stations, the method comprising:

storing base station location information in memory;

receiving a signal from a first base station;

determining a time at which to transmit an access signal to a second base station as a function of stored location information indicating the location of said first base station from which said wireless terminal received said signal, said determining a time at which to transmit an access signal to a second base station including receiving a signal from the second base station, determining from the received signal a timing reference point, and determining said time at which to transmit an access signal relative to the determined reference point using uplink timing correction information calculated from said stored location information indicating the location of said first base station and information indicating the location of said second base station, said time at which to transmit an access signal being determined so that the transmitted access signal will be received at the second base station during an access interval in which received access signals are processed by said second base station; and transmitting said access signal at the determined time.

25. The method of claim 24, wherein said first base station is a terrestrial base station and said second base station is a satellite base station.

26. The method of claim 25, wherein said access signal is an OFDM signal and wherein said signal received from said second base station is a beacon signal.

27. The method of claim 25, wherein said first and second base stations each use a periodic downlink timing structure, said downlink timing structure including beacon slots and superslots, a plurality of superslots occurring within each beacon slot.

28. A communications device for use in a communications system where beacon time slots occur on a periodic basis, a beacon signal being transmitted by a satellite base station during each beacon time slot according to a periodic downlink timing structure, said downlink timing structure including a plurality of superslots within each beacon slot, the individual superslots within a beacon slot being identifiable through the use of a superslot index, each superslot including a plurality of symbol transmission time periods, the device comprising:

means for receiving at least one beacon signal from the satellite base station;

means for processing the received beacon signal to determine a downlink timing reference point, superslots occurring within a beacon slot having a predetermined relationship to the determined downlink timing reference point;

means for transmitting an access probe signal to said base station;

wherein said means for receiving are also for receiving a response to the access probe signal from the base station, the response including information indicating at least one of: i) an amount of an indicated main superslot timing offset correction, the amount of the main superslot timing offset correction being an integer multiple of a superslot time period; ii) superslot identifier indicating the position of a superslot within a beacon slot during which the base station received the access probe signal to which the received response corresponds; iii) identifier that identifies the communications device which transmitted the access probe signal to which the received response corresponds or iv) an identifier that identifies the access probe to which the response being responding to; and means for performing a transmission timing adjustment as a function of the information included in the received response.

29. A wireless terminal to communicate with base stations in a communications system including a plurality of base stations, the wireless terminal comprising:

a memory for storing base station location information;

a receiver configured to receive a signal from a first base station;

a location based timing determination module configured to determine a time at which to transmit an access signal to a second base station as a function of stored location information indicating the location of said first base station from which said wireless terminal received said signal;

a transmitter configured to transmit said access signal at the determined time;

wherein said location based timing determination module determines a timing reference point from a signal received from the second base station, as part of determining said time at which to transmit an access signal to the second base station;

wherein said location based timing determination module determines the time at which to transmit an access signal to the second base station relative to the determined timing reference point using uplink timing correction information calculated from the stored location information indicating the location of said first base station and information indicating the location of said second base station, said time at which to transmit an access signal being determined so that the transmitted access signal will be received at the second base station during an access interval in which received access signals are processed by said second base station.

30. A wireless terminal to communicate with base stations in a communications system including a plurality of base stations, the wireless terminal comprising:

means for storing base station location information;

means for receiving a signal from a first base station;

means for determining a time at which to transmit an access signal to a second base station as a function of stored location information indicating the location of said first base station from which said wireless terminal received said signal;

means for transmitting said access signal at the determined time;

wherein said means for determining determine a timing reference point from a signal received from the second base station, as part of said determining the time at which to transmit an access signal to the second base station; and wherein said means for determining determine the time at which to transmit an access signal to the second base station relative to the determined timing reference point using uplink timing correction information calculated from the stored location information indicating the location of said first base station and information indicating the location of said second base station, said time at which to transmit an access signal being determined so that the transmitted access signal will be received at the second base station during an access interval in which received access signals are processed by said second base station.

31. A communications terminal in an OFDM system including terrestrial and satellite base stations which use OFDM signals for both uplink and downlink signaling, the communications terminal comprising:

a processor configured to control the communications terminal to:

determine if a base station to which said communications terminal is seeking to send OFDM uplink signals is a satellite base station or a terrestrial base station;

perform a first uplink timing synchronization process if it is determined that said base station is a satellite base station; and perform a second uplink timing synchronization process if it is determined that said base station is a terrestrial base station, said second uplink timing synchronization process being different from said first uplink timing synchronization process;

wherein both said terrestrial and satellite base stations have a downlink timing structure that includes a plurality of superslots which recur in a periodic manner, each superslot including a plurality of OFDM symbol transmission time periods; and wherein said first uplink tuning synchronization process supports the communication of an uplink timing correction signal to the communications terminal which indicates an uplink transmission timing synchronization correction exceeding the duration of a downlink superslot.

* * * * *